United States Patent
Dey et al.

(10) Patent No.: US 12,503,471 B2
(45) Date of Patent: Dec. 23, 2025

(54) TRIAZATRICYCLE COMPOUNDS FOR THE TREATMENT OF AUTOIMMUNE DISEASE

(71) Applicant: Hoffmann-La Roche Inc., Little Falls, NJ (US)

(72) Inventors: Fabian Dey, Zurich (CH); Hong Shen, Shanghai (CN); Hongtao Xu, Shanghai (CN); Wei Zhu, Shanghai (CN); Ge Zou, Shanghai (CN)

(73) Assignee: Hoffmann-La Roche Inc., Little Falls, NJ (US)

( * ) Notice: Subject to any disclaimer, the term of this patent is extended or adjusted under 35 U.S.C. 154(b) by 737 days.

(21) Appl. No.: 17/777,588

(22) PCT Filed: Nov. 17, 2020

(86) PCT No.: PCT/EP2020/082317
§ 371 (c)(1),
(2) Date: May 17, 2022

(87) PCT Pub. No.: WO2021/099285
PCT Pub. Date: May 27, 2021

(65) Prior Publication Data
US 2023/0015242 A1    Jan. 19, 2023

(30) Foreign Application Priority Data
Nov. 19, 2019   (WO) ................ PCT/CN2019/119511

(51) Int. Cl.
C07D 471/14    (2006.01)
A61K 31/4985   (2006.01)
C07D 498/18    (2006.01)

(52) U.S. Cl.
CPC .......... *C07D 471/14* (2013.01); *C07D 498/18* (2013.01)

(58) Field of Classification Search
CPC .............. C07D 471/14; A61K 31/4985; A61K 31/4353; A61P 37/00
USPC .......................................... 544/346; 514/250
See application file for complete search history.

(56) References Cited

U.S. PATENT DOCUMENTS

| | | |
|---|---|---|
| 4,273,773 A | 6/1981 | Demerson et al. |
| 2015/0105370 A1 | 4/2015 | Carlson et al. |
| 2018/0037570 A1 | 2/2018 | Sherer et al. |
| 2021/0371432 A1 | 12/2021 | Dey et al. |

FOREIGN PATENT DOCUMENTS

| | | |
|---|---|---|
| WO | 2017/106607 A1 | 6/2017 |
| WO | 2019/233941 A1 | 12/2019 |
| WO | 2020/207991 A1 | 10/2020 |
| WO | 2021/094301 A1 | 5/2021 |
| WO | 2021/105072 A1 | 6/2021 |

OTHER PUBLICATIONS

"International Preliminary Report on Patentability—PCT/EP2020/082317" (Report Issuance Date: May 17, 2022; Chapter I), :pp. 1-8 (Jun. 2, 2022).
"International Search Report—PCT/EP2020/082317" (w/Written Opinion), :pp. 1-13 (Dec. 16, 2020).
"U.S. Appl. No. 17/776,349 entitled 'Hydropyrazino[1,2-B]Isoquinoline Compounds for the Treatment of Autoimmune Disease' filed May 12, 2022".
"U.S. Appl. No. 17/780,123 entitled '1,8-Naphthyridin-2-One Compounds for the Treatment of Autoimmune Disease' filed May 26, 2022".

*Primary Examiner* — Charanjit Aulakh
(74) *Attorney, Agent, or Firm* — Bradley E. Davis

(57) ABSTRACT

The present invention relates to compounds of formula (I), wherein $R^1$ to $R^3$ and n are as described herein, and their pharmaceutically acceptable salt thereof, and compositions including the compounds and methods of using the compounds.

(I)

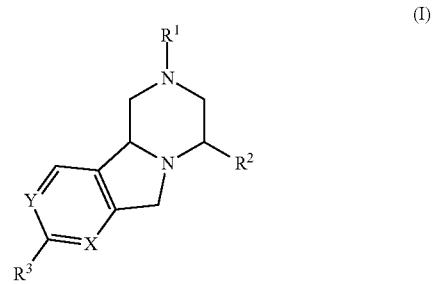

15 Claims, No Drawings

TRIAZATRICYCLE COMPOUNDS FOR THE TREATMENT OF AUTOIMMUNE DISEASE

CROSS-REFERENCE TO RELATED APPLICATIONS

This application is a National Stage Entry under 35 U.S.C. § 371 of International Application No. PCT/EP2020/082317, filed Nov. 17, 2020, which claims benefit of priority to Chinese Application No. PCT/CN2019/119511 filed Nov. 19, 2019, the disclosures of each of which is incorporated herein by reference in its entirety.

The present invention relates to organic compounds useful for therapy and/or prophylaxis in a mammal, and in particular to antagonist of TLR7 and/or TLR8 and/or TLR9 useful for treating systemic lupus erythematosus or lupus nephritis.

FIELD OF THE INVENTION

Autoimmune connective tissue disease (CTD) include prototypical autoimmune syndromes such as Systemic Lupus Erythematosus (SLE), primary Sjögren's syndrome (pSjS), mixed connective tissue disease (MCTD), Dermatomyositis/Polymyositis (DM/PM), Rheumatoid Arthritis (RA), and systemic sclerosis (SSc). With the exception of RA, no really effective and safe therapies are available to patients. SLE represents the prototypical CTD with a prevalence of 20-150 per 100,000 and causes broad inflammation and tissue damage in distinct organs, from commonly observed symptoms in the skin and joints to renal, lung, or heart failure. Traditionally, SLE has been treated with non-specific anti-inflammatory or immunosuppressive drugs. However, long-term usage of immunosuppressive drug, e.g. corticosteroids is only partially effective, and is associated with undesirable toxicity and side effects. Belimumab is the only FDA-approved drug for lupus in the last 50 years, despite its modest and delayed efficacy in only a fraction of SLE patients (Navarra, S. V. et al Lancet 2011, 377, 721.). Other biologics, such as anti-CD20 mAbs, mAbs against or soluble receptors of specific cytokines, have failed in most clinical studies. Thus, novel therapies are required that provide sustained improvement in a greater proportion of patient groups and are safer for chronic use in many auto-immune as well as auto-inflammation diseases.

Toll like Receptors (TLR) are an important family of pattern recognition receptors (PRR) which can initiate broad immune responses in a wide variety of immune cells. As natural host defense sensors, endosomal TLRs 7, 8 and 9 recognize nucleic acids derived from viruses, bacteria; specifically, TLR7/8 and TLR9 recognize single-stranded RNA (ssRNA) and single-stranded CpG-DNA, respectively. However, aberrant nucleic acid sensing of TRL7, 8, 9 is considered as a key node in a broad of autoimmune and auto-inflammatory diseases (Krieg, A. M. et al. Immunol. Rev. 2007, 220, 251. Jimenez-Dalmaroni, M. J. et al Autoimmun Rev. 2016, 15, 1. Chen, J. Q., et al. Clinical Reviews in Allergy & Immunology 2016, 50, 1.). Anti-RNA and anti-DNA antibodies are well-established diagnostic markers of SLE, and these antibodies can deliver both self-RNA and self-DNA to endosomes. While self-RNA complexes can be recognized by TLR7 and TLR8, self-DNA complexes can trigger TLR9 activation. Indeed, defective clearance of self-RNA and self-DNA from blood and/or tissues is evident in SLE (Systemic Lupus Erythematosus) patients. TLR7 and TLR9 have been reported to be upregulated in SLE tissues, and correlate with chronicity and activity of lupus nephritis, respectively. In B cells of SLE patients, TLR7 expression correlates with anti-RNP antibody production, while TLR9 expression with IL-6 and anti-dsDNA antibody levels. Consistently, in lupus mouse models, TLR7 is required for anti-RNA antibodies, and TLR9 is required for anti-nucleosome antibody. On the other hand, overexpression of TLR7 or human TLR8 in mice promotes autoimmunity and auto-inflammation. Moreover, activation of TLR8 specifically contributes to inflammatory cytokine secretion of mDC/macrophages, neutrophil NETosis, induction of Th17 cells, and suppression of Treg cells. In addition to the described role of TLR9 in promoting autoantibody production of B cells, activation of TLR9 by self-DNA in pDC also leads to induction of type I IFNs and other inflammatory cytokines. Given these roles of TLR9 in both pDC and B cells, both as key contributors to the pathogenesis of autoimmune diseases, and the extensive presence of self-DNA complexes that could readily activate TLR9 in many patients with autoimmune diseases, it may have extra benefit to further block self-DNA mediated TLR9 pathways on top of inhibition of TLR7 and TLR8 pathways. Taken together, TLR7, 8 and 9 pathways represent new therapeutic targets for the treatment of autoimmune and auto-inflammatory diseases, for which no effective steroid-free and non-cytotoxic oral drugs exist, and inhibition of all these pathways from the very upstream may deliver satisfying therapeutic effects. As such, we invented oral compounds that target and suppress TLR7, TLR8 and TLR9 for the treatment of autoimmune and auto-inflammatory diseases.

SUMMARY OF THE INVENTION

The present invention relates to novel compounds of formula (I) or (Ia),

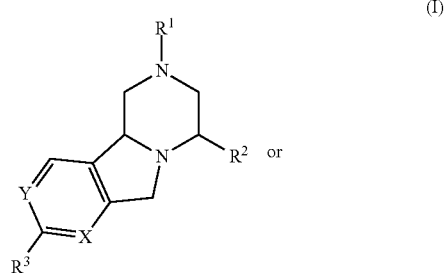

(I)

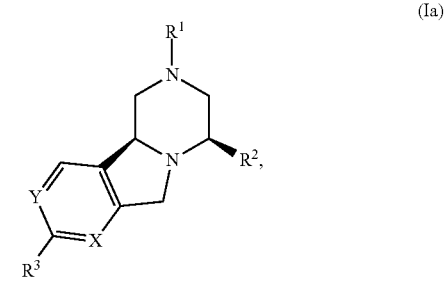

(Ia)

wherein $R^1$ is

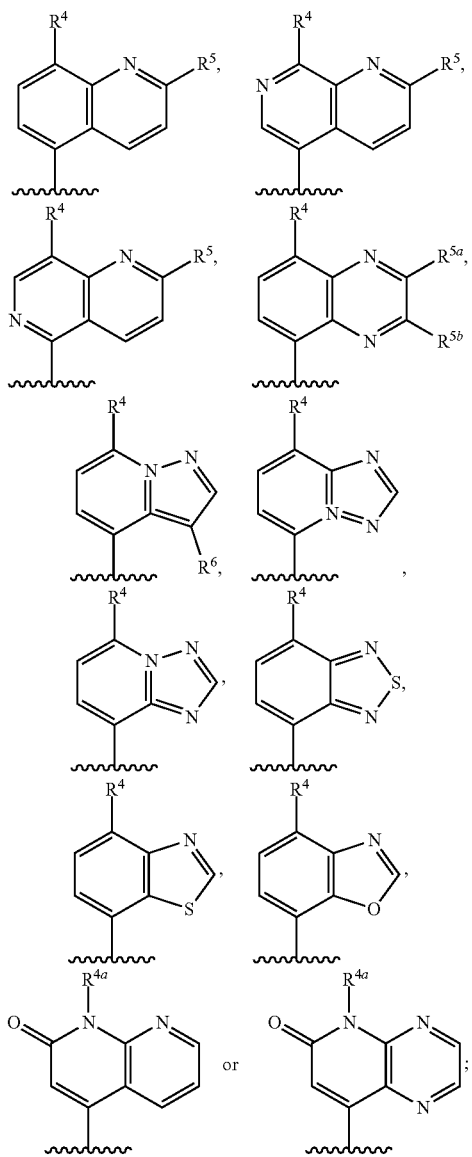

wherein $R^4$ is $C_{1-6}$alkyl, $C_{1-6}$alkoxy, halo$C_{1-6}$alkyl, halogen, nitro or cyano; $R^{4a}$ is $C_{1-6}$alkyl or $C_{3-7}$cycloalkyl;

$R^5$, $R^{5a}$ and $R^{5b}$ are independently selected from H and deuterium; $R^6$ is H or halogen;

$R^2$ is H or $C_{1-6}$alkyl;

$R^3$ is a 5-7 membered monocyclic aryl or heteroaryl; or a 7-12 membered bicyclic heterocyclyl;

X is CH and Y is N; or X is N and Y is CH;

or a pharmaceutically acceptable salt thereof.

Another object of the present invention is related to novel compounds of formula (I) or (Ia). Their manufacture, medicaments based on a compound in accordance with the invention and their production as well as the use of compounds of formula (I) or (Ia) as TLR7 and/or TLR8 and/or TLR9 antagonist, and for the treatment or prophylaxis of systemic lupus erythematosus or lupus nephritis. The compounds of formula (I) or (Ia) show superior TLR7 and TLR8 and TLR9 antagonism activity. In addition, the compounds of formula (I) or (Ia) also show good cytotoxicity, photo-toxicity, solubility, hPBMC, human microsome stability and SDPK profiles, as well as low CYP inhibition.

DETAILED DESCRIPTION OF THE INVENTION

Definitions

The term "$C_{1-6}$alkyl" denotes a saturated, linear or branched chain alkyl group containing 1 to 6, particularly 1 to 4 carbon atoms, for example methyl, ethyl, n-propyl, isopropyl, n-butyl, isobutyl, tert-butyl and the like. Particular "$C_{1-6}$alkyl" groups are methyl, ethyl and n-propyl.

The term "halogen" and "halo" are used interchangeably herein and denote fluoro, chloro, bromo, or iodo.

The term "aryl" denotes an aromatic hydrocarbon mono- or bicyclic ring system of 5 to 12 ring atoms. Examples of aryl include, but not limited to, phenyl and naphthyl. Aryl can be further substituted by substituents includes, but not limited to $C_{1-6}$alkyl; 3,4,4a,5,7,7a-hexahydro-2H-pyrrolo[3,4-b][1,4]oxazinyl; 1,4-diazepanyl; 2,6-diazaspiro[3.3]heptanyl substituted by $C_{1-6}$alkyl; 5-oxa-2,8-diazaspiro[3.5]nonanyl; amino-1,4-oxazepanyl; azetidinyl substituted by one or two substituents independently selected from amino and $C_{1-6}$alkyl; piperazinyl unsubstituted or substituted by $C_{1-6}$alkyl; and pyrrolidinyl substituted by one or two substituents independently selected from amino, $C_{1-6}$alkoxy and halogen.

The term "heteroaryl" denotes an aromatic heterocyclic mono- or bicyclic ring system of 5 to 12 ring atoms, comprising 1, 2, 3 or 4 heteroatoms selected from N, O and S, the remaining ring atoms being carbon. Examples of heteroaryl moieties include, but not limited to, pyrrolyl, furanyl, thienyl, imidazolyl, oxazolyl, thiazolyl, triazolyl, oxadiazolyl, thiadiazolyl, tetrazolyl, pyridinyl, pyrazinyl, pyrazolyl, pyridazinyl, pyrimidinyl, triazinyl, isoxazolyl, benzofuranyl, isothiazolyl, benzothienyl, indolyl, isoindolyl, isobenzofuranyl, benzimidazolyl, benzoxazolyl, benzoisoxazolyl, benzothiazolyl, benzoisothiazolyl, benzooxadiazolyl, benzothiadiazolyl, benzotriazolyl, purinyl, quinolinyl, isoquinolinyl, quinazolinyl or quinoxalinyl. Heteroaryl can be further substituted by substituents include, but not limited to $C_{1-6}$alkyl; 3,4,4a,5,7,7a-hexahydro-2H-pyrrolo[3,4-b][1,4]oxazinyl; 1,4-diazepanyl; 2,6-diazaspiro[3.3]heptanyl substituted by $C_{1-6}$alkyl; 5-oxa-2,8-diazaspiro[3.5]nonanyl; amino-1,4-oxazepanyl; azetidinyl substituted by one or two substituents independently selected from amino and $C_{1-6}$alkyl; piperazinyl unsubstituted or substituted by $C_{1-6}$alkyl; and pyrrolidinyl substituted by one or two substituents independently selected from amino, $C_{1-6}$alkoxy and halogen.

The term "heterocyclyl" or "heterocyclic" denotes a monovalent saturated or partly unsaturated mono or bicyclic ring system of 3 to 12 ring atoms, comprising 1 to 5 ring heteroatoms selected from N, O and S, the remaining ring atoms being carbon. In particular embodiments, heterocyclyl is a monovalent saturated monocyclic ring system of 4 to 7 ring atoms, comprising 1, 2, or 3 ring heteroatoms selected from N, O and S, the remaining ring atoms being carbon. Examples for monocyclic saturated heterocyclyl are aziridinyl, oxiranyl, azetidinyl, oxetanyl, pyrrolidinyl, tetrahydrofuranyl, tetrahydrothienyl, pyrazolidinyl, imidazolidinyl, oxazolidinyl, isoxazolidinyl, thiazolidinyl, piperidinyl, tetrahydropyranyl, tetrahydrothiopyranyl, piperazinyl, morpholinyl, thiomorpholinyl, 1,1-dioxo-thiomorpholin-4-yl, azepanyl, diazepanyl, homopiperazinyl, oxazepanyl. Examples for bicyclic saturated heterocyclic ring are azabicyclo[3.2.1]octyl, quinuclidinyl, oxaazabicyclo[3.2.1]octanyl, azabicyclo[3.3.1]nonanyl, oxaaza-bicyclo[3.3.1]nonanyl, azabicyclo[3.1.0]hexanyl, oxodiazaspiro[3.4]octanyl, acetyloxodiazaspiro[3.4]octanyl, thiaazabicyclo[3.3.1]nonanyl, oxoazaspiro[2.4]heptanyl, oxoazaspiro[3.4]octanyl, oxoazabicyclo[3.1.0]hexanyl and dioxotetrahydropyrrolo[1,2-a]pyrazinyl. Examples for bicyclic heterocyclyl include, but not limited to, 1,2,3,4-tetrahydroisoquinolinyl; 5,6,7,8-tetrahydro-1,6-naphthyridinyl; 5,6,7,8-tetrahydro-1,7-naphthyridinyl; 5,6,7,8-tetrahydro-2,6-naphthyridinyl; 5,6,7,8-tetrahydro-2,7-naphthyridinyl; isoindolinyl; 3,3a,4,5,6,6a-hexahydro-2H-pyrrolo[2,3-c]pyrrolyl; 9-oxa-3,7-diazabicyclo[3.3.1]nonanyl; 2,5-diazabicyclo[2.2.1]heptanyl; 1-oxa-4,9-diazaspiro[5.5]undecanyl; 2,6-diazaspiro[3.4]octanyl. Heterocyclyl can be further substituted by amino, hydroxy, $C_{1-6}$alkyl or $C_{1-6}$alkoxy.

The term "heteroaryloxy" denotes heteroaryl-O—.

The term "pharmaceutically acceptable salts" denotes salts which are not biologically or otherwise undesirable. Pharmaceutically acceptable salts include both acid and base addition salts.

The term "pharmaceutically acceptable acid addition salt" denotes those pharmaceutically acceptable salts formed with inorganic acids such as hydrochloric acid, hydrobromic acid, sulfuric acid, nitric acid, carbonic acid, phosphoric acid, and organic acids selected from aliphatic, cycloaliphatic, aromatic, araliphatic, heterocyclic, carboxylic, and sulfonic classes of organic acids such as formic acid, acetic acid, propionic acid, glycolic acid, gluconic acid, lactic acid, pyruvic acid, oxalic acid, malic acid, maleic acid, maloneic acid, succinic acid, fumaric acid, tartaric acid, citric acid, aspartic acid, ascorbic acid, glutamic acid, anthranilic acid, benzoic acid, cinnamic acid, mandelic acid, embonic acid, phenylacetic acid, methanesulfonic acid, ethanesulfonic acid, p-toluenesulfonic acid, and salicyclic acid.

The term "pharmaceutically acceptable base addition salt" denotes those pharmaceutically acceptable salts formed with an organic or inorganic base. Examples of acceptable inorganic bases include sodium, potassium, ammonium, calcium, magnesium, iron, zinc, copper, manganese, and aluminum salts. Salts derived from pharmaceutically acceptable organic nontoxic bases includes salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, 2-diethylaminoethanol, trimethamine, dicyclohexylamine, lysine, arginine, histidine, caffeine, procaine, hydrabamine, choline, betaine, ethylenediamine, glucosamine, methylglucamine, theobromine, purines, piperizine, piperidine, N-ethylpiperidine, and polyamine resins.

The term "A pharmaceutically active metabolite" denotes a pharmacologically active product produced through metabolism in the body of a specified compound or salt thereof. After entry into the body, most drugs are substrates for chemical reactions that may change their physical properties and biologic effects. These metabolic conversions, which usually affect the polarity of the compounds of the invention, alter the way in which drugs are distributed in and excreted from the body. However, in some cases, metabolism of a drug is required for therapeutic effect.

The term "therapeutically effective amount" denotes an amount of a compound or molecule of the present invention that, when administered to a subject, (i) treats or prevents the particular disease, condition or disorder, (ii) attenuates, ameliorates or eliminates one or more symptoms of the particular disease, condition, or disorder, or (iii) prevents or delays the onset of one or more symptoms of the particular disease, condition or disorder described herein. The therapeutically effective amount will vary depending on the compound, the disease state being treated, the severity of the disease treated, the age and relative health of the subject, the route and form of administration, the judgement of the attending medical or veterinary practitioner, and other factors.

The term "pharmaceutical composition" denotes a mixture or solution comprising a therapeutically effective amount of an active pharmaceutical ingredient together with pharmaceutically acceptable excipients to be administered to a mammal, e.g., a human in need thereof.

Antagonist of TLR7 and/or TLR8 and/or TLR9

The present invention relates to (i) a compound of formula (I), wherein

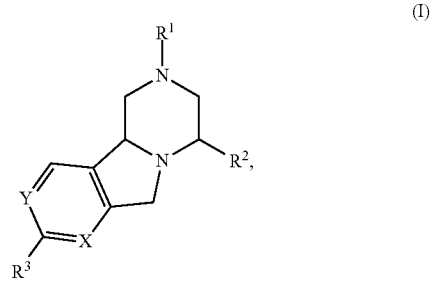

(I)

$R^1$ is

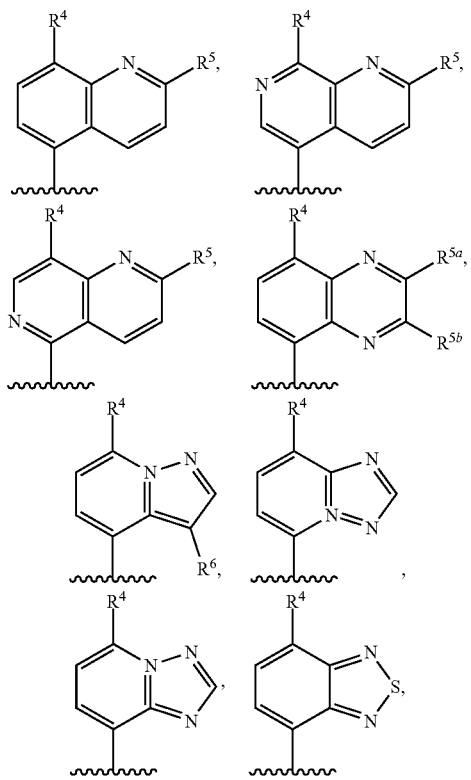

-continued

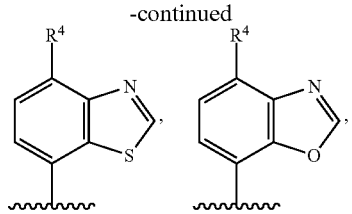

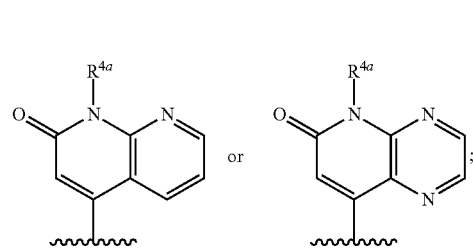

wherein R⁴ is $C_{1-6}$alkyl, $C_{1-6}$alkoxy, halo$C_{1-6}$alkyl, halogen, nitro or cyano; $R^{4a}$ is $C_{1-6}$alkyl or $C_{3-7}$cycloalkyl;

$R^5$, $R^{5a}$ and $R^{5b}$ are independently selected from H and deuterium; $R^6$ is H or halogen;

$R^2$ is H or $C_{1-6}$alkyl;

$R^3$ is a 5-7 membered monocyclic aryl or heteroaryl; heteroaryloxy or a 7-12 membered bicyclic heterocyclyl;

X is CH and Y is N; or X is N and Y is CH;

or a pharmaceutically acceptable salt thereof.

Further embodiment of present invention is (ii) a compound of formula (I) according to (i), wherein $R^1$ is

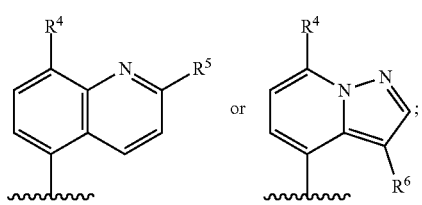

wherein $R^4$ is cyano; $R^5$ is H or deuterium; $R^6$ is H or halogen;

$R^2$ is H or $C_{1-6}$alkyl;

$R^3$ is 1,4-diazepanyl; 1-oxa-4,9-diazaspiro[5.5]undecanyl; 2,5-diazabicyclo[2.2.1]heptanyl; 2,6-diazaspiro[3.4]octanyl; 3,3a,4,5,6,6a-hexahydro-2H-pyrrolo[2,3-c]pyrrolyl; 9-oxa-3,7-diazabicyclo[3.3.1]nonanyl; amino($C_{1-6}$alkoxy)piperidinyl; amino($C_{1-6}$alkyl)piperidinyl; amino($C_{1-6}$alkyl)pyrrolidinyl; piperazinyl; piperidinyl; pyrrolidinyloxy or piperidinyloxy;

X is CH and Y is N; or X is N and Y is CH;

or a pharmaceutically acceptable salt thereof.

Another embodiment of present invention is (iii) a compound of formula (Ia), (Ia)

wherein
$R^1$ is

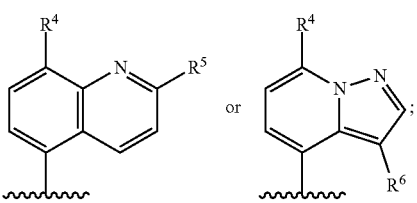

wherein $R^4$ is cyano; $R^5$ is H or deuterium; $R^6$ is H or halogen;

$R^2$ is H or $C_{1-6}$alkyl;

$R^3$ is 1,4-diazepanyl; 1-oxa-4,9-diazaspiro[5.5]undecanyl; 2,5-diazabicyclo[2.2.1]heptanyl; 2,6-diazaspiro[3.4]octanyl; 3,3a,4,5,6,6a-hexahydro-2H-pyrrolo[2,3-c]pyrrolyl; 9-oxa-3,7-diazabicyclo[3.3.1]nonanyl; amino($C_{1-6}$alkoxy)piperidinyl; amino($C_{1-6}$alkyl)piperidinyl; amino($C_{1-6}$alkyl)pyrrolidinyl; piperazinyl; piperidinyl; pyrrolidinyloxy or piperidinyloxy;

X is CH and Y is N; or X is N and Y is CH;

or a pharmaceutically acceptable salt thereof.

A further embodiment of present invention is (iv) a compound of formula (I) or (Ia), or a pharmaceutically acceptable salt thereof, according to any one of (i) to (iii), wherein $R^1$ is

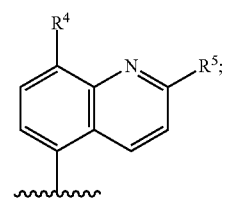

wherein $R^4$ is cyano; $R^5$ is H or deuterium.

A further embodiment of present invention is (v) a compound of formula (I) or (Ia) according to any one of (i) to (iv), wherein $R^2$ is $C_{1-6}$alkyl.

A further embodiment of present invention is (vi) a compound of formula (I) or (Ia), or a pharmaceutically acceptable salt thereof, according to any one of (i) to (v), wherein $R^2$ is methyl.

A further embodiment of present invention is (vii) a compound of formula (I) or (Ia), or a pharmaceutically acceptable salt thereof, according to any one of (i) to (vi), wherein $R^3$ is 2,5-diazabicyclo[2.2.1]heptanyl; amino($C_{1-6}$alkyl)pyrrolidinyl; amino($C_{1-6}$alkyl)pyrrolidinyl; pyrrolidinyloxy; piperidinyloxy or 9-oxa-3,7-diazabicyclo[3.3.1]nonanyl.

A further embodiment of present invention is (viii) a compound of formula (I) or (Ta), or a pharmaceutically acceptable salt thereof, according to any one of (i) to (vii), wherein R³ is 2,5-diazabicyclo[2.2.1]heptan-2-yl; 3-amino-3-methyl-pyrrolidin-1-yl; 3-amino-3-methyl-pyrrolidin-1-yl; pyrrolidin-3-yloxy; 4-piperidinyloxy or 9-oxa-3,7-diazabicyclo[3.3.1]nonan-3-yl.

A further embodiment of present invention is (ix) a compound of formula (I) or (Ta), or a pharmaceutically acceptable salt thereof, according to any one of (i) to (viii), wherein X is N and Y is CH.

A further embodiment of present invention is (x) a compound of formula (I) or (Ta), or a pharmaceutically acceptable salt thereof, according to any one of (i) to (ix), wherein R¹ is

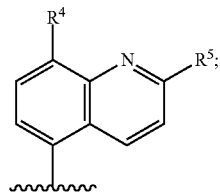

wherein R⁴ is cyano; R⁵ is H or deuterium;
R² is C$_{1-6}$alkyl;
R³ is 2,5-diazabicyclo[2.2.1]heptanyl; amino(C$_{1-6}$alkyl)pyrrolidinyl; amino(C$_{1-6}$alkyl)pyrrolidinyl; pyrrolidinyloxy; piperidinyloxy or 9-oxa-3,7-diazabicyclo[3.3.1]nonanyl;
X is N;
Y is CH;
or a pharmaceutically acceptable salt thereof.

A further embodiment of present invention is (xi) a compound of formula (I) or (Ia), or a pharmaceutically acceptable salt thereof, according to any one of (i) to (x), wherein
R¹ is

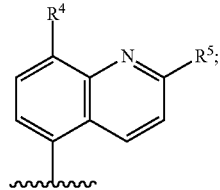

wherein R⁴ is cyano; R⁵ is H or deuterium;
R² is methyl;
R³ is 2,5-diazabicyclo[2.2.1]heptan-2-yl; 3-amino-3-methyl-pyrrolidin-1-yl; 3-amino-3-methyl-pyrrolidin-1-yl; pyrrolidin-3-yloxy; 4-piperidinyloxy or 9-oxa-3,7-diazabicyclo[3.3.1]nonan-3-yl;
X is N;
Y is CH;
or a pharmaceutically acceptable salt thereof.

Another embodiment of present invention is a compound of formula (I) or (Ia) selected from the following:
5-(11-Piperazin-1-yl-4,7,12-triazatricyclo[7.4.0.02,7]trideca-1(9),10,12-trien-4-yl)quinoline-8-carbonitrile;
5-[(2S,6R)-6-methyl-11-piperazin-1-yl-4,7,12-triazatricyclo[7.4.0.02,7]trideca-1(9),10,12-trien-4-yl] quinoline-8-carbonitrile;
5-[(2R)-11-piperazin-1-yl-4,7,10-triazatricyclo[7.4.0.02,7]trideca-1(9),10,12-trien-4-yl]quinoline-8-carbonitrile;
5-[(2S)-11-piperazin-1-yl-4,7,10-triazatricyclo[7.4.0.02,7]trideca-1(9),10,12-trien-4-yl]quinoline-8-carbonitrile;
5-[(2R)-11-(4-amino-4-methyl-1-piperidyl)-4,7,10-triazatricyclo[7.4.0.02,7]trideca-1(9),10,12-trien-4-yl]quinoline-8-carbonitrile;
5-[(2S)-11-(4-amino-4-methyl-1-piperidyl)-4,7,10-triazatricyclo[7.4.0.02,7]trideca-1(9),10,12-trien-4-yl]quinoline-8-carbonitrile;
5-[(2S,6R)-6-methyl-11-piperazin-1-yl-4,7,10-triazatricyclo[7.4.0.02,7]trideca-1(9),10,12-trien-4-yl]quinoline-8-carbonitrile;
5-[(2S,6R)-6-methyl-11-(9-oxa-3,7-diazabicyclo[3.3.1]nonan-3-yl)-4,7,10-triazatricyclo[7.4.0.02,7]trideca-1(9),10,12-trien-4-yl]quinoline-8-carbonitrile;
5-[(2S,6R)-11-[(3R)-3-amino-3-methyl-pyrrolidin-1-yl]-6-methyl-4,7,10-triazatricyclo[7.4.0.02,7]trideca-1(9),10,12-trien-4-yl]-2-deuterio-quinoline-8-carbonitrile;
5-[(2S,6R)-11-[(3S)-3-amino-3-methyl-pyrrolidin-1-yl]-6-methyl-4,7,10-triazatricyclo[7.4.0.02,7]trideca-1(9),10,12-trien-4-yl]-2-deuterio-quinoline-8-carbonitrile;
2-Deuterio-5-[(2S,6R)-11-(2,6-diazaspiro[3.4]octan-6-yl)-6-methyl-4,7,10-triazatricyclo[7.4.0.02,7]trideca-1(9),10,12-trien-4-yl]quinoline-8-carbonitrile;
5-[(2S,6R)-11-[(3aS,6aS)-3,3a,4,5,6,6a-hexahydro-2H-pyrrolo[2,3-c]pyrrol-1-yl]-6-methyl-4,7,10-triazatricyclo[7.4.0.02,7]trideca-1(9),10,12-trien-4-yl]-2-deuterio-quinoline-8-carbonitrile;
5-[(2S,6R)-11-[(3R,4R)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile;
5-[(2S,6R)-11-[(3S,4S)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile;
5-[(2S,6R)-11-[(3R,4S)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile;
5-[(2S,6R)-11-[(3S,4S)-3-amino-4-methoxy-1-piperidyl]-6-methyl-4,7,10-triazatricyclo[7.4.0.02,7]trideca-1(9),10,12-trien-4-yl]-2-deuterio-quinoline-8-carbonitrile;
5-[(2S,6R)-11-[(3R,4R)-3-amino-4-methoxy-1-piperidyl]-6-methyl-4,7,10-triazatricyclo[7.4.0.02,7]trideca-1(9),10,12-trien-4-yl]-2-deuterio-quinoline-8-carbonitrile;
2-Deuterio-5-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]quinoline-8-carbonitrile;
2-Deuterio-5-[(2S,6R)-11-[(1R,4R)-2,5-diazabicyclo[2.2.1]heptan-2-yl]-6-methyl-4,7,10-triazatricyclo[7.4.0.02,7]trideca-1(9),10,12-trien-4-yl]quinoline-8-carbonitrile;
2-Deuterio-5-[(2S,6R)-6-methyl-11-(1-oxa-4,9-diazaspiro[5.5]undecan-9-yl)-4,7,10-triazatricyclo[7.4.0.02,7]trideca-1(9),10,12-trien-4-yl]quinoline-8-carbonitrile;
5-[(2S,6R)-11-(4-amino-4-methyl-1-piperidyl)-6-methyl-4,7,10-triazatricyclo[7.4.0.02,7]trideca-1(9),10,12-trien-4-yl]-2-deuterio-quinoline-8-carbonitrile;
5-[(2S,6R)-11-(1,4-diazepan-1-yl)-6-methyl-4,7,10-triazatricyclo[7.4.0.02,7]trideca-1(9),10,12-trien-4-yl]quinoline-8-carbonitrile;
4-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]pyrazolo[1,5-a]pyridine-7-carbonitrile;
4-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]pyrazolo[1,5-a]pyridine-7-carbonitrile;

2-Deuterio-5-[(2S,6R)-6-methyl-11-(4-piperidyl)-4,7,10-triazatricyclo[7.4.0.0²,⁷]trideca-1(9),10,12-trien-4-yl]quinoline-8-carbonitrile;

2-Deuterio-5-[(2S,6R)-6-methyl-11-(4-piperidyloxy)-4,7,10-triazatricyclo[7.4.0.0²,⁷]trideca-1(9),10,12-trien-4-yl]quinoline-8-carbonitrile; and 2-Deuterio-5-[(2S,6R)-6-methyl-11-[(3S)-pyrrolidin-3-yl]oxy-4,7,10-triazatricyclo[7.4.0.0²,⁷]trideca-1(9),10,12-trien-4-yl]quinoline-8-carbonitrile;

or a pharmaceutically acceptable salt thereof.

Synthesis

The compounds of the present invention can be prepared by any conventional means. Suitable processes for synthesizing these compounds as well as their starting materials are provided in the schemes below and in the examples. All substituents, in particular, $R^1$ to $R^3$, X and Y are as defined above unless otherwise indicated. Furthermore, and unless explicitly otherwise stated, all reactions, reaction conditions, abbreviations and symbols have the meanings well known to a person of ordinary skill in organic chemistry.

General synthetic routes for preparing the compound of formula(I) is shown below.

Scheme 1

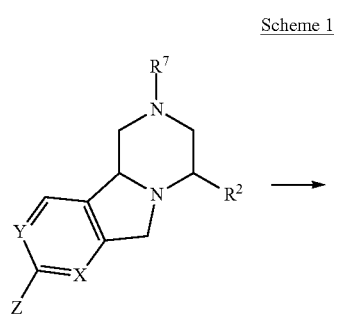

II

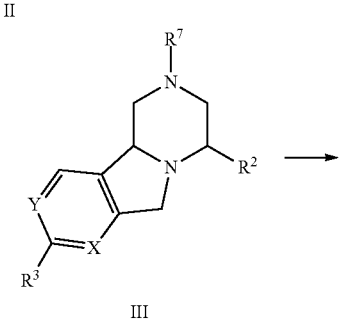

III

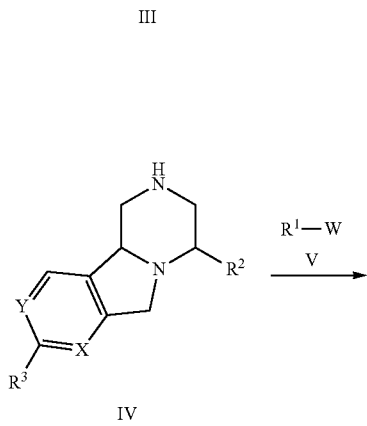

IV

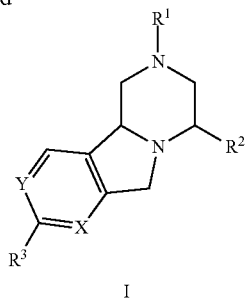

I wherein W and Z are halogen or leaving group, for example, OTf or OMs; X is CH and Y is N, or X is N and Y is CH; $R^7$ is a protecting group, for example, Boc or benzyl.

Compound of formula (II) can be used as a common intermediate for further functionalization to get compound of formula (III) under metal catalyzed coupling conditions, such as Buchwald-Hartwig amination, Suzuki coupling, Negishi coupling, Stille coupling, or Pd-catalyzed C═O insertion. For example, under Buchwald-Hartwig amination conditions (ref: *Acc. Chem. Res.* 1998, 31, 805-818; *Chem. Rev.* 2016, 116, 12564-12649; *Topics in Current Chemistry*, 2002, 219, 131-209; and references cited therein) with a catalyst, such as Ruphos Pd-G2, and a base, such as $Cs_2CO_3$. After selective deprotection of $R^7$ group under typical conditions (e.g. removal of benzyl protecting group by hydrogenation over catalytic amount of Palladium on carbon), the resulting compound of formula (IV) can be submitted to nucleophilic aromatic substitution conditions (e.g. heating with halide (V) in the presence of DIEPA in DMSO), or Buchwald-Hartwig amination conditions (e.g. heating with halide (V) in the presence of a catalyst, such as Ruphos Pd-G2, and a base, such as $Cs_2CO_3$, to afford compound of formula (I) or (Ia). In some embodiment, the compound of formula (IV) may contain a protecting group, e.g. Boc, which will be removed before affording the final compound of formula (I) or (Ia).

Scheme 2

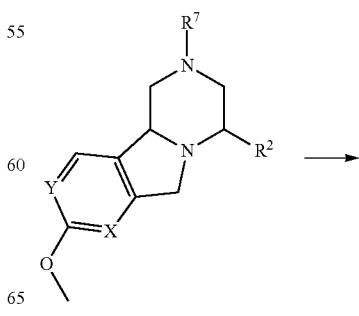

VI

-continued

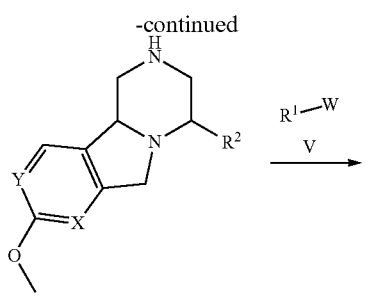

VII

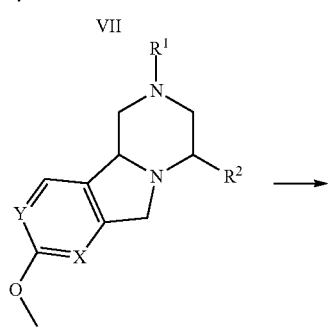

VIII

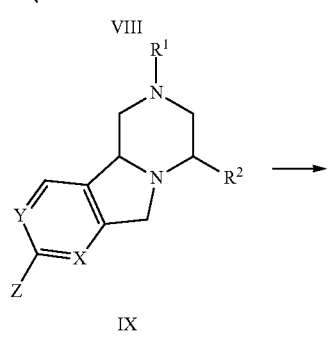

IX

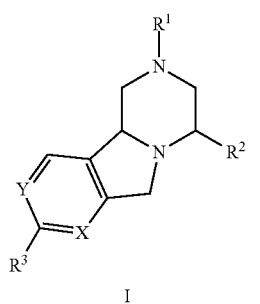

I

Alternatively, as shown in Scheme 2, after $R^7$ is removed from compound of formula (VI) by selective deprotection, the resulting compound of formula (VII) can react with halide (V) to afford compound of formula (VIII) by nucleophilic aromatic substitution in the presence of a base, such as DIEPA, or Buchwald-Hartwig amination conditions (e.g. heating with halide (V) in the presence of a catalyst, such as Ruphos Pd-G2, and a base, such as $Cs_2CO_3$. Compound of formula (VIII) can be converted to compound of formula (IX) by functional group transformation, such as heating with $POCl_3$ in the presence of trimethylamine hydrochloride overnight. Compound of formula (I) or (Ia) can be obtained from compound of formula (IX) via metal catalyzed coupling conditions: Buchwald-Hartwig amination with amine $HR^3$ in the presence of a catalyst, such as Ruphos Pd-G2, and a base, such as $Cs_2CO_3$; Suzuki coupling with $R^3$-boronic acid, $R^3$-boronic ester, in the presence of a palladium catalyst, such as tetrakis(triphenylphosphine)palladium(0) or [1,1'-bis(diphenylphosphino)ferrocene]dichloropalladium (II), complex with dichloromethane and a base, such as potassium carbonate in solvent; Stille coupling with organotin reagent, in the presence of a palladium(0) catalyst, such as tetrakis(triphenylphosphine)palladium(0); or Negishi coupling with organozinc reagent in the presence of a palladium(0) catalyst, such as tetrakis(triphenylphosphine)palladium(0) or [1,1'-bis(diphenylphosphino)ferrocene]dichloropalladium (II). In some embodiment, a protecting group, e.g. Boc, will be removed before affording the final compound of formula (I) or (Ia).

Compounds of formula (Ia) can be synthesized according to Scheme 1 or 2 using chiral starting materials.

Compounds of this invention can be obtained as mixtures of diastereomers or enantiomers, which can be separated by methods well known in the art, e.g. (chiral) HPLC or SFC.

This invention also relates to a process for the preparation of a compound of formula (I) or (Ia) comprising any one of the following steps:

a) Buchwald-Hartwig amination reaction or nucleophilic substitution between compound of formula (IV),

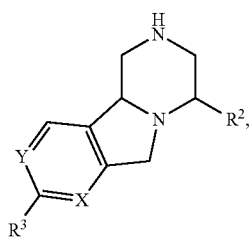

(IV)

and compound of formula (V), $$R^1\text{—W} \quad \quad (V);$$

b) Buchwald-Hartwig amination reaction between compound of formula (IX),

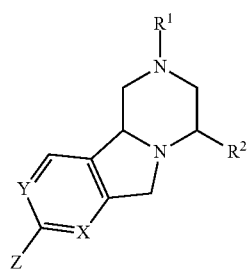

(IX)

and amine $HR^3$; or Suzuki coupling reaction between compound of formula (IX) and $R^3$-boronic acid or $R^3$-boronic ester;

wherein $R^1$ to $R^3$ are defined as above; X is CH and Y is N, or X is N and Y is CH; W and Z are halogen or leaving group.

Compound of formula (Ia) can also be synthesized according to Scheme 1 and 2 by using chiral intermediates.

A compound of formula (I) or (Ia) when manufactured according to the above process is also an object of the invention.

Indications and Methods of Treatment

The present invention provides compounds that can be used as TLR7 and/or TLR8 and/or TLR9 antagonist, which inhibits pathway activation through TLR7 and/or TLR8 and/or TLR9 as well as respective downstream biological events including, but not limited to, innate and adaptive immune responses mediated through the production of all types of cytokines and all forms of auto-antibodies. Accordingly, the compounds of the invention are useful for blocking TLR7 and/or TLR8 and/or TLR9 in all types of cells that express such receptor(s) including, but not limited to, plasmacytoid dendritic cell, B cell, T cell, macrophage, monocyte, neutrophil, keratinocyte, epithelial cell. As such, the compounds can be used as a therapeutic or prophylactic agent for systemic lupus erythematosus and lupus nephritis.

The present invention provides methods for treatment or prophylaxis of systemic lupus erythematosus and lupus nephritis in a patient in need thereof.

Another embodiment includes a method of treating or preventing systemic lupus erythematosus and lupus nephritis in a mammal in need of such treatment, wherein the method comprises administering to said mammal a therapeutically effective amount of a compound of formula (I), a stereoisomer, tautomer, prodrug or pharmaceutically acceptable salt thereof.

EXAMPLES

The invention will be more fully understood by reference to the following examples. They should not, however, be construed as limiting the scope of the invention.

Abbreviations

The invention will be more fully understood by reference to the following examples. They should not, however, be construed as limiting the scope of the invention.

Abbreviations used herein are as follows:
ACN: acetonitrile
DCM: dichloromethane
DCE: dichloroethane
DIPEA or DIEA: N,N-diisopropylethylamine
DMF: N,N-Dimethylformamide
EA or EtOAc: ethyl acetate
FA: formic acid
HATU: 1-[Bis(dimethylamino)methylene]-1H-1,2,3-triazolo[4,5-b]pyridinium 3-oxid hexafluorophosphate
$IC_{50}$: half inhibition concentration
IPA: isopropanol
MS: mass spectrometry
prep-HPLC: preparative high performance liquid chromatography
prep-TLC: preparative thin layer chromatography
RuPhos Pd G2: chloro(2-dicyclohexylphosphino-2',6'-diisopropoxy-1,1'-biphenyl)[2-(2'-amino-1,1'-biphenyl)]palladium(II) 2nd generation
Selectfluor 1-chloromethyl-4-fluoro-1,4-diazoniabicyclo[2.2.2]octane bis(tetrafluoroborate)
SFC: supercritical fluid chromatography
TEA: trimethylamine
TFA: trifluoroacetic acid
THF: tetrahydrofuran
XantPhos: 4,5-bis(diphenylphosphino)-9,9-dimethylxanthene
v/v volume ratio General Experimental Conditions Intermediates and final compounds were purified by flash chromatography using one of the following instruments: i) Biotage SP1 system and the Quad 12/25 Cartridge module. ii) ISCO combi-flash chromatography instrument. Silica gel brand and pore size: i) KP-SIL 60 Å, particle size: 40-60 μm; ii) CAS registry NO: Silica Gel: 63231-67-4, particle size: 47-60 micron silica gel; iii) ZCX from Qingdao Haiyang Chemical Co., Ltd, pore: 200-300 or 300-400.

Intermediates and final compounds were purified by preparative HPLC on reversed phase column using XBridge™ Prep-C18 (5 μm, OBD™ 30×100 mm) column, SunFire™ Prep-C18 (5 μm, OBD™ 30×100 mm) column, Phenomenex Synergi-C18 (10 μm, 25×150 mm) or Phenomenex Gemini-C18 (10 μm, 25×150 mm). Waters AutoP purification System (Sample Manager 2767, Pump 2525, Detector: Micromass ZQ and UV 2487, solvent system: acetonitrile and 0.1% ammonium hydroxide in water; acetonitrile and 0.1% FA in water or acetonitrile and 0.1% TFA in water). Or Gilson-281 purification System (Pump 322, Detector: UV 156, solvent system: acetonitrile and 0.05% ammonium hydroxide in water; acetonitrile and 0.225% FA in water; acetonitrile and 0.05% HCl in water; acetonitrile and 0.075% TFA in water; or acetonitrile and water).

For SFC chiral separation, intermediates were separated by chiral column (Daicel chiralpak IC, 5 μm, 30×250 mm), AS (10 μm, 30×250 mm) or AD (10 μm, 30×250 mm) using Mettler Toledo Multigram III system SFC, Waters 80Q preparative SFC or Thar 80 preparative SFC, solvent system: $CO_2$ and IPA (0.5% TEA in IPA) or $CO_2$ and MeOH (0.1% $NH_3$—$H_2O$ in MeOH), back pressure 100 bar, detection UV@ 254 or 220 nm.

LC/MS spectra of compounds were obtained using a LC/MS (Waters™ Alliance 2795-Micromass ZQ, Shimadzu Alliance 2020-Micromass ZQ or Agilent Alliance 6110-Micromass ZQ), LC/MS conditions were as follows (running time 3 or 1.5 mins):

Acidic condition I: A: 0.1% TFA in $H_2O$; B: 0.1% TFA in acetonitrile;

Acidic condition II: A: 0.0375% TFA in $H_2O$; B: 0.01875% TFA in acetonitrile;

Basic condition I: A: 0.1% $NH_3$—$H_2O$ in $H_2O$; B: acetonitrile;

Basic condition II: A: 0.025% $NH_3$—$H_2O$ in $H_2O$; B: acetonitrile;

Neutral condition: A: $H_2O$; B: acetonitrile.

Mass spectra (MS): generally only ions which indicate the parent mass are reported, and unless otherwise stated the mass ion quoted is the positive mass ion $(MH)^+$.

NMR Spectra were obtained using Bruker Avance 400 MHz.

The microwave assisted reactions were carried out in a Biotage Initiator Sixty microwave synthesizer. All reactions involving air-sensitive reagents were performed under an argon or nitrogen atmosphere. Reagents were used as received from commercial suppliers without further purification unless otherwise noted.

PREPARATIVE EXAMPLES

The following examples are intended to illustrate the meaning of the present invention but should by no means represent a limitation within the meaning of the present invention:

Intermediate A1

5-Fluoroquinoline-8-carbonitrile

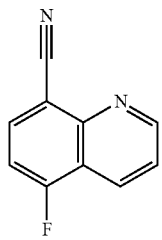 [SMILES: N#Cc1ccc(F)c2cccnc12]

The titled compound was synthesized according to the following scheme:

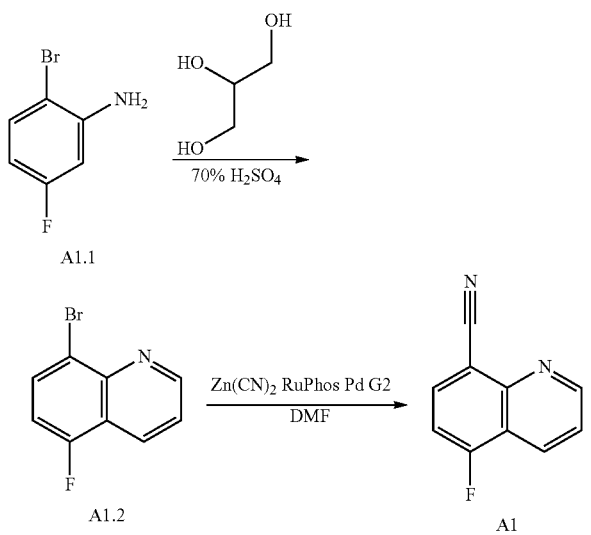

Step (a): preparation of 8-bromo-5-fluoro-quinoline (compound A1.2)

In a 100 mL pear-shaped flask, 2-bromo-5-fluoroaniline (compound A1.1, 2.0 g, 10.5 mmol), propane-1,2,3-triol (969 mg, 10.5 mmol) and sodium 3-nitrobenzenesulfonate (2.4 g, 10.5 mmol) were combined with 70% $H_2SO_4$ (20 mL) to afford a dark brown solution, which was heated to 150° C. and stirred for 3 hrs. After being cooled to room temperature, the reaction mixture was poured into ice-water, and neutralized with sodium hydroxide solution. The resultant mixture was filtered. The filter cake was dissolved in EtOAc and filtered. The resultant filtrate was concentrated in vacuo. The crude material was purified by flash chromatography (silica gel, 40 g, 0% to 30% EtOAc in PE) to afford compound A1.2 (2.0 g, 84% yield). MS: calc'd 226 and 228 [(M+H)$^+$], measured 226 and 228 [(M+H)$^+$].

Step (b): preparation of 5-fluoroquinoline-8-carbonitrile (Intermediate A1)

To a solution of 8-bromo-5-fluoroquinoline (compound A1.2, 4.9 g, 21.7 mmol) in DMF (30 mL) was added dicyanozinc (5.0 g, 43.4 mmol) and RuPhos Pd G2 (CAS: 1375325-68-0, Sigma-Aldrich, Catalog: 753246, 842 mg, 1.1 mmol). The reaction mixture was stirred at 100° C. for 3 hrs, then cooled to room temperature. The reaction mixture was filtered and the filtrate was diluted with water (50 ml), then extracted with EA (80 mL) for three times. The combined organic layer was washed with brine, dried over $Na_2SO_4$, filtered and concentrated in vacuo. The residue was purified by flash chromatography (silica gel, 40 g, 0% to 70% EtOAc in PE) to afford Intermediate A1 (3.0 g, 80% yield). MS: calc'd 173 [(M+H)$^+$], measured 173 [(M+H)$^+$]. $^1$H NMR (400 MHz, METHANOL-d$_4$) δ ppm 9.11 (dd, J=4.28, 1.71 Hz, 1H), 8.64 (dd, J=8.56, 1.71 Hz, 1H), 8.29 (dd, J=8.19, 5.62 Hz, 1H), 7.76 (dd, J=8.56, 4.28 Hz, 1H), 7.49 (dd, J=9.35, 8.25 Hz, 1H).

Intermediate A2

2-Deuterio-5-fluoro-quinoline-8-carbonitrile

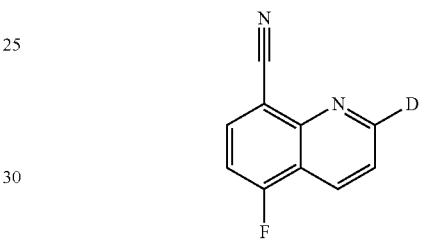

The titled compound was synthesized according to the following scheme:

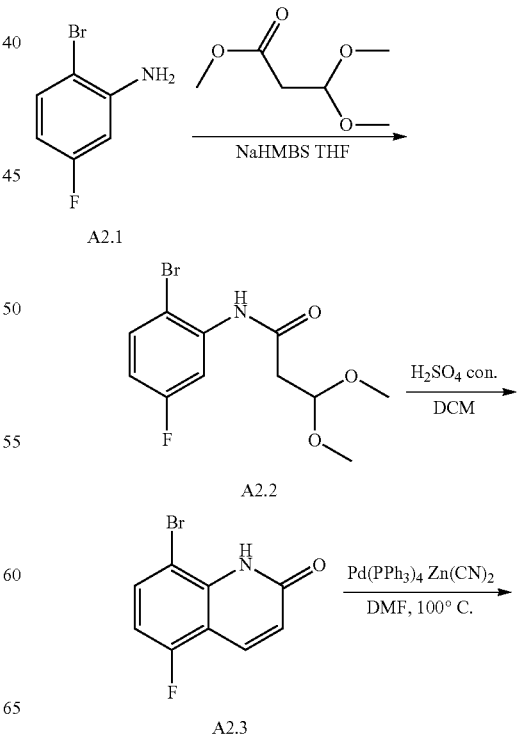

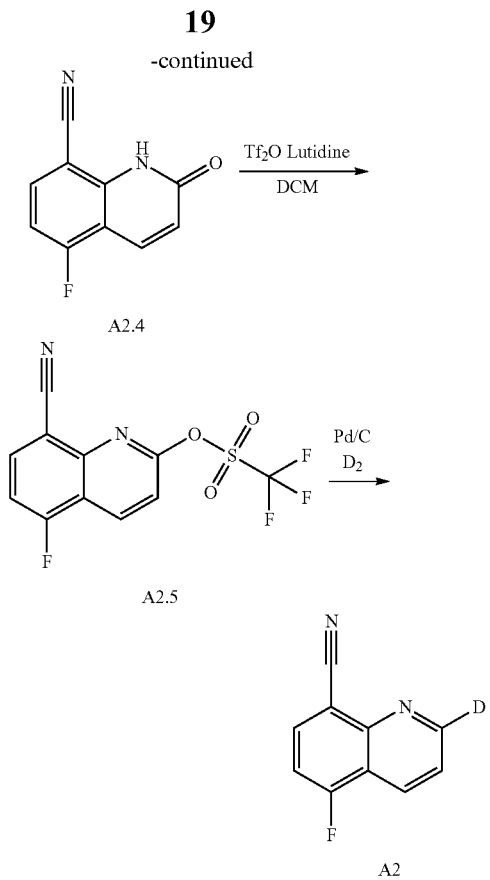

Step (a): Preparation of N-(2-bromo-5-fluoro-phenyl)-3,3-dimethoxy-propanamide (compound A2.2)

To a solution of 2-bromo-5-fluoroaniline (compound A2.1, 50 g, 263 mmol) and methyl 3,3-dimethoxypropionate (45 mL, 316 mmol) in THF (150 mL) was added NaHMDS in THF (1N, 394 mL, 394 mmol) dropwise at 0° C. The resultant mixture was stirred at 0° C. for 10 minutes, and then it was warmed up to 15° C. and stirred for 18 hrs. The reaction was quenched with sat. aqueous solution of NH$_4$Cl and concentrated to about 300 mL. The resultant mixture was diluted with water and extracted with EtOAc. The organic layer was dried over Na$_2$SO$_4$ and concentrated to afford compound A2.2 (100 g, 90% yield). MS: calc'd 306 [(M+H)$^+$], measured 306 [(M+H)$^+$].

Step (b): Preparation of 8-bromo-5-fluoro-1H-quinolin-2-one (compound A2.3)

A solution of N-(2-bromo-5-fluoro-phenyl)-3,3-dimethoxy-propanamide (compound A2.2, 100 g, 238 mmol) in DCM (500 mL) was added to concentrated sulfuric acid (300 mL) at 0° C. The mixture was stirred at 15° C. for 2 hrs, then poured slowly into 2000 mL ice-water, and a yellow precipitate appeared. The mixture was filtered, and the wet-cake was washed with 500 mL water, 200 mL isopropyl alcohol and 300 mL PE. The solid was collected and dried in vacuum to afford compound A2.3 (50 g, 86.5% yield). MS: calc'd 242 [(M+H)$^+$], measured 242 [(M+H)$^+$].

Step (c): Preparation of 5-fluoro-2-oxo-1H-quinoline-8-carbonitrile (compound A2.4)

A solution of 8-bromo-5-fluoro-1H-quinolin-2-one (compound A2.3, 50 g, 206 mmol), zinc cyanide (4820 mg, 412 mmol), Pd(PPh$_3$)$_4$ (2428 mg, 21 mmol) in DMF (30 mL) was stirred at 120° C. for 5 hrs. After being cooled to room temperature, the reaction was quenched with water (300 mL) and extracted with EA (100 mL) for three times. The combined organic layer was washed with brine, dried over Na$_2$SO$_4$, filtered and concentrated in vacuo. The residue was purified by flash chromatography to afford compound A2.4 (29 g, 74.5% yield). MS: calc'd 189 [(M+H)$^+$], measured 189 [(M+H)$^+$].

Step (d): Preparation of (8-cyano-5-fluoro-2-quinolyl) trifluoromethanesulfonate (compound A2.5)

To a solution of 5-fluoro-2-oxo-1H-quinoline-8-carbonitrile (compound A2.4, 17 g, 90 mmol) and 2,6-dimethylpyridine (39 g, 361 mmol) in DCM (500 mL) was added dropwise trifluoromethanesulfonic anhydride (51 g, 181 mmol) at 0° C. The reaction mixture was stirred at 0° C. for 1 hr, and then the reaction mixture was diluted with water, extracted with DCM. The organic layer was concentrated in vacuo. The residue was purified by flash column to give compound A2.5 (23.0 g, 80% yield). MS: calc'd 321 [(M+H)$^+$], measured 321 [(M+H)$^+$].

Step (e): Preparation of 2-deuterio-5-fluoro-quinoline-8-carbonitrile (Intermediate A2)

To a solution of (8-cyano-5-fluoro-2-quinolyl) trifluoromethanesulfonate (compound A2.5, 23 g, 72 mmol) in THF (230 mL) and deuterium oxide (100 mL) was added potassium carbonate (20 g, 144 mmol) and Pd/C (6 g). The mixture was stirred at 40° C. for 5 hrs under deuterium atmosphere (balloon). The reaction was filtered through Celite, washed with DCM and the filtrate was concentrated in vacuo. The residue was purified by flash column to afford Intermediate A2 (11 g, 87.8% yield). MS: calc'd 174 [(M+H)$^+$], measured 174 [(M+H)$^+$].

Intermediate A3

4-Fluoropyrazolo[1,5-a]pyridine-7-carbonitrile

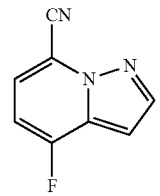 [SMILES: N#Cc1ccc(F)c2ccnn12]

The titled compound was synthesized according to the following scheme:

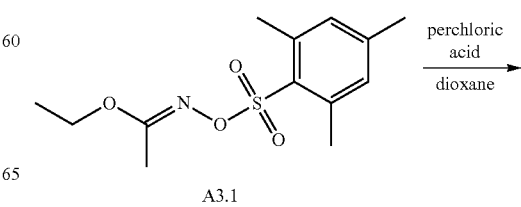

A3.1

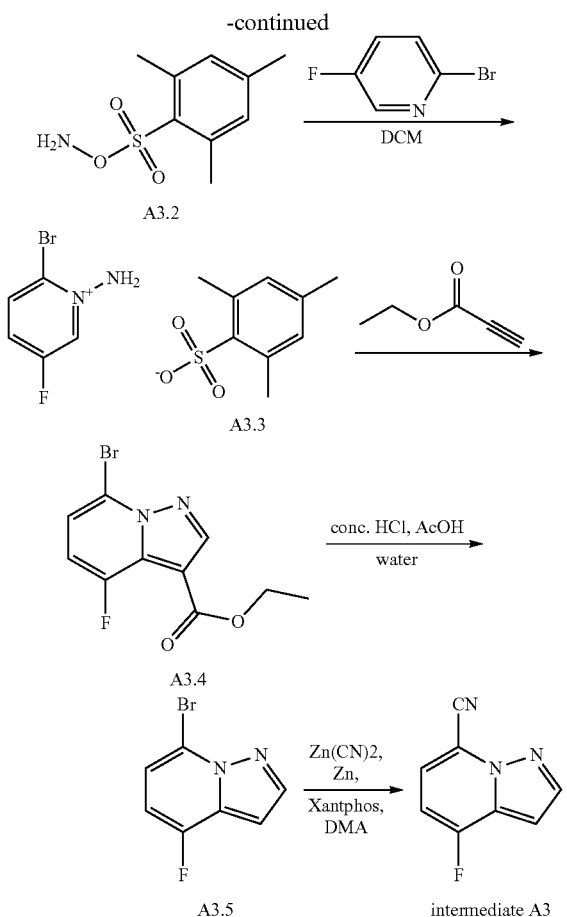

Step (a): preparation of amino 2,4,6-trimethylbenzenesulfonate (compound A3.2)

A solution of ethyl (1E)-N-(2,4,6-trimethylphenyl)sulfonyloxyethanimidate (compound A3.1, CAS: 38202-27-6, Bide Pharmatech, Catalog: BD129455, 200 g, 700 mmol) in 1,4-dioxane (500 mL) was added perchloric acid (110 mL) dropwise in 30 min and stirred for 1 hr at 0° C. 1000 mL ice-water was added and the mixture was filtered. The filter cake was dissolved in 1.5 L EtOAc, then stirred for 30 minutes. The organic layer was concentrated (keep the temperature below 25° C.) to afford crude product. The crude product was recrystallized (petroleum/EtOAc=10/1) to afford compound A3.2 (110 g, 73% yield). MS: calc'd 216 [(M+H)$^+$], measured 216 [(M+H)$^+$].

Step (b): preparation of 2-bromo-5-fluoro-pyridin-1-ium-1-amine;2,4,6-trimethylbenzenesulfonate (compound A3.3)

A solution of amino 2,4,6-trimethylbenzenesulfonate (compound A3.2, 110 g, 511 mmol) and 2-bromo-5-fluoro-pyridine (60 g, 341 mmol) in DCM (1800 mL) was stirred at 10° C. for 18 hrs. The mixture was concentrated, the residue was recrystallized in EtOAc to afford compound A3.3 (90 g, 92% yield). MS: calc'd 191 [(M+H)$^+$], measured 191 [(M+H)$^+$].

Step (c): preparation of ethyl 7-bromo-4-fluoro-pyrazolo[1,5-a]pyridine-3-carboxylate (compound A3.4)

A solution of 2-bromo-5-fluoro-pyridin-1-ium-1-amine; 2,4,6-trimethylbenzenesulfonate (compound A3.3, 90 g, 230 mmol), K$_2$CO$_3$ (64 g, 460 mmol) and ethyl propiolate (28 mL, 276 mmol) in DMF (1300 mL) was stirred at 10° C. for 18 hrs. The reaction was diluted with water, extracted with EtOAc. The organic layer was dried over Na$_2$SO$_4$, filtered and the filtrate was concentrated in vacuo. The residue was purified by chromatography column to afford compound A3.4 (11 g, 16.7% yield). MS: calc'd 287 [(M+H)$^+$], measured 287 [(M+H)$^+$].

Step (d): preparation of 7-bromo-4-fluoropyrazolo[1,5-a]pyridine (compound A3.5)

To a mixture of ethyl 7-bromo-4-fluoro-pyrazolo[1,5-a]pyridine-3-carboxylate (compound A3.4, 8.0 g, 26.7 mmol) in acetic acid (48 mL) and water (48 mL) was added conc. HCl (36 mL, 432 mmol). The mixture was stirred at 100° C. for 18 hrs, then diluted with water (200 mL), basified with aq. NaOH (1N) to pH 8, extracted with EA (200 mL) for three times. The combined organic layer was washed with brine, dried over Na$_2$SO$_4$ and concentrated in vacuo to afford compound A3.5 (5 g, 86.9% yield) which was used directly for the next step. MS: calc'd 215 [(M+H)$^+$], measured 215 [(M+H)$^+$].

Step (e): preparation of 4-fluoropyrazolo[1,5-a]pyridine-7-carbonitrile (Intermediate A3)

A mixture of 7-bromo-4-fluoro-pyrazolo[1,5-a]pyridine (compound A3.5, 1000 mg, 4.6 mmol), zinc cyanide (880 mg, 7.5 mmol), zinc (31 mg, 0.5 mmol), XantPhos (1076 mg, 1.8 mmol) and Pd(OAc)$_2$ (209 mg, 0.9 mmol) in DMA (10 mL) was degassed and purged with Ar for 3 times, and then the mixture was stirred at 120° C. for 1 h under Ar atmosphere. After being cooled to room temperature, the mixture was diluted with EA (150 mL). Filtered and the filtrate was washed with water (50 mL), brine (50 mL), dried over Na$_2$SO$_4$ and concentrated in vacuo. The residue was purified by Prep-TLC (PE:EA=3:1) to afford Intermediate A3 (600 mg, 68% yield). MS: calc'd 162 [(M+H)$^+$], measured 162 [(M+H)$^+$].

Intermediate A4

3,4-Difluoropyrazolo[1,5-a]pyridine-7-carbonitrile

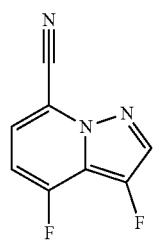 [SMILES: N#Cc1ccc(F)c2c(F)cnn12]

The titled compound was synthesized according to the following scheme:

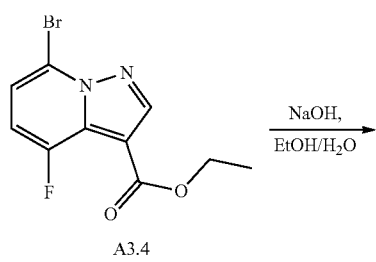

A3.4

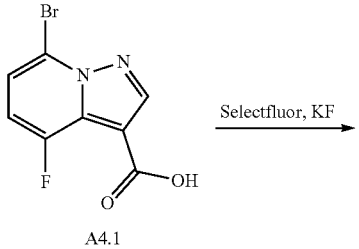

A4.1

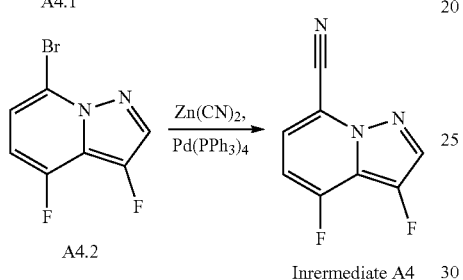

Step (a): preparation of 7-bromo-4-fluoro-pyrazolo[1,5-a]pyridine-3-carboxylic acid (compound A4.1)

The mixture of ethyl 7-bromo-4-fluoro-pyrazolo[1,5-a]pyridine-3-carboxylate (compound A3.4, 5.2 g, 18.1 mmol), NaOH (2.1 g, 54.3 mmol) in EtOH (90 mL) and water (70 mL) was stirred at 60° C. for 2 hrs. The reaction mixture was concentrated and then diluted with water. After adjusting pH to 4 with 1 N HCl, grey solid was precipitated, which was collected by filtration to afford compound A4.1 (4.0 g, 85.6% yield). MS: calc'd 259 [(M+H)$^+$], measured 259 [(M+H)$^+$].

Step (b): preparation of 7-bromo-3,4-difluoro-pyrazolo[1,5-a]pyridine (compound A4.2)

To a solution of 7-bromo-4-fluoro-pyrazolo[1,5-a]pyridine-3-carboxylic acid (compound A4.1, 4.0 g, 15.4 mmol) and KF (3.6 g, 61.8 mmol) in DCE (60 mL) and water (50 mL) was added Selectfluor (10.9 g, 30.9 mmol). The reaction was stirred at 70° C. for 18 hrs. After being to room temperature, the reaction was quenched with water, extracted with DCM twice. The combined organic layer was dried over Na$_2$SO$_4$, filtered and the filtrate was concentrated in vacuo to afford crude compound A4.2 (2.8 g, 78% yield). MS: calc'd 233 [(M+H)$^+$], measured 233 [(M+H)$^+$].

Step (c): preparation of 3,4-difluoropyrazolo[1,5-a]pyridine-7-carbonitrile (Intermediate A4)

A solution of 7-bromo-3,4-difluoropyrazolo[1,5-a]pyridine (compound A4.2, 2.8 g, 12.0 mmol) and zinc cyanide (5.6 g, 48.0 mmol) in DMF (70.0 mL) was added tetrakis(triphenylphosphine)palladium (1.4 g, 1.2 mmol). The reaction mixture was stirred at 120° C. for 18 hrs under N$_2$ atmosphere. After being cooled to room temperature, the reaction mixture was diluted with water and extracted with EtOAc twice. The combined organic layer was dried over Na$_2$SO$_4$, filtered and the filtrate was concentrated in vacuo. The residue was purified by column chromatography to afford Intermediate A4 (810 mg, 37.7% yield). MS: calc'd 180 [(M+H)$^+$], measured 180 [(M+H)$^+$]. $^1$H NMR (400 MHz, CDCl$_3$-d) δ ppm 8.00 (d, J=3.6 Hz, 1H), 7.31 (dd, J=4.7, 8.0 Hz, 1H), 6.83 (t, J=8.4 Hz, 1H).

Intermediate B1

(2R)—N1-benzyl-N1-(trimethylsilylmethyl)propane-1,2-diamine

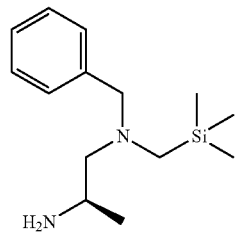 [SMILES: C[C@@H](N)CN(Cc1ccccc1)C[Si](C)(C)C]

The titled compound was synthesized according to the following scheme:

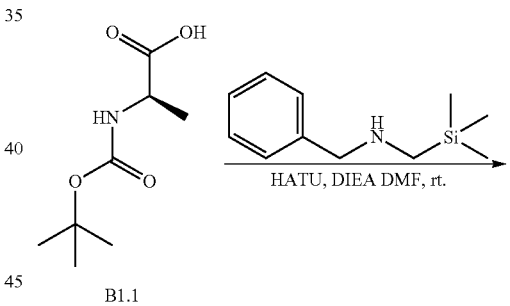

B1.1

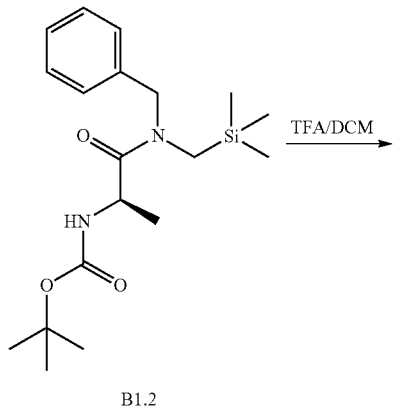

B1.2

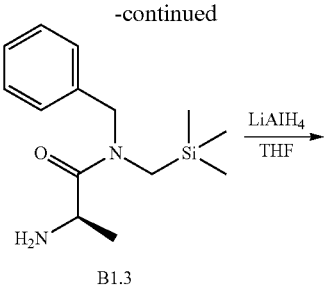

B1.3

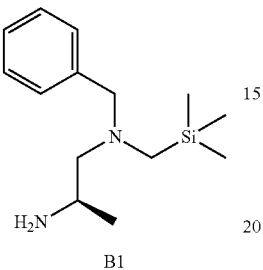

B1

Step (a): preparation of tert-butyl N-[(1R)-2-[benzyl (trimethylsilylmethyl)amino]-1-methyl-2-oxo-ethyl] carbamate (compound B1.2)

To a solution of (2R)-2-(tert-butoxycarbonylamino)propanoic acid (compound B1.1, 10 g, 52.9 mmol) in DMF (40 mL) was added N-benzyl-1-(trimethylsilyl)methanamine (10.2 g, 52.9 mmol), HATU (20.1 g, 52.9 mmol) and DIEA (13.6 g, 18.4 mL, 105.8 mmol). The reaction mixture was stirred at room temperature overnight, then quenched with water (150 mL), and extracted with DCM (100 mL) for three times. The combined organic layer was washed with brine, dried over $Na_2SO_4$, filtered and concentrated in vacuo. The residue was purified by flash chromatography (silica gel, 40 g, 0% to 30% EtOAc in PE) to afford compound B1.2 (13.1 g, 68% yield). MS: calc'd 365 [(M+H)$^+$], measured 365 [(M+H)$^+$].

Step (b): preparation of (2R)-2-amino-N-benzyl-N-(trimethylsilylmethyl)-propanamide (compound B1.3)

To a solution of tert-butyl N-[(1R)-2-[benzyl(trimethylsilylmethyl)amino]-1-methyl-2-oxo-ethyl]carbamate (compound B1.2, 13 g, 35.7 mmol) in DCM (60 mL) was added TFA (10 mL). The resultant mixture was stirred at room temperature for 4 hrs, then concentrated in vacuo, and the residue was partitioned between sat. $NaHCO_3$ (aq) and EA. The organic layer was separated and the basic aqueous layer was extracted with EA (80 mL) twice. The combined organic layer was dried over $Na_2SO_4$, filtered and concentrated in vacuo to afford compound B1.3 (9.1 g, 96% yield) without further purification. MS: calc'd 265 [(M+H)$^+$], measured 265 [(M+H)$^+$].

Step (c): preparation of (2R)—N1-benzyl-N1-(trimethylsilylmethyl)propane-1,2-diamine (intermediate B1)

To an ice-cooled solution of (2R)-2-amino-N-benzyl-N-(trimethylsilylmethyl)-propanamide (compound B1.3, 9.0 g, 34.0 mmol) in anhydrous THF (100 mL) was added $LiAlH_4$ (3.9 g, 102.0 mmol) slowly. After the addition was completed, the mixture was heated under reflux overnight, then cooled to room temperature and quenched with NaOH (10 mL, 20% aq. solution) before filtered and washed with EtOAc. The combined filtrate was concentrated in vacuo to afford Intermediate B1 (5.7 g, 67% yield) without further purification. MS: calc'd 251 [(M+H)$^+$], measured 251 [(M+H)$^+$].

Intermediate B2

N'-benzyl-N'-(trimethylsilylmethyl)ethane-1,2-diamine

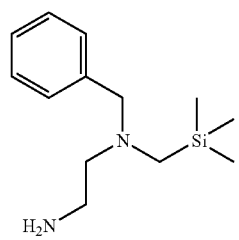 [SMILES: C[Si](C)(C)CN(CCN)Cc1ccccc1]

The titled compound was synthesized according to the following scheme:

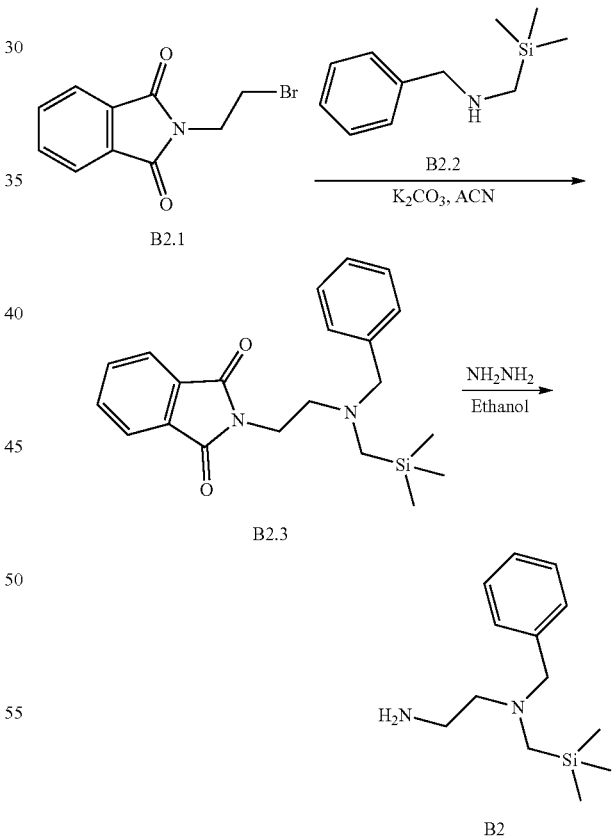

Step (a): preparation of 2-[2-[benzyl(trimethylsilylmethyl)amino]ethyl]isoindoline-1,3-dione (compound B2.3)

A mixture of 2-(2-bromoethyl)isoindoline-1,3-dione (compound B2.1, 7.6 g, 30 mmol), N-benzyl-1-(trimethylsilyl)methanamine (compound B2.2, 6.4 g, 33 mmol) and K₂CO₃ (8.3 g, 60 mmol) in acetonitrile (120 mL) was heated at reflux for 24 hrs. The reaction was cooled to room temperature, filtered, washed with DCM. The combined filtrate was concentrated, the residue was purified by flash chromatography (silica gel, 80 g, 0% to 10% EA in PE) to afford compound B2.3 (7.0 g, 63.7% yield). MS: calc'd 367 [(M+H)⁺], measured 367 [(M+H)⁺].

Step (b): preparation of N'-benzyl-N'-(trimethylsilylmethyl)ethane-1,2-diamine (Intermediate B2)

Hydrazine hydrate (2.5 g, 49.9 mmol) was added to a solution of 2-(2-(benzyl((trimethylsilyl)methyl)-amino)ethyl)isoindoline-1,3-dione (compound B2.3, 1.8 g, 5.0 mmol) in ethanol (30 mL). The mixture was heated under reflux for 2 hrs and the white solids precipitated during the reaction. The reaction was cooled to room temperature and sufficient amount of 5% NaOH (aq) was added to dissolve the white precipitates. The resultant mixture was extracted with DCM (50 mL) for three times. The combined organic layer was washed with brine, dried over Na₂SO₄, and concentrated in vacuo to afford Intermediate B2 (1.0 g, 86.4% yield). MS: calc'd 237 [(M+H)⁺], measured 237 [(M+H)⁺].

Intermediate B3

6-Chloro-4-(tetrahydropyran-2-yloxymethyl)pyridine-3-carbaldehyde

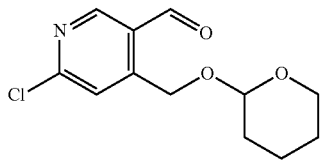 [SMILES: O=Cc1cnc(Cl)cc1COC1CCCCO1]

The titled compound was synthesized according to the following scheme:

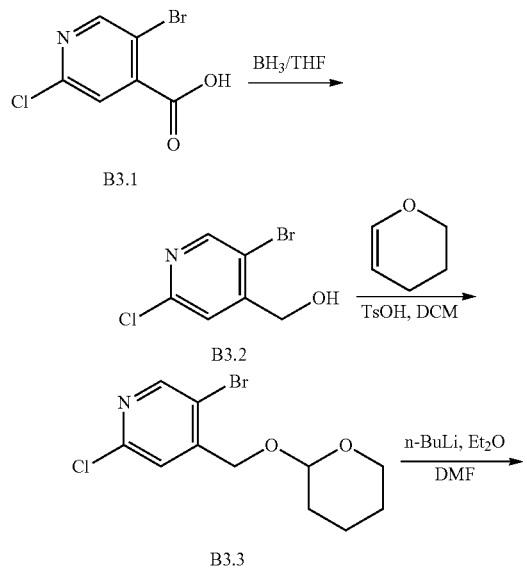

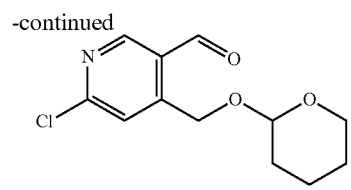

B3

Step (a): preparation of (5-bromo-2-chloro-4-pyridyl)methanol (compound B3.2)

The mixture of 5-bromo-2-chloroisonicotinic acid (compound B3.1, CAS: 886365-31-7, BePharm, Catalog: BD26182, 2 g, 8.5 mmol) and BH₃/THF (1M in THF, 30 mL) was stirred at room temperature for 3 hrs. The reaction was quenched by addition of methanol (30 mL), the resultant mixture was stirred at room temperature for additional 30 min, and then the mixture was concentrated in vacuo. The residue was purified by flash chromatography (silica gel, 40 g, 0% to 100% EA in PE) to afford compound B3.2 (1.8 g, 90% yield). MS: calc'd 222, 224 and 226 [(M+H)⁺], measured 222, 224 and 226 [(M+H)⁺].

Step (b): preparation of 5-bromo-2-chloro-4-(tetrahydropyran-2-yloxymethyl)pyridine (compound B3.3)

To a solution of (5-bromo-2-chloropyridin-4-yl)methanol (compound B3.2, 2 g, 9.0 mmol) in DCM (50 mL) was added 3,4-dihydro-2H-pyran (832 mg, 9.9 mmol) and 4-methylbenzenesulfonic acid monohydrate (85.5 mg, 450 μmol). The resultant mixture was stirred at room temperature for 20 hrs. The reaction was quenched with aq.NaHCO₃ (aq, 40 mL), extracted with DCM (100 mL) twice. The combined organic layer was washed with brine, dried over Na₂SO₄, filtered and the filtrate was concentrated. The residue was purified by flash chromatography (silica gel, 40 g, 0% to 50% EA in PE) to afford compound B3.3 (2.2 g, 79.8% yield). MS: calc'd 306, 308 and 310 [(M+H)⁺], measured 306, 308 and 310 [(M+H)⁺].

Step (c): preparation of 6-chloro-4-(tetrahydropyran-2-yloxymethyl)pyridine-3-carbaldehyde (Intermediate B3)

To a solution of 5-bromo-2-chloro-4-(tetrahydropyran-2-yloxymethyl)pyridine (compound B3.3, 2.2 g, 7.2 mmol) in THF (60 mL) was added dropwise n-BuLi (2 N in hexane, 12.3 mL, 24.5 mmol) at −78° C. The resultant mixture was stirred at −78° C. for 10 min, then DMF (1.6 g, 1.7 mL, 21.5 mmol) was added, and the reaction mixture was stirred at −78° C. for another 30 min. The reaction was quenched with sat. NH₄Cl (aq, 50 mL), extracted with EA (80 mL) for three times. The combined organic layer was washed with brine, dried over Na₂SO₄, filtered and concentrated in vacuo. The residue was purified by flash chromatography (silica gel, 40 g, 0% to 70% EtOAc in PE) to afford compound Intermediate B3 (1.4 g, 75.2% yield). MS: calc'd 256 and 258 [(M+H)⁺], measured 256 and 258 [(M+H)⁺]. ¹H NMR (400 MHz, CDCl₃-d) δ ppm 10.09 (s, 1H), 8.69 (s, 1H), 7.72 (s, 1H), 5.14 (d, J=17.5 Hz, 1H), 4.88 (d, J=17.5 Hz, 1H), 4.77-4.67 (m, 1H), 3.83-3.71 (m, 1H), 3.55-3.46 (m, 1H), 1.87-1.53 (m, 6H).

Intermediate B4

6-Methoxy-2-(tetrahydropyran-2-yloxymethyl)pyridine-3-carbaldehyde

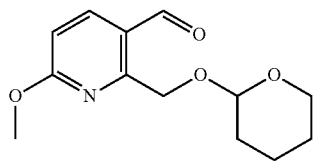 [SMILES: COc1ccc(C=O)c(COC2CCCCO2)n1]

The titled compound was synthesized according to the following scheme:

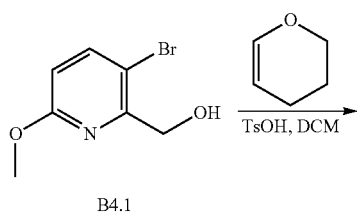

B4.1

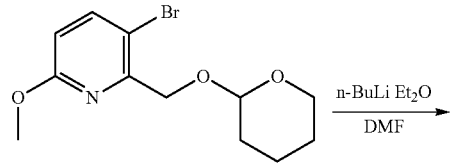

B4.2

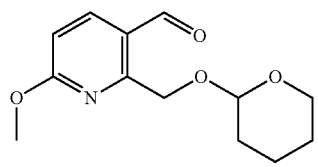

B4

Step (a): preparation of 3-bromo-6-methoxy-2-(tetrahydropyran-2-yloxymethyl) pyridine (compound B4.2)

To a solution of (3-bromo-6-methoxy-2-pyridyl)methanol (compound B4.1, CAS: 623942-84-7, BePharm, Catalog: BD223875, 25 g, 115 mmol) in DCM (1 L) was added 3,4-dihydro-2H-pyran (14.5 g, 172 mmol) and 4-methylbenzenesulfonic acid monohydrate (0.6 g, 3.4 mmol). The resultant mixture was stirred at room temperature for 20 hrs. The reaction was quenched with sat. NaHCO$_3$ (aq, 200 mL), extracted with DCM (150 mL) for three times. The combined organic layer was washed with brine, dried over Na$_2$SO$_4$, filtered and concentrated in vacuo. The residue was purified by flash chromatography to afford compound B4.2 (33.0 g, 95.3% yield). MS: calc'd 302,304 [(M+H)$^+$], measured 218,220 [(M−84)$^+$].

Step (b): preparation of 6-methoxy-2-(tetrahydropyran-2-yloxymethyl)pyridine-3-carbaldehyde (Intermediate B4)

To a solution of 3-bromo-6-methoxy-2-(tetrahydropyran-2-yloxymethyl)pyridine (compound B4.2, 33 g, 109 mmol) in Et$_2$O (1000 mL) at −78° C. was added n-BuLi (2.0 M in hexane, 56.5 mL, 113 mmol). After stirring at −78° C. for 30 min, DMF (39.9 g, 546.0 mmol) was added, and the reaction was allowed to warm up to 0° C. over 2 hrs. The reaction mixture was quenched with sat. NH$_4$Cl (aq, 300 mL), extracted with EA (100 mL) for three times. The combined organic layer was washed with brine, dried over Na$_2$SO$_4$, filtered and concentrated in vacuo. The residue was purified by flash chromatography (silica gel, 330 g, 0% to 30% EtOAc in PE) to afford Intermediate B4 (20.6 g, 75.1% yield). MS: calc'd 252 [(M+H)$^+$], measured 168 [(M−84)$^+$]. $^1$H NMR (400 MHz, CDCl$_3$-d) δ ppm 10.25 (s, 1H), 7.99 (d, J=8.6 Hz, 1H), 6.64 (d, J=8.6 Hz, 1H), 5.01 (d, J=12.5 Hz, 1H), 4.74 (d, J=12.5 Hz, 1H), 4.70 (t, J=3.4 Hz, 1H), 3.80-3.73 (m, 1H), 3.50-3.33 (m, 1H), 1.82-1.29 (m, 6H).

Intermediate B5

6-Chloro-2-(tetrahydropyran-2-yloxymethyl)pyridine-3-carbaldehyde

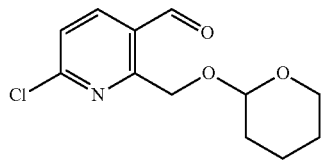 [SMILES: O=Cc1ccc(Cl)nc1COC1CCCCO1]

6-chloro-2-(tetrahydropyran-2-yloxymethyl)pyridine-3-carbaldehyde (Intermediate B5) was prepared in analogy to Intermediate B4, by replacing (3-bromo-6-methoxy-2-pyridyl) methanol (compound B4.1) with (3-bromo-6-chloro-2-pyridyl)methanol (CAS: 1227601-71-9, BePharm, Catalog: BD259870) in step (a). MS: calc'd 256 and 258 [(M+H)$^+$], measured 256 and 258 [(M+H)$^+$].

Intermediate C1

(2S,6R)-4-benzyl-11-chloro-6-methyl-4,7,12-triazatricyclo[7.4.0.02,7]trideca-1(9),10,12-triene

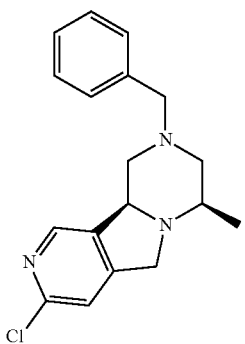 [SMILES: C[C@@H]1CN(Cc2ccccc2)C[C@@H]2c3cnc(Cl)cc3CN12]

The titled compound was synthesized according to the following scheme:

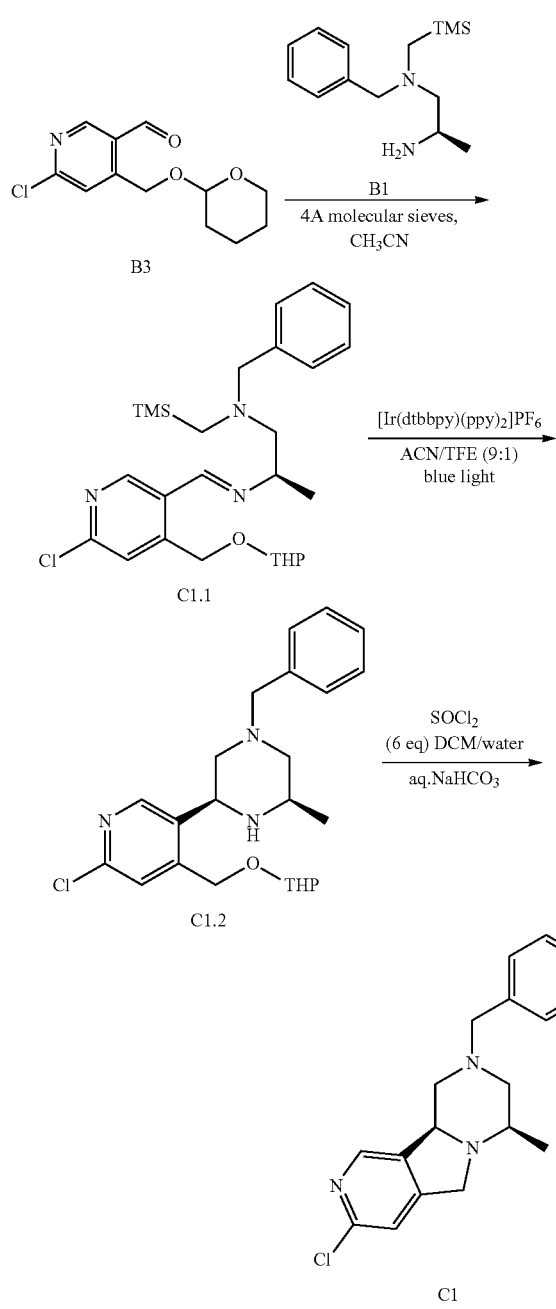

Step (a): preparation of (3S,5R)-1-benzyl-3-[6-chloro-4-(tetrahydropyran-2-yloxymethyl)-3-pyridyl]-5-methyl-piperazine (compound C1.2)

A mixture of the (R)—N1-benzyl-N1-((trimethylsilyl)methyl)propane-1,2-diamine (Intermediate B1, 588 mg, 2.4 mmol), 6-chloro-4-(tetrahydropyran-2-yloxymethyl)pyridine-3-carbaldehyde (Intermediate B3, 600 mg, 2.4 mmol), and 4 A MS (5 g) in MeCN (20 mL) under $N_2$ was stirred overnight at room temperature. The reaction mixture was filtered through Celite and washed with DCM. The filtrate was concentrated in vacuo to afford the intermediate compound C1.1, the residue was re-dissolved in MeCN/TFE (27 mL/3 mL), followed by the addition of [Ir(dtbbpy)(ppy)$_2$][PF$_6$] (CAS: 676525-77-2, TCI, Catalog: D4887, 42.9 mg, 46.9 μmol). The resultant mixture was stirred at room temperature under the exposure of blue LEDs (synLED-16 A Discover, 12 W, wavelength 465-470 nm, purchased from SYNLED corp.) for 20 hrs. After the solvents were removed in vacuo, the residue was purified by flash chromatography (silica gel, 40 g, 20% to 100% EA in PE) to afford compound C1.2 (390 mg, 40% yield). The stereochemistry was confirmed by NOESY. MS: calc'd 416 [(M+H)$^+$], measured 416 [(M+H)$^+$].

Step (b): preparation of (2S,6R)-4-benzyl-11-chloro-6-methyl-4,7,12-triazatricyclo [7.4.0.02,7] trideca-1(9),10,12-triene (intermediate C1)

To a solution of (3S,5R)-1-benzyl-3-[6-chloro-4-(tetrahydropyran-2-yloxymethyl)-3-pyridyl]-5-methyl-piperazine (compound C1.2, 306 mg, 736 μmol) in DCM (10 mL), SOCl$_2$ (525 mg, 4.4 mmol), followed by the addition of H$_2$O (0.05 mL). After stirred at room temperature for 20 hrs, the mixture was poured into a solution of aqueous NaHCO$_3$ (sat., 20 mL), and the resultant mixture was stirred at room temperature for additional 3 hrs. The mixture was extracted with DCM (30 mL) for three times, the combined organic layer was washed with H$_2$O (20 mL) and brine (20 mL), dried over Na$_2$SO$_4$, filtered, and concentrated in vacuo. The residue was purified by silica gel column chromatography to afford intermediate C1 (89 mg, 38.6% yield). MS: calc'd 314 and 316 [(M+H)$^+$], measured 314 and 316 [(M+H)$^+$].

Intermediate C2

4-benzyl-11-chloro-4,7,12-triazatricyclo[7.4.0.02,7] trideca-1(9),10,12-triene

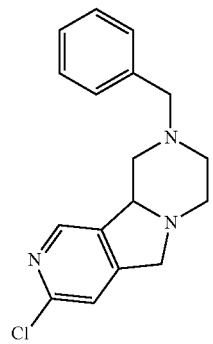 [SMILES: Clc1cc2c(cn1)C1CN(Cc3ccccc3)CCN1C2]

4-benzyl-11-chloro-4,7,12-triazatricyclo[7.4.0.02,7]trideca-1(9),10,12-triene (Intermediate C2) was prepared in analogy to Intermediate C1, by replacing Intermediate B1 with Intermediate B2 in step (a). MS: calc'd 300 and 302 [(M+H)$^+$], measured 300 and 302 [(M+H)$^+$].

Intermediate C3
5-[(2S,6R)-11-chloro-6-methyl-4,7,10-triazatricyclo[7.4.0.02,7]trideca-1(9),10,12-trien-4-yl]quinoline-8-carbonitrile
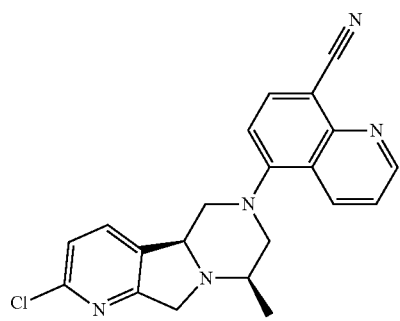 [SMILES: C[C@@H]1CN(c2ccc(C#N)c3ncccc23)C[C@@H]2c3ccc(Cl)nc3CN12]
The titled compound was synthesized according to the following scheme:
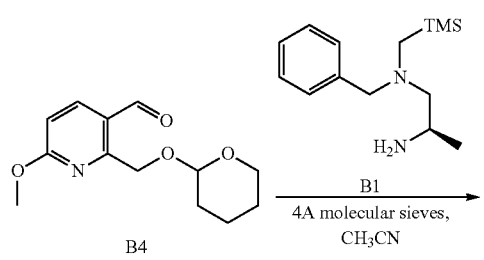
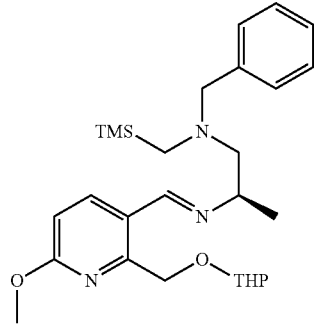
C3.1
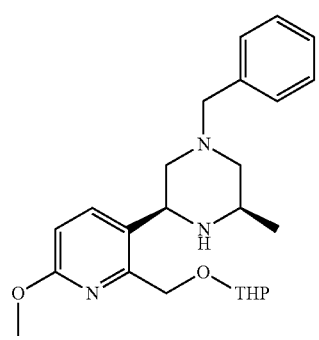
C3.2
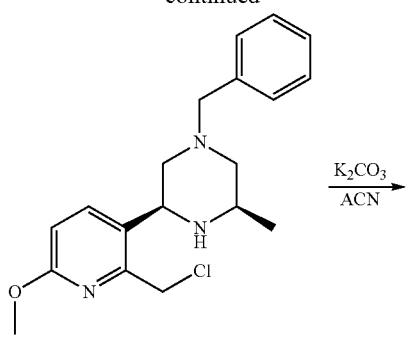
C3.3
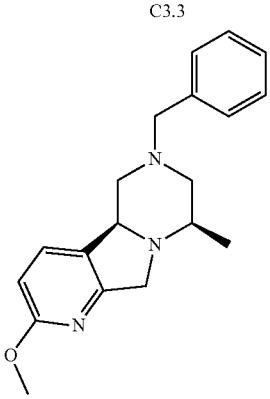
C3.4
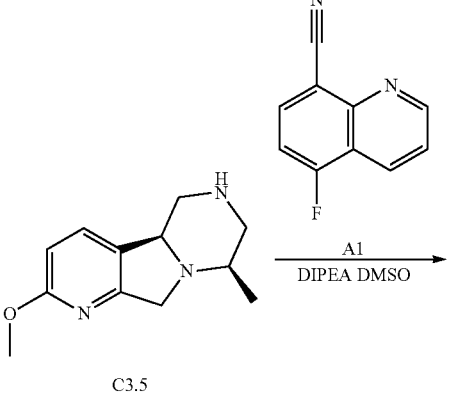
C3.5
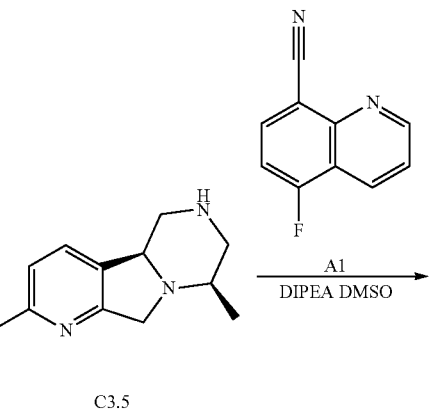
C3.6

-continued

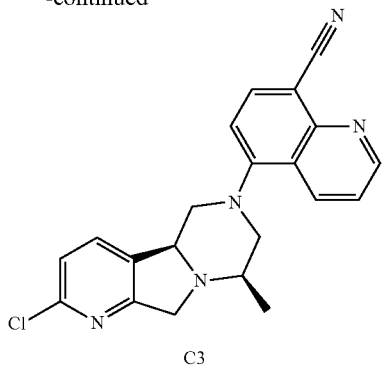

C3

Step (a): preparation of (3S,5R)-1-benzyl-3-[6-methoxy-2-(tetrahydropyran-2-yloxymethyl)-3-pyridyl]-5-methyl-piperazine (compound C3.2)

A mixture of the 6-methoxy-2-(tetrahydropyran-2-yloxymethyl)pyridine-3-carbaldehyde (Intermediate B4, 3.3 g, 13.1 mmol), (R)—N1-benzyl-N1-((trimethylsilyl)methyl)propane-1,2-diamine (Intermediate B1, 3.3 g, 13.1 mmol), and 4 A MS (2 g) in MeCN (80 mL) under $N_2$ was stirred overnight at room temperature. The reaction was filtered through Celite and washed with DCM. The filtrate was concentrated in vacuo to afford the intermediate compound C3.1, the residue was re-dissolved in MeCN/TFE (63 mL/7 mL), followed by the addition of [Ir(dtbbpy)(ppy)$_2$][PF$_6$] (CAS: 676525-77-2, TCI, Catalog: D4887,120 mg, 131 μmol). The resultant mixture was stirred at room temperature under the exposure of blue LEDs (synLED-16 A Discover, 12 W, wavelength 465-470 nm, purchased from SYNLED corp.) for 20 hrs. After the solvents were removed under vacuo, the residue was purified by flash chromatography (silica gel, 120 g, 20% to 100% EA in PE) to afford compound C3.2 (3.3 g, 61.1% yield). MS: calc'd 412 [(M+H)$^+$], measured 412 [(M+H)$^+$].

Step (b): preparation of (3S,5R)-1-benzyl-3-[2-(chloromethyl)-6-methoxy-3-pyridyl]-5-methyl-piperazine (compound C3.3)

To a solution of (3S,5R)-1-benzyl-3-[6-methoxy-2-(tetrahydropyran-2-yloxymethyl)-3-pyridyl]-5-methyl-piperazine (compound C3.2, 3.3 g, 8.0 mmol) in DCM (120 mL) was added SOCl$_2$ (5.7 g, 48.1 mmol), followed by the addition of 0.5 mL water. The resultant mixture was stirred at room temperature for 20 hrs. The reaction was quenched with sat. NaHCO$_3$ (aq, 100 mL), extracted with DCM (100 mL) twice. The combined organic layer was washed with brine, dried over Na$_2$SO$_4$, filtered and concentrated in vacuo to afford compound C3.3 (2.8 g, crude) which was used directly for the next step without further purification. MS: calc'd 346, 348 [(M+H)$^+$], measured 346, 348 [(M+H)$^+$].

Step (c): preparation of (2S,6R)-4-benzyl-11-methoxy-6-methyl-4,7,10-triazatricyclo [7.4.0.02,7]trideca-1(9),10,12-triene (compound C3.4)

The mixture of (3S,5R)-1-benzyl-3-[2-(chloromethyl)-6-methoxy-3-pyridyl]-5-methyl-piperazine (compound C3.3, 2.8 g, crude) and K$_2$CO$_3$ (2.2 g, 16.0 mmol) in acetonitrile (80 mL) was heated at reflux for 3 hrs. After being cooled to room temperature, the reaction mixture was filtered through Celite and washed with DCM. The filtrate was concentrated in vacuo and the resultant residue was purified by silica gel column chromatography to afford compound C3.4 (2.0 g, two-steps 81.0% yield). The stereochemistry was confirmed by NOESY. MS: calc'd 310 [(M+H)$^+$], measured 310 [(M+H)$^+$].

Step (d): preparation of (2S,6R)-11-methoxy-6-methyl-4,7,10-triazatricyclo[7.4.0.02,7]trideca-1(9),10,12-triene (compound C3.5)

A mixture of (2S,6R)-4-benzyl-11-methoxy-6-methyl-4,7,10-triazatricyclo[7.4.0.02,7]trideca-1(9),10,12-triene (compound C3.4, 2.0 g, 6.5 mmol) and Pd—C (200 mg) in MeOH (150 mL) was hydrogenated by a hydrogen balloon at room temperature for 5 hrs. After the catalyst was filtered off, the filtrate was concentrated in vacuo to afford compound C3.5 (1.3 g, 91.3% yield) which was used directly for the next step without further purification. MS: calc'd 220 [(M+H)$^+$], measured 220 [(M+H)$^+$].

Step (e): preparation of 5-[(2S,6R)-11-methoxy-6-methyl-4,7,10-triazatricyclo [7.4.0.02,7]trideca-1(9),10,12-trien-4-yl]quinoline-8-carbonitrile (compound C3.6)

To a solution of (2S,6R)-11-methoxy-6-methyl-4,7,10-triazatricyclo[7.4.0.02,7]trideca-1(9),10,12-triene (compound C3.5, 1.3 g, 5.9 mmol) in DMSO (50 mL) was added 5-fluoroquinoline-8-carbonitrile (Intermediate A1, 1.0 g, 5.9 mmol) and DIPEA (3.8 g, 29.6 mmol). The reaction mixture was stirred at 120° C. for 20 hrs. After being cooled to room temperature, the reaction was quenched with water (100 mL), and extracted with EA (100 mL) twice. The combined organic layer was washed with brine, dried over Na$_2$SO$_4$, filtered and concentrated in vacuo. The residue was purified by flash chromatography (silica gel, 80 g, 0% to 100% EtOAc in DCM) to afford compound C3.6 (1.2 g, 56.0% yield). MS: calc'd 372 [(M+H)$^+$], measured 372 [(M+H)$^+$].

Step (f): preparation of 5-[(2S,6R)-11-chloro-6-methyl-4,7,10-triazatricyclo[7.4.0.02,7] trideca-1(9),10,12-trien-4-yl]quinoline-8-carbonitrile (Intermediate C3)

A mixture of 5-[(2S,6R)-11-methoxy-6-methyl-4,7,10-triazatricyclo[7.4.0.02,7]trideca-1(9),10,12-trien-4-yl]quinoline-8-carbonitrile (compound C3.6, 1.0 g, 2.7 mmol), POCl$_3$ (50 mL) and trimethylamine hydrochloride (2.6 g, 26.9 mmol) was heated at 90° C. overnight. After being cooled to room temperature, the reaction mixture was evaporated under reduced pressure. The residue was poured into ice-water (100 mL), neutralized to pH 8 with sat. NaHCO$_3$ (aq), and extracted with EA (80 mL) for three times. The combined organic layer was washed with brine, dried over Na$_2$SO$_4$, filtered and the filtrate was concentrated in vacuo. The residue was purified by flash chromatography (silica gel, 80 g, 0% to 100% EtOAc in DCM) to afford Intermediate C3 (0.5 g, 51.0% yield). MS: calc'd 376,378 [(M+H)$^+$], measured 376,378 [(M+H)$^+$].

Intermediate C4

5-[(2S,6R)-11-chloro-6-methyl-4,7,10-triazatricyclo[7.4.0.02,7]trideca-1(9),10,12-trien-4-yl]-2-deuterio-quinoline-8-carbonitrile

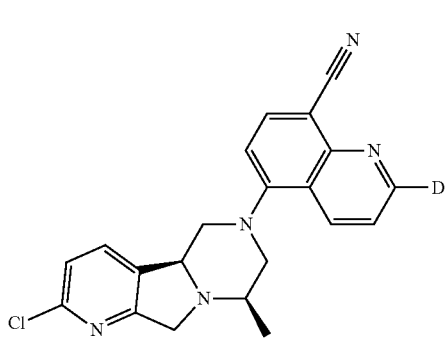 [SMILES: [2H]c1ccc2c(N3C[C@@H](C)N4Cc5nc(Cl)ccc5[C@H]4C3)ccc(C#N)c2n1]

5-[(2S,6R)-11-chloro-6-methyl-4,7,10-triazatricyclo[7.4.0.02,7]trideca-1(9),10,12-trien-4-yl]-2-deuterio-quinoline-8-carbonitrile (Intermediate C4) was prepared in analogy to Intermediate C3, by replacing Intermediate A1 with Intermediate A2 in step (e). MS: calc'd 377 and 379 [(M+H)⁺], measured 377 and 379 [(M+H)⁺].

Intermediate C5

5-(11-chloro-4,7,10-triazatricyclo[7.4.0.02,7]trideca-1(9),10,12-trien-4-yl)quinoline-8-carbonitrile

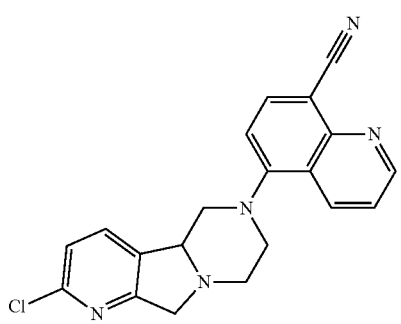 [SMILES: N#Cc1ccc(N2CCN3Cc4nc(Cl)ccc4C3C2)c2cccnc12]

5-(11-chloro-4,7,10-triazatricyclo[7.4.0.02,7]trideca-1(9),10,12-trien-4-yl)quinoline-8-carbonitrile (Intermediate C5) was prepared in analogy to Intermediate C3, by replacing Intermediate B1 with Intermediate B2 in step (a). MS: calc'd 362 and 364 [(M+H)⁺], measured 362 and 364 [(M+H)⁺].

Intermediate C6

(2S,6R)-4-benzyl-11-chloro-6-methyl-4,7,10-triazatricyclo[7.4.0.02,7]trideca-1(9),10,12-triene

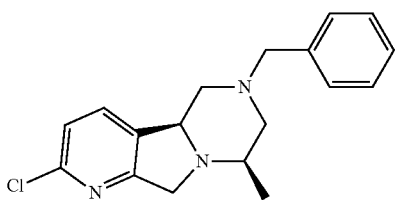 [SMILES: C[C@@H]1CN(Cc2ccccc2)C[C@@H]2c3ccc(Cl)nc3CN12]

(2S,6R)-4-benzyl-11-chloro-6-methyl-4,7,10-triazatricyclo[7.4.0.02,7]trideca-1(9),10,12-triene (Intermediate C6) was prepared in analogy to Intermediate C1, by replacing Intermediate B3 with Intermediate B5 in step (a). MS: calc'd 314 and 316 [(M+H)⁺], measured 314 and 316 [(M+H)⁺].

Example 1

5-(11-Piperazin-1-yl-4,7,12-triazatricyclo[7.4.0.02,7]trideca-1(9),10,12-trien-4-yl)quinoline-8-carbonitrile

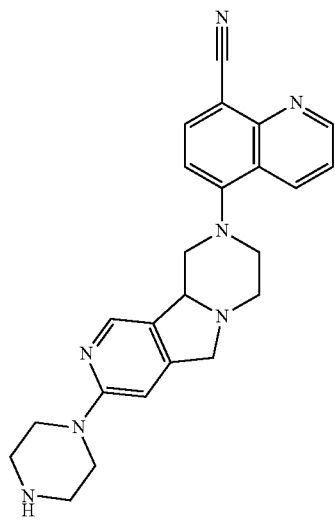 [SMILES: N#Cc1ccc(N2CCN3Cc4cc(N5CCNCC5)ncc4C3C2)c2cccnc12]

The titled compound was synthesized according to the following scheme:

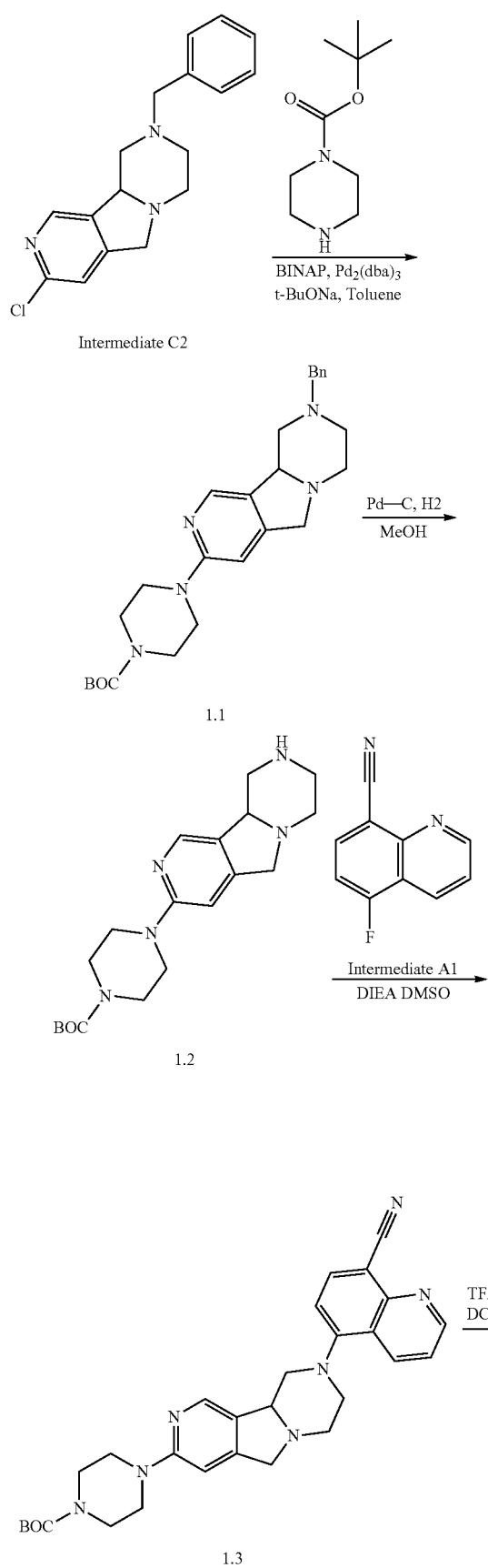

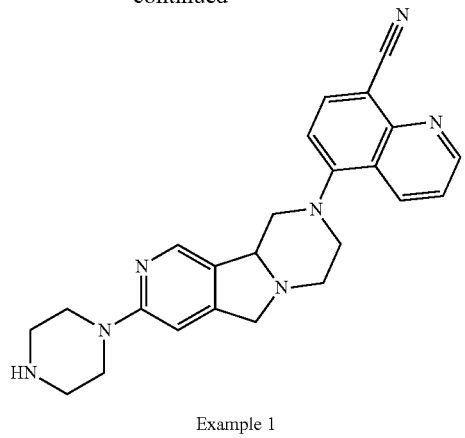

Example 1

Step (a): preparation of tert-butyl 4-(4-benzyl-4,7,12-triazatricyclo[7.4.0.02,7]trideca-1(9),10,12-trien-11-yl)piperazine-1-carboxylate (compound 1.1)

To a solution of 4-benzyl-11-chloro-4,7,12-triazatricyclo[7.4.0.02,7]trideca-1(9),10,12-triene (Intermediate C2, 103 mg, 344 μmol) in toluene (8 mL) was added tert-butyl piperazine-1-carboxylate (70.4 mg, 378 μmol), Pd$_2$(dba)$_3$ (15.7 mg, 17.2 μmol), BINAP (21.4 mg, 34.4 μmol) and sodium t-BuONa (66 mg, 687 μmol). The resultant mixture was stirred at 100° C. for hrs. After being cooled to room temperature, the reaction was quenched with water (30 mL) and extracted with EA (30 mL) twice. The combined organic layer was washed with brine, dried over Na$_2$SO$_4$, filtered and the filtrate was concentrated in vacuo. The residue was purified by flash chromatography (silica gel, 20 g, 0% to 100% EtOAc in DCM) to afford compound 1.1 (98 mg, 63.4% yield). MS: calc'd 450 [(M+H)$^+$], measured 450 [(M+H)$^+$].

Step (b): preparation of tert-butyl 4-(4,7,12-triazatricyclo[7.4.0.02,7]trideca-1(9),10,12-trien-11-yl)piperazine-1-carboxylate (compound 1.2)

A mixture of tert-butyl 4-(4-benzyl-4,7,12-triazatricyclo[7.4.0.02,7]trideca-1(9),10,12-trien-11-yl)piperazine-1-carboxylate (compound 1.1, 98 mg, 218 μmol) and Pd—C (20 mg) in MeOH (30 mL) was hydrogenated by a hydrogen balloon at room temperature for 5 hrs. After the catalyst was filtered off, the filtrate was concentrated in vacuo to afford compound 1.2 (46 mg, 58.7% yield) which was used directly for the next step without further purification. MS: calc'd 360 [(M+H)$^+$], measured 360 [(M+H)$^+$].

Step (c): preparation of tert-butyl 4-[4-(8-cyano-5-quinolyl)-4,7,12-triazatricyclo [7.4.0.02,7]trideca-1(9),10,12-trien-11-yl]piperazine-1-carboxylate (compound 1.3)

To a solution of 5-fluoroquinoline-8-carbonitrile (Intermediate A1, 38.3 mg, 223 μmol) in DMSO (5 mL) was added tert-butyl 4-(4,7,12-triazatricyclo[7.4.0.02,7]trideca-1(9),10,12-trien-11-yl)piperazine-1-carboxylate (compound 1.2, 80 mg, 223 μmol) and DIEA (128 mg, 1.1 mmol). The resultant reaction mixture was stirred at 120° C. for 5 hrs. After being cooled to room temperature, the reaction was diluted with water (30 mL) and extracted with EA (30 mL)

twice. The combined organic layer was washed with brine, dried over Na₂SO₄, filtered and concentrated in vacuo. The residue was purified by flash chromatography (silica gel, 20 g, 0% to 100% EtOAc in PE) to afford compound 1.3 (32 mg, 28.1% yield). MS: calc'd 512 [(M+H)⁺], measured 512 [(M+H)⁺].

Step (d): preparation of 5-(11-Piperazin-1-yl-4,7,12-triazatricyclo[7.4.0.02,7]trideca-1(9),10,12-trien-4-yl)quinoline-8-carbonitrile (Example 1)

To a solution of tert-butyl 4-[4-(8-cyano-5-quinolyl)-4,7,12-triazatricyclo[7.4.0.02,7]trideca-1(9),10,12-trien-11-yl]piperazine-1-carboxylate (compound 1.3, 32 mg, 62.6 μmol) in DCM (5 mL) was added TFA (2 mL). The reaction mixture was stirred at room temperature for 2 hrs, then concentrated to afford a crude product, which was purified by prep-HPLC to afford Example 1 (11 mg, 42.7% yield). MS: calc'd 412 [(M+H)⁺], measured 412 [(M+H)⁺]. ¹H NMR (400 MHz, METHANOL-d₄) δ ppm 9.02 (dd, J=1.6, 4.3 Hz, 1H), 8.72 (dd, J=1.7, 8.6 Hz, 1H), 8.16 (d, J=8.1 Hz, 1H), 8.13 (s, 1H), 7.68 (dd, J=4.3, 8.6 Hz, 1H), 7.33 (d, J=7.9 Hz, 1H), 7.02 (s, 1H), 4.43-4.38 (m, 1H), 4.35 (d, J=13.8 Hz, 1H), 4.00 (d, J=13.8 Hz, 1H), 3.86-3.77 (m, 5H), 3.47-3.40 (m, 2H), 3.36 (br d, J=5.3 Hz, 5H), 3.30-3.22 (m, 1H), 3.12-3.03 (m, 1H).

Example 2

5-[(2S,6R)-6-methyl-11-piperazin-1-yl-4,7,12-triazatricyclo[7.4.0.02,7]trideca-1(9),10,12-trien-4-yl]quinoline-8-carbonitrile

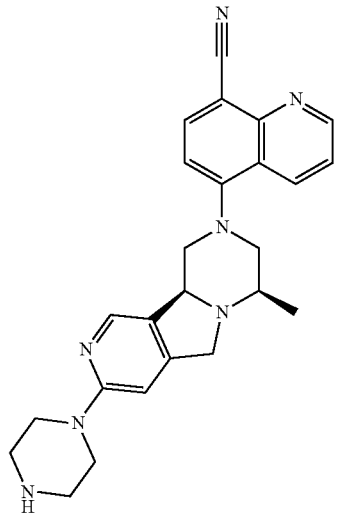 [SMILES: C[C@@H]1CN(c2ccc(C#N)c3ncccc23)C[C@@H]2c3cnc(N4CCNCC4)cc3CN12]

The title compound (Example 2) was prepared in analogy to Example 1, by replacing 4-benzyl-11-chloro-4,7,12-triazatricyclo[7.4.0.02,7]trideca-1(9),10,12-triene (Intermediate C2) with (2S,6R)-4-benzyl-11-chloro-6-methyl-4,7,12-triazatricyclo[7.4.0.02,7]trideca-1(9),10,12-triene (Intermediate C1) in step (a). MS: calc'd 426 [(M+H)⁺], measured 426 [(M+H)⁺]. ¹H NMR (400 MHz, METHANOL-d₄) δ ppm 9.06 (dd, J=1.6, 4.3 Hz, 1H), 8.80 (dd, J=1.6, 8.7 Hz, 1H), 8.30 (s, 1H), 8.21 (d, J=7.9 Hz, 1H), 7.75 (dd, J=4.3, 8.6 Hz, 1H), 7.42 (d, J=8.1 Hz, 1H), 7.12 (s, 1H), 5.40-5.31 (m, 1H), 4.97 (d, J=14.5 Hz, 1H), 4.67 (d, J=14.5 Hz, 1H), 4.38-4.30 (m, 1H), 4.04-3.96 (m, 1H), 3.93-3.86 (m, 4H), 3.67 (br d, J=13.7 Hz, 1H), 3.39-3.34 (m, 5H), 3.23-3.12 (m, 1H), 1.55 (d, J=6.7 Hz, 3H).

Example 3A and 3B

5-[(2R)-11-piperazin-1-yl-4,7,10-triazatricyclo[7.4.0.02,7]trideca-1(9),10,12-trien-4-yl]quinoline-8-carbonitrile and 5-[(2S)-11-piperazin-1-yl-4,7,10-triazatricyclo[7.4.0.02,7]trideca-1(9),10,12-trien-4-yl]quinoline-8-carbonitrile

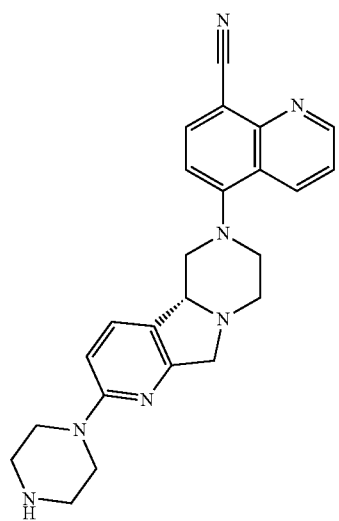

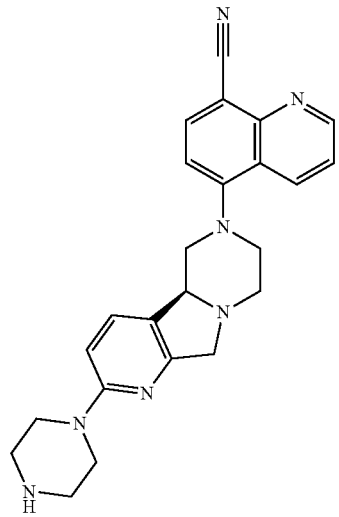

The titled compound was synthesized according to the following scheme:
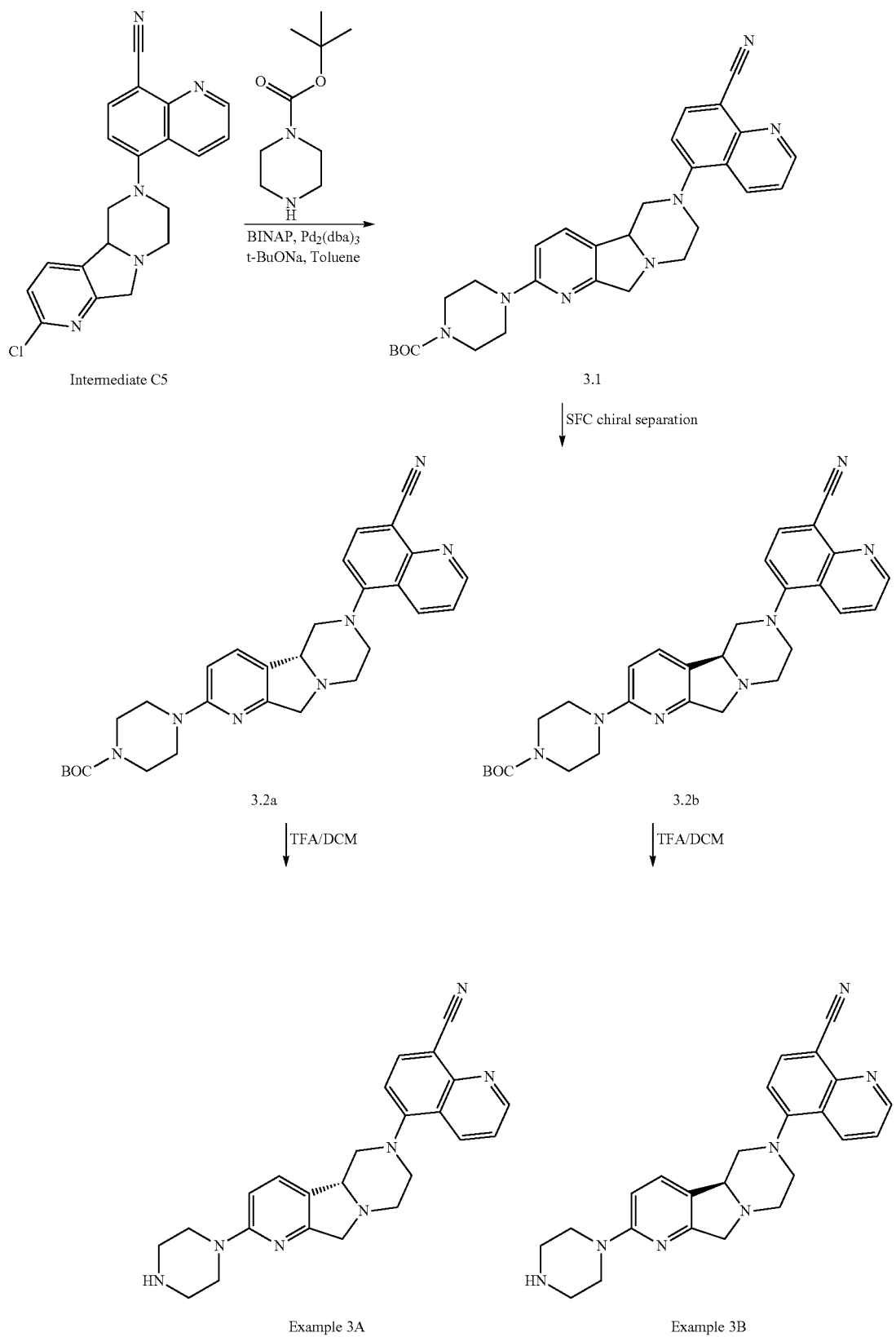

Step (a): preparation of tert-butyl 4-[4-(8-cyano-5-quinolyl)-4,7,10-triazatricyclo [7.4.0.02,7]trideca-1(9),10,12-trien-11-yl]piperazine-1-carboxylate (compound 3.1)

To a solution of 5-(11-chloro-4,7,10-triazatricyclo[7.4.0.02,7]trideca-1(9),10,12-trien-4-yl) quinoline-8-carbonitrile (Intermediate C5, 120 mg, 332 umol) in toluene (10 mL) was added tert-butyl piperazine-1-carboxylate (85.3 mg, 398 μmol), BINAP (20.7 mg, 33.2 μmol), Pd$_2$(dba)$_3$ (15.2 mg, 16.6 μmol) and t-BuONa (63.7 mg, 663 μmol). The resultant mixture was stirred at 100° C. for 20 hrs. After being cooled to room temperature, the reaction mixture was diluted with water (30 mL) and extracted with EA (40 mL) for three times. The combined organic layer was washed with brine, dried over Na$_2$SO$_4$, filtered and concentrated in vacuo. The residue was purified by flash chromatography (silica gel, 20 g, 0% to 10% MeOH in DCM) to afford compound 3.1 (110 mg, 64.8% yield). MS: calc'd 512 [(M+H)$^+$], measured 512 [(M+H)$^+$].

Step (b): preparation of tert-butyl 4-[(2R)-4-(8-cyano-5-quinolyl)-4,7,10-triazatricyclo [7.4.0.02,7] trideca-1(9),10,12-trien-11-yl]piperazine-1-carboxylate (compound 3.2a) and tert-butyl 4-[(2S)-4-(8-cyano-5-quinolyl)-4,7,10-triazatricyclo[7.4.0.02,7]trideca-1(9),10,12-trien-11-yl]piperazine-1-carboxylate (compound 3.2b)

Compound 3.1 (110 mg) was resolved by SFC to give two single isomers: compound 3.2a (51 mg, yield: 46%) MS: calc'd 512 (M+H)$^+$, measured 512 (M+H)$^+$; and compound 3.2b (50 mg, yield: 45%) MS: calc'd 512 (M+H)$^+$, measured 512 (M+H)$^+$, with 40% Ethanol (0.25% NH$_3$H$_2$O)/CO$_2$ on OJ (5 μm, 250×20 mm) column.

Step (c): preparation of 5-[(2R)-11-piperazin-1-yl-4,7,10-triazatricyclo[7.4.0.02,7]trideca-1(9),10,12-trien-4-yl]quinoline-8-carbonitrile (Example 3A)

To a solution of tert-butyl 4-[(2R)-4-(8-cyano-5-quinolyl)-4,7,10-triazatricyclo[7.4.0.02,7]trideca-1(9),10,12-trien-11-yl]piperazine-1-carboxylate (compound 3.2a, 51 mg, 99.8 μmol) in DCM (5 mL) was added TFA (2 mL). The reaction mixture was stirred at room temperature for 2 hrs, then concentrated to afford a crude product, which was purified by pre-HPLC to afford Example 3A (29 mg, 70.7% yield). calc'd 412 [(M+H)$^+$], measured 412 [(M+H)$^+$]. $^1$H NMR (400 MHz, METHANOL-d$_4$) δ ppm 9.03 (dd, J=1.6, 4.3 Hz, 1H), 8.72 (dd, J=1.6, 8.6 Hz, 1H), 8.19 (d, J=7.9 Hz, 1H), 7.74-7.66 (m, 2H), 7.38 (d, J=8.1 Hz, 1H), 6.91 (d, J=8.7 Hz, 1H), 5.07-5.00 (m, 1H), 4.62 (d, J=14.2 Hz, 1H), 4.43 (d, J=14.2 Hz, 1H), 3.93-3.77 (m, 6H), 3.70-3.63 (m, 1H), 3.56-3.48 (m, 2H), 3.39-3.34 (m, 5H).

Step (d): preparation of 5-[(2S)-11-piperazin-1-yl-4,7,10-triazatricyclo[7.4.0.02,7]trideca-1(9),10,12-trien-4-yl]quinoline-8-carbonitrile (Example 3B)

To a solution of tert-butyl 4-[(2S)-4-(8-cyano-5-quinolyl)-4,7,10-triazatricyclo[7.4.0.02,7]trideca-1(9),10,12-trien-11-yl]piperazine-1-carboxylate (compound 3.2b, 50 mg, 97.8 μmol) in DCM (5 mL) was added TFA (2 mL). The reaction mixture was stirred at room temperature for 2 hrs, then concentrated to afford a crude product, which was purified by pre-HPLC to afford Example 3B (27 mg, 67.2% yield). calc'd 412 [(M+H)$^+$], measured 412 [(M+H)$^+$]. $^1$H NMR (400 MHz, METHANOL-d$_4$) δ ppm 9.03 (dd, J=1.7, 4.2 Hz, 1H), 8.72 (dd, J=1.6, 8.6 Hz, 1H), 8.18 (d, J=7.9 Hz, 1H), 7.72-7.65 (m, 2H), 7.37 (d, J=7.9 Hz, 1H), 6.89 (d, J=8.7 Hz, 1H), 5.07-5.00 (m, 1H), 4.54 (d, J=14.1 Hz, 1H), 4.32 (d, J=14.1 Hz, 1H), 3.92-3.84 (m, 4H), 3.86-3.69 (m, 2H), 3.63-3.41 (m, 3H), 3.37-3.34 (m, 4H), 3.29-3.21 (m, 1H).

Example 4A and 4B

5-[(2R)-11-(4-amino-4-methyl-1-piperidyl)-4,7,10-triazatricyclo[7.4.0.02,7]trideca-1(9),10,12-trien-4-yl]quinoline-8-carbonitrile and 5-[(2S)-11-(4-amino-4-methyl-1-piperidyl)-4,7,10-triazatricyclo[7.4.0.02,7]trideca-1(9),10,12-trien-4-yl]quinoline-8-carbonitrile

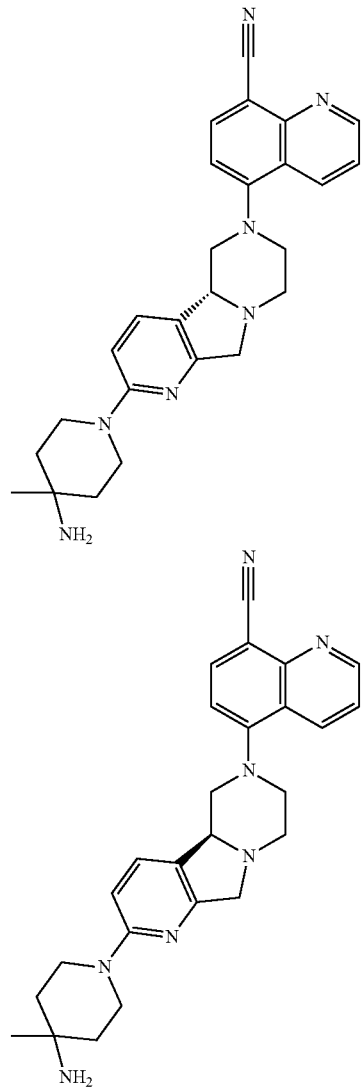 [SMILES: CC1(N)CCN(c2ccc3c(n2)CN2CCN(c4ccc(C#N)c5ncccc45)C[C@@H]32)CC1 ; CC1(N)CCN(c2ccc3c(n2)CN2CCN(c4ccc(C#N)c5ncccc45)C[C@H]32)CC1]

The title compound (Example 4A and 4B) was prepared in analogy to the preparation of Example 3A and 3B, by replacing tert-butyl piperazine-1-carboxylate with tert-butyl N-(4-methyl-4-piperidyl)carbamate in step (a).

Example 4A, calc'd 440 [(M+H)+], measured 440 [(M+H)+]. $^1$H NMR (400 MHz, METHANOL-$d_4$) δ ppm 8.91 (dd, J=1.7, 4.2 Hz, 1H), 8.60 (dd, J=1.6, 8.7 Hz, 1H), 8.06 (d, J=7.9 Hz, 1H), 7.58 (dd, J=4.3, 8.6 Hz, 1H), 7.50 (d, J=8.7 Hz, 1H), 7.25 (d, J=7.9 Hz, 1H), 6.72 (d, J=8.8 Hz, 1H), 4.93-4.85 (m, 1H), 4.47 (d, J=14.2 Hz, 1H), 4.27 (d, J=14.1 Hz, 1H), 4.07-3.96 (m, 2H), 3.75-3.63 (m, 2H), 3.57-3.50 (m, 2H), 3.46-3.32 (m, 2H), 3.29-3.13 (m, 6H), 1.39 (s, 3H).

Example 4B, calc'd 440 [(M+H)+], measured 440 [(M+H)+]. $^1$H NMR (400 MHz, METHANOL-$d_4$) δ ppm 8.90 (dd, J=1.6, 4.3 Hz, 1H), 8.60 (dd, J=1.6, 8.6 Hz, 1H), 8.05 (d, J=7.9 Hz, 1H), 7.57 (dd, J=4.2, 8.6 Hz, 1H), 7.45 (d, J=8.6 Hz, 1H), 7.22 (d, J=8.1 Hz, 1H), 6.68 (d, J=8.7 Hz, 1H), 6.72-6.61 (m, 1H), 4.93-4.85 (m, 1H), 4.47 (d, J=14.2 Hz, 1H), 4.27 (d, J=14.1 Hz, 1H), 4.07-3.96 (m, 2H), 3.75-3.63 (m, 2H), 3.57-3.50 (m, 2H), 3.46-3.32 (m, 2H), 3.29-3.13 (m, 6H), 1.39 (s, 3H).

Example 5

5-[(2S,6R)-6-methyl-11-piperazin-1-yl-4,7,10-triaza-tricyclo[7.4.0.02,7]trideca-1(9),10,12-trien-4-yl]quinoline-8-carbonitrile The titled compound was synthesized according to the following scheme:

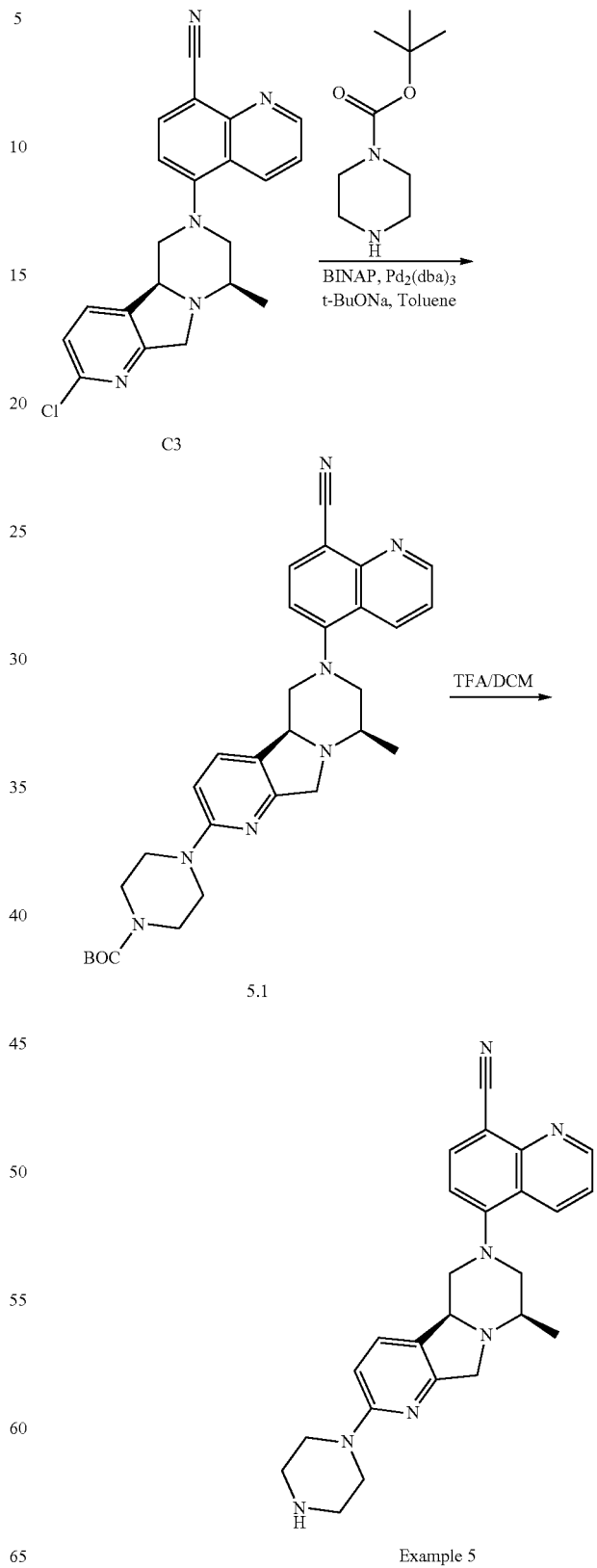

Step (a): preparation of tert-butyl 4-[(2S,6R)-4-(8-cyano-5-quinolyl)-6-methyl-4,7,10-triazatricyclo[7.4.0.02,7]trideca-1(9),10,12-trien-11-yl]piperazine-1-carboxylate (compound 5.1)

To a solution of 5-[(2S,6R)-11-chloro-6-methyl-4,7,10-triazatricyclo[7.4.0.02,7]trideca-1(9),10,12-trien-4-yl]quinoline-8-carbonitrile (Intermediate C3, 50 mg, 133 μmol) in toluene (6 mL) was added tert-butyl piperazine-1-carboxylate (29.7 mg, 160 μmol), Pd$_2$(dba)$_3$ (6.09 mg, 6.6 μmol), BINAP (8.28 mg, 13.3 μmol) and tBuONa (25.6 mg, 266 μmol). The resultant mixture was stirred at 100° C. for 20 hrs. After being cooled to room temperature, the reaction mixture was diluted with water (15 mL) and extracted with EA (15 mL) for three times. The combined organic layer was washed with brine, dried over Na$_2$SO$_4$, filtered and concentrated in vacuo. The residue was purified by flash chromatography (silica gel, 20 g, 0% to 10% MeOH in DCM) to afford compound 5.1 (47 mg, 67.3% yield). calc'd 526 [(M+H)$^+$], measured 526 [(M+H)$^+$].

Step (b): preparation of 5-[(2S,6R)-6-methyl-11-piperazin-1-yl-4,7,10-triazatricyclo [7.4.0.02,7]trideca-1(9),10,12-trien-4-yl]quinoline-8-carbonitrile (Example 5)

To a solution of tert-butyl 4-[(2S,6R)-4-(8-cyano-5-quinolyl)-6-methyl-4,7,10-triazatricyclo [7.4.0.02,7]trideca-1(9),10,12-trien-11-yl]piperazine-1-carboxylate (compound 5.1, 47 mg, 89.4 μmol) in DCM (5 mL) was added TFA (2 mL). The reaction mixture was stirred at room temperature for 2 hrs, then concentrated to afford a crude product, which was purified by pre-HPLC to afford Example 5 (29 mg, 76.3% yield). calc'd 426 [(M+H)$^+$], measured 426 [(M+H)$^+$]. $^1$H NMR (400 MHz, METHANOL-d$_4$) δ ppm 9.06 (dd, J=1.7, 4.2 Hz, 1H), 8.80 (dd, J=1.6, 8.6 Hz, 1H), 8.20 (d, J=7.9 Hz, 1H), 7.79-7.68 (m, 2H), 7.41 (d, J=7.9 Hz, 1H), 6.96 (d, J=8.8 Hz, 1H), 5.44-5.33 (m, 1H), 4.53 (d, J=14.3 Hz, 1H), 4.39-4.32 (m, 1H), 4.02-3.85 (m, 5H), 3.67 (br d, J=13.0 Hz, 1H), 3.39-3.33 (m, 6H), 3.21-3.10 (m, 1H), 1.56 (d, J=6.7 Hz, 3H).

Example 6

5-[(2S,6R)-6-methyl-11-(9-oxa-3,7-diazabicyclo[3.3.1]nonan-3-yl)-4,7,10-triazatricyclo[7.4.0.02,7]trideca-1(9),10,12-trien-4-yl]quinoline-8-carbonitrile

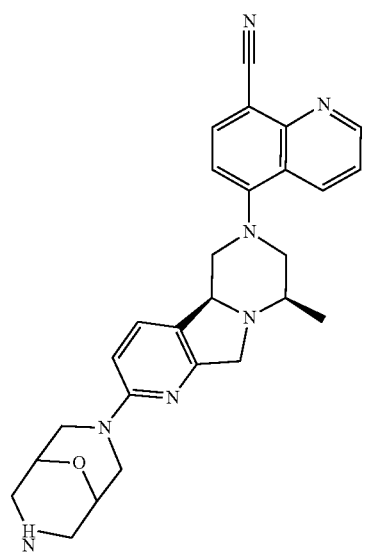 [SMILES: C[C@@H]1CN(c2ccc(C#N)c3ncccc23)C[C@@H]2c3ccc(N4CC5CNCC(C4)O5)nc3CN12]

The title compound was prepared in analogy to the preparation of Example 5 by replacing tert-butyl piperazine-1-carboxylate with tert-butyl 9-oxa-3,7-diazabicyclo[3.3.1]nonane-3-carboxylate (CAS: 478647-20-0, WuXi Pharma, Catalog: WX120052) in step (a). Example 6 was obtained. MS: calc'd 468 [(M+H)$^+$], measured 468 [(M+H)$^+$]. $^1$H NMR (400 MHz, METHANOL-d$_4$) δ ppm 9.01 (dd, J=1.6, 4.2 Hz, 1H), 8.73 (dd, J=1.7, 8.6 Hz, 1H), 8.17 (d, J=7.9 Hz, 1H), 7.69 (dd, J=4.2, 8.6 Hz, 1H), 7.59 (d, J=8.6 Hz, 1H), 7.33 (d, J=8.1 Hz, 1H), 6.82 (d, J=8.4 Hz, 1H), 4.34-4.21 (m, 6H), 3.89 (br d, J=11.5 Hz, 1H), 3.84-3.79 (m, 1H), 3.64-3.53 (m, 4H), 3.53-3.43 (m, 2H), 3.30-3.22 (m, 2H), 3.08-2.98 (m, 1H), 2.95-2.85 (m, 1H), 1.32 (d, J=6.4 Hz, 3H).

Example 7

5-[(2S,6R)-11-[(3R)-3-amino-3-methyl-pyrrolidin-1-yl]-6-methyl-4,7,10-triazatricyclo[7.4.0.02,7]trideca-1(9),10,12-trien-4-yl]-2-deuterio-quinoline-8-carbonitrile

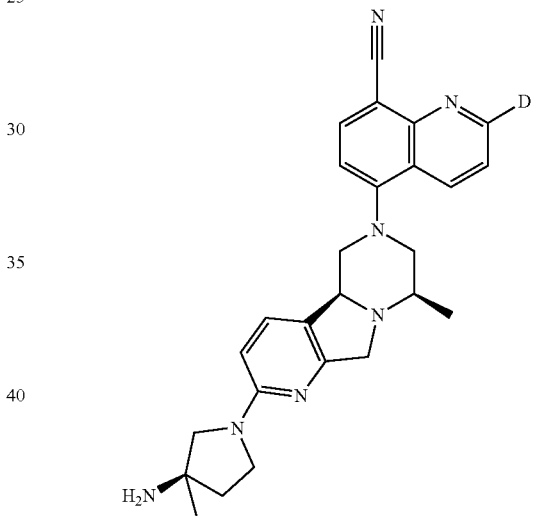

The title compound was prepared in analogy to the preparation of Example 5, replacing 5-[(2S,6R)-11-chloro-6-methyl-4,7,10-triazatricyclo[7.4.0.02,7]trideca-1(9),10,12-trien-4-yl]quinoline-8-carbonitrile (Intermediate C3) with the 5-[(2S,6R)-11-chloro-6-methyl-4,7,10-triazatricyclo[7.4.0.02,7]trideca-1(9),10,12-trien-4-yl]-2-deuterio-quinoline-8-carbonitrile (Intermediate C4) and tert-butyl piperazine-1-carboxylate with the tert-butyl N-[(3R)-3-methylpyrrolidin-3-yl]carbamate (CAS: 167888-15-5, PharmaBlock, Catalog: PBXA3113) in step (a). Example 7 was obtained. MS: calc'd 441 [(M+H)$^+$], measured 441 [(M+H)$^+$]. $^1$H NMR (400 MHz, METHANOL-d$_4$) δ ppm 8.76 (d, J=8.6 Hz, 1H), 8.18 (d, J=7.9 Hz, 1H), 7.71 (d, J=8.6 Hz, 1H), 7.59 (d, J=8.6 Hz, 1H), 7.36 (d, J=8.1 Hz, 1H), 6.48 (d, J=8.6 Hz, 1H), 4.92-4.85 (m, 1H), 4.60 (d, J=13.7 Hz, 1H), 4.19 (d, J=13.7 Hz, 1H), 4.01-3.87 (m, 2H), 3.84 (d, J=11.6 Hz, 1H), 3.77-3.69 (m, 1H), 3.68-3.61 (m, 1H), 3.60-3.54 (m, 2H), 3.22-3.04 (m, 2H), 2.38-2.27 (m, 2H), 1.60 (s, 3H), 1.45 (d, J=6.6 Hz, 3H).

Example 8

5-[(2S,6R)-11-[(3S)-3-amino-3-methyl-pyrrolidin-1-yl]-6-methyl-4,7,10-triazatricyclo[7.4.0.02,7]trideca-1(9),10,12-trien-4-yl]-2-deuterio-quinoline-8-carbonitrile

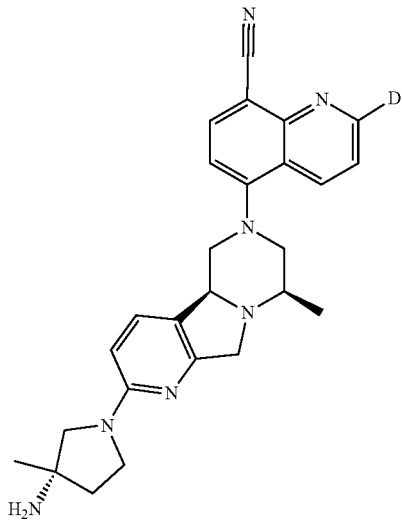 [SMILES: [2H]c1ccc2c(N3C[C@@H](C)N4Cc5nc(N6CC[C@](C)(N)C6)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl N-[(3S)-3-methylpyrrolidin-3-yl]carbamate (CAS: 927652-04-8, PharmaBlock, Catalog: PBXA3216) in step (a). Example 8 was obtained. MS: calc'd 441 [(M+H)+], measured 441 [(M+H)+]. $^1$H NMR (400 MHz, METHANOL-$d_4$) δ ppm 8.72 (d, J=8.6 Hz, 1H), 8.16 (d, J=7.9 Hz, 1H), 7.67 (d, J=8.7 Hz, 1H), 7.50 (d, J=8.4 Hz, 1H), 7.32 (d, J=8.1 Hz, 1H), 6.41 (d, J=8.4 Hz, 1H), 4.33-4.29 (m, 1H), 4.25 (d, J=13.2 Hz, 1H), 3.90-3.82 (m, 1H), 3.82-3.74 (m, 2H), 3.74-3.58 (m, 2H), 3.57-3.43 (m, 3H), 3.05-2.87 (m, 2H), 2.29 (t, J=7.2 Hz, 2H), 1.58 (s, 3H), 1.30 (d, J=6.4 Hz, 3H).

Example 9

2-Deuterio-5-[(2S,6R)-11-(2,6-diazaspiro[3.4]octan-6-yl)-6-methyl-4,7,10-triazatricyclo[7.4.0.02,7]trideca-1(9),10,12-trien-4-yl]quinoline-8-carbonitrile

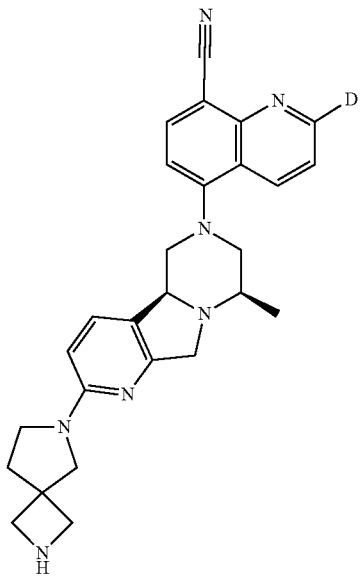 [SMILES: [2H]c1ccc2c(N3C[C@@H](C)N4Cc5nc(N6CCC7(CNC7)C6)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl 2,7-diazaspiro[3.4]octane-2-carboxylate (CAS: 885270-84-8, PharmaBlock, Catalog: PB00717) in step (a). Example 9 was obtained. MS: calc'd 453 [(M+H)+], measured 453 [(M+H)+]. $^1$H NMR (400 MHz, METHANOL-$d_4$) δ ppm 8.64 (d, J=8.6 Hz, 1H), 8.03 (d, J=8.1 Hz, 1H), 7.59 (d, J=8.6 Hz, 1H), 7.49 (d, J=8.6 Hz, 1H), 7.25 (d, J=8.1 Hz, 1H), 6.35 (d, J=8.8 Hz, 1H), 5.06-4.99 (m, 1H), 4.61 (d, J=13.9 Hz, 1H), 4.23 (d, J=13.9 Hz, 1H), 4.12-3.96 (m, 5H), 3.85-3.75 (m, 1H), 3.66 (s, 2H), 3.54-3.40 (m, 3H), 3.19-3.12 (m, 1H), 3.04-2.95 (m, 1H), 2.27 (t, J=7.0 Hz, 2H), 1.40 (d, J=6.6 Hz, 3H).

Example 10

5-[(2S,6R)-11-[(3aS,6aS)-3,3a,4,5,6,6a-hexahydro-2H-pyrrolo[2,3-c]pyrrol-1-yl]-6-methyl-4,7,10-triazatricyclo[7.4.0.02,7]trideca-1(9),10,12-trien-4-yl]-2-deuterio-quinoline-8-carbonitrile

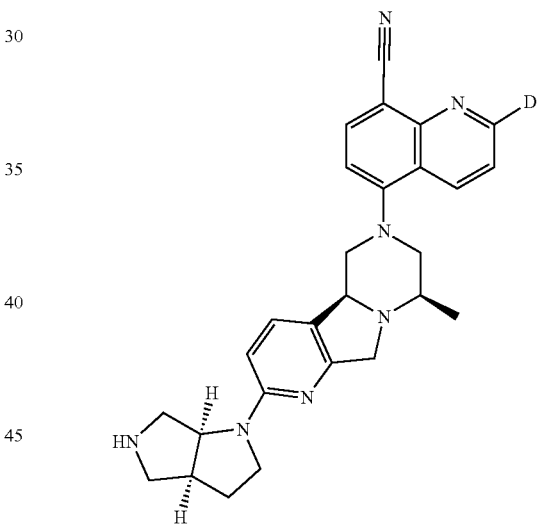

The title compound was prepared in analogy to the preparation of Example 7 by replacing tert-butyl N-[(3R)-3-methylpyrrolidin-3-yl]carbamate with tert-butyl (3aS,6aS)-2,3,3a,4,6,6a-hexahydro-1H-pyrrolo[3,4-b]pyrrole-5-carboxylate in step (a). Example 10 was obtained. MS: calc'd 453 [(M+H)+], measured 453 [(M+H)+]. $^1$H NMR (400 MHz, METHANOL-$d_4$) δ ppm 8.78 (d, J=8.6 Hz, 1H), 8.18 (d, J=8.1 Hz, 1H), 7.73 (d, J=8.6 Hz, 1H), 7.63 (d, J=8.6 Hz, 1H), 7.38 (d, J=8.1 Hz, 1H), 6.57 (d, J=8.6 Hz, 1H), 5.11-5.00 (m, 1H), 4.75-4.55 (m, 2H), 4.32 (d, J=13.7 Hz, 1H), 4.18-4.01 (m, 1H), 3.97-3.87 (m, 1H), 3.78-3.46 (m, 6H), 3.32-3.17 (m, 3H), 3.16-3.01 (m, 1H), 2.43-2.25 (m, 1H), 2.12-1.99 (m, 1H), 1.49 (d, J=6.5 Hz, 3H).

Example 11

5-[(2S,6R)-11-[(3R,4R)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile

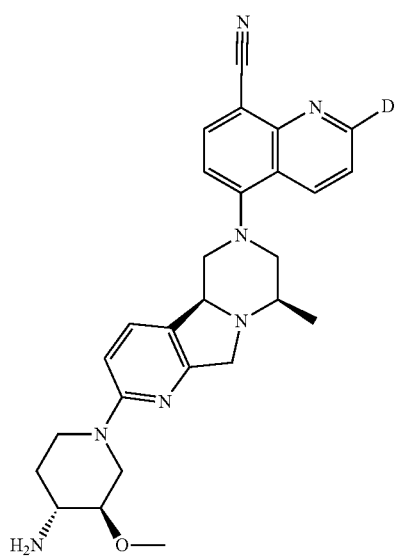 [SMILES: [2H]c1ccc2c(N3C[C@@H](C)N4Cc5nc(N6CC[C@@H](N)[C@H](OC)C6)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl N-[(3R,4R)-3-methoxy-4-piperidyl]carbamate (PharmaBlock, Catalog: PB07428-1) in step (a). Example 11 was obtained. MS: calc'd 471 [(M+H)$^+$], measured 471 [(M+H)$^+$]. $^1$H NMR (400 MHz, METHANOL-d$_4$) δ ppm 8.75 (d, J=8.7 Hz, 1H), 8.18 (d, J=8.1 Hz, 1H), 7.70 (d, J=8.6 Hz, 1H), 7.56 (d, J=8.6 Hz, 1H), 7.35 (d, J=7.9 Hz, 1H), 6.82 (d, J=8.7 Hz, 1H), 4.94 (br d, J=2.1 Hz, 1H), 4.74-4.54 (m, 1H), 4.47-4.33 (m, 2H), 3.99 (d, J=13.2 Hz, 1H), 3.89 (br d, J=12.0 Hz, 1H), 3.75-3.67 (m, 1H), 3.57-3.48 (m, 1H), 3.56 (s, 3H), 3.30-3.21 (m, 2H), 3.08-2.91 (m, 3H), 2.73-2.58 (m, 1H), 2.17-2.09 (m, 1H), 1.77-1.64 (m, 1H), 1.38 (d, J=6.5 Hz, 3H).

Example 12

5-[(2S,6R)-11-[(3S,4S)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile

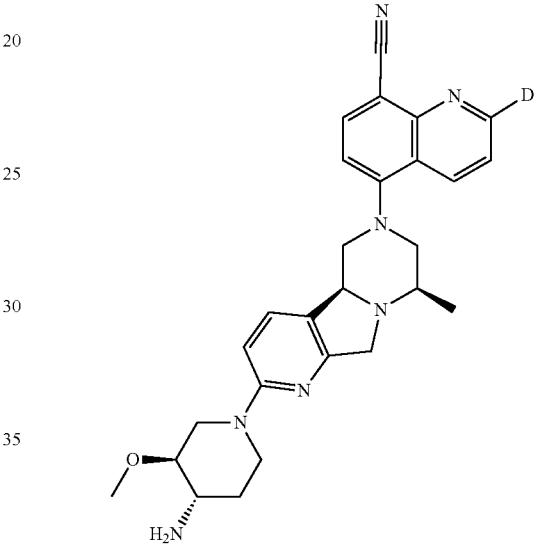

The title compound was prepared in analogy to the preparation of Example 7 by replacing tert-butyl N-[(3R)-3-methylpyrrolidin-3-yl]carbamate with tert-butyl N-[(3S,4S)-3-methoxy-4-piperidyl]carbamate (PharmaBlock, Catalog: PB97963-1) in step (a). Example 12 was obtained. MS: calc'd 471 [(M+H)$^+$], measured 471 [(M+H)$^+$]. $^1$H NMR (400 MHz, METHANOL-d$_4$) δ ppm 8.64 (s, 1H), 8.05 (d, J=8.1 Hz, 1H), 7.60 (d, J=8.7 Hz, 1H), 7.52 (d, J=8.7 Hz, 1H), 7.25 (d, J=8.1 Hz, 1H), 6.77 (d, J=8.8 Hz, 1H), 4.97-4.89 (m, 1H), 4.87-4.82 (m, 1H), 4.57 (d, J=13.8 Hz, 1H), 4.36-4.28 (m, 1H), 4.18 (d, J=13.8 Hz, 1H), 3.96 (br d, J=3.4 Hz, 1H), 3.85-3.76 (m, 1H), 3.53-3.46 (m, 1H), 3.44 (s, 3H), 3.17-3.07 (m, 3H), 3.03-2.95 (m, 1H), 2.91-2.80 (m, 1H), 2.59-2.47 (m, 1H), 2.06-1.97 (m, 1H), 1.64-1.51 (m, 1H), 1.37 (d, J=6.6 Hz, 3H).

Example 13

5-[(2S,6R)-11-[(3R,4S)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile

Example 14

5-[(2S,6R)-11-[(3S,4S)-3-amino-4-methoxy-1-piperidyl]-6-methyl-4,7,10-triazatricyclo[7.4.0.02,7]trideca-1(9),10,12-trien-4-yl]-2-deuterio-quinoline-8-carbonitrile

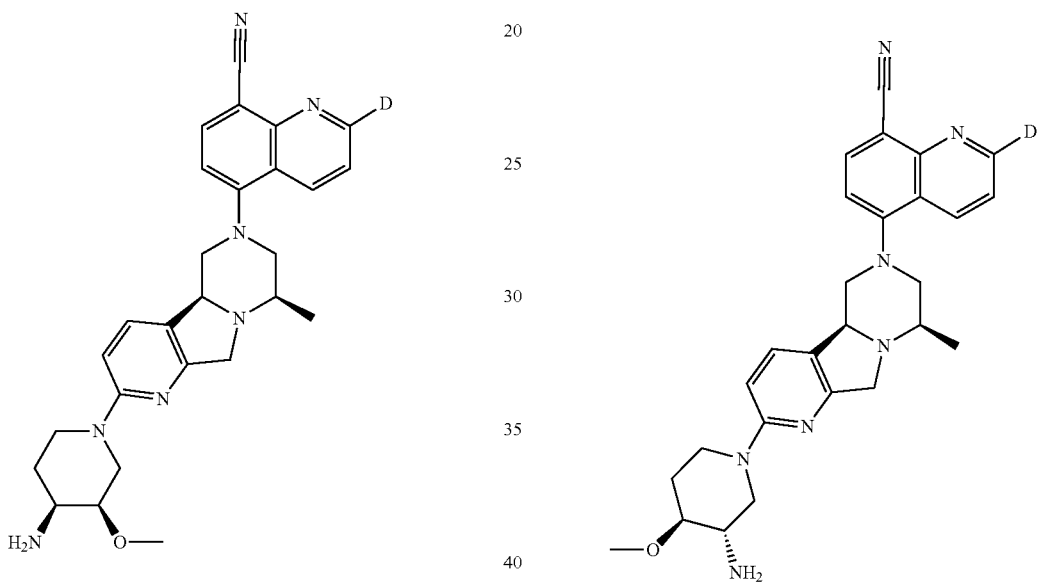

The title compound was prepared in analogy to the preparation of Example 7 by replacing tert-butyl N-[(3R)-3-methylpyrrolidin-3-yl]carbamate with tert-butyl N-[(3R,4S)-3-methoxy-4-piperidyl]carbamate (PharmaBlock, Catalog: PB97963-1) in step (a). Example 13 was obtained. MS: calc'd 471 [(M+H)$^+$], measured 471 [(M+H)$^+$]. $^1$H NMR (400 MHz, METHANOL-d$_4$) δ ppm 8.76 (d, J=8.6 Hz, 1H), 8.18 (d, J=7.9 Hz, 1H), 7.71 (d, J=8.7 Hz, 1H), 7.55 (d, J=8.7 Hz, 1H), 7.37 (d, J=7.9 Hz, 1H), 6.80 (d, J=8.8 Hz, 1H), 4.99-4.93 (m, 1H), 4.85-4.80 (m, 1H), 4.55 (d, J=13.6 Hz, 1H), 4.45-4.35 (m, 1H), 4.14 (d, J=13.7 Hz, 1H), 3.96-3.85 (m, 2H), 3.65 (br s, 1H), 3.60-3.51 (m, 2H), 3.42 (s, 3H), 3.20-2.93 (m, 4H), 2.02-1.90 (m, 1H), 1.88-1.79 (m, 1H), 1.44 (d, J=6.6 Hz, 3H).

The title compound was prepared in analogy to the preparation of Example 7 by replacing tert-butyl N-[(3R)-3-methylpyrrolidin-3-yl]carbamate with tert-butyl N-[(3S,4S)-4-methoxy-3-piperidyl]carbamate (PharmaBlock, Catalog: PBZ5290-1) in step (a). Example 14 was obtained. MS: calc'd 471 [(M+H)$^+$], measured 471 [(M+H)$^+$]. $^1$H NMR (400 MHz, METHANOL-d$_4$) δ ppm 8.74 (d, J=8.6 Hz, 1H), 8.17 (d, J=7.9 Hz, 1H), 7.69 (d, J=8.6 Hz, 1H), 7.56 (d, J=8.6 Hz, 1H), 7.34 (d, J=8.1 Hz, 1H), 6.80 (d, J=8.7 Hz, 1H), 4.78-4.67 (m, 1H), 4.51 (br d, J=9.7 Hz, 1H), 4.35 (d, J=13.3 Hz, 1H), 4.28-4.21 (m, 1H), 3.95-3.85 (m, 2H), 3.68-3.61 (m, 1H), 3.54-3.40 (m, 2H), 3.47 (s, 3H), 3.18-2.90 (m, 5H), 2.39-2.31 (m, 1H), 1.48-1.39 (m, 1H), 1.35 (d, J=6.5 Hz, 3H).

Example 15

5-[(2S,6R)-11-[(3R,4R)-3-amino-4-methoxy-1-piperidyl]-6-methyl-4,7,10-triazatricyclo[7.4.0.02,7]trideca-1(9),10,12-trien-4-yl]-2-deuterio-quinoline-8-carbonitrile

Example 16

2-Deuterio-5-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]quinoline-8-carbonitrile

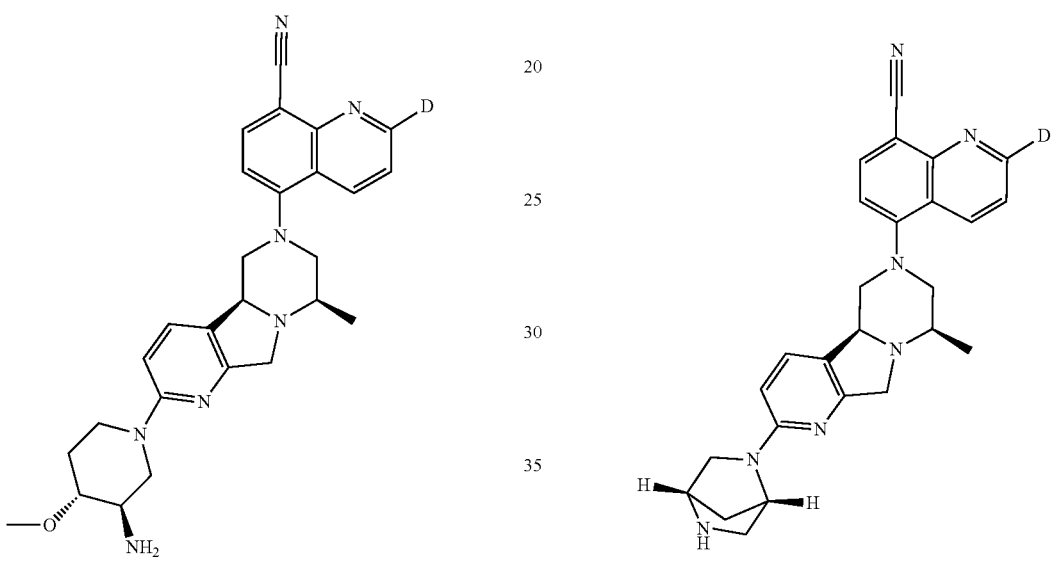

The title compound was prepared in analogy to the preparation of Example 7 by replacing tert-butyl N-[(3R)-3-methylpyrrolidin-3-yl]carbamate with tert-butyl N-[(3R,4R)-4-methoxy-3-piperidyl]carbamate (CAS:2227199-27-9, PharmaBlock, Catalog:PBZ5289-1) in step (a). Example 15 was obtained. MS: calc'd 471 [(M+H)$^+$], measured 471 [(M+H)$^+$]. $^1$H NMR (400 MHz, METHANOL-d$_4$) δ ppm 8.74 (d, J=8.6 Hz, 1H), 8.17 (d, J=7.9 Hz, 1H), 7.70 (d, J=8.6 Hz, 1H), 7.56 (d, J=8.7 Hz, 1H), 7.34 (d, J=8.1 Hz, 1H), 6.79 (d, J=8.7 Hz, 1H), 4.77-4.71 (m, 1H), 4.49 (br d, J=10.1 Hz, 1H), 4.34 (d, J=13.2 Hz, 1H), 4.26 (br d, J=14.1 Hz, 1H), 3.93-3.85 (m, 2H), 3.68-3.59 (m, 1H), 3.54-3.40 (m, 2H), 3.47 (s, 3H), 3.17-3.08 (m, 1H), 3.06-2.91 (m, 4H), 2.39-2.28 (m, 1H), 1.51-1.40 (m, 1H), 1.35 (d, J=6.5 Hz, 3H).

The title compound was prepared in analogy to the preparation of Example 7 by replacing tert-butyl N-[(3R)-3-methylpyrrolidin-3-yl] carbamate with tert-butyl (1S,4S)-2,5-diazabicyclo [2.2.1]heptane-2-carboxylate (CAS: 113451-59-5, PharmaBlock, Catalog: PBN20120579) in step (a). Example 16 was obtained. MS: calc'd 439 [(M+H)$^+$], measured 439 [(M+H)$^+$]. $^1$H NMR (400 MHz, METHANOL-d$_4$) δ ppm 8.75 (d, J=8.6 Hz, 1H), 8.15 (d, J=7.9 Hz, 1H), 7.70 (d, J=8.6 Hz, 1H), 7.63 (d, J=8.6 Hz, 1H), 7.35 (d, J=8.1 Hz, 1H), 6.55 (d, J=8.6 Hz, 1H), 5.06-5.00 (m, 2H), 4.67 (d, J=13.8 Hz, 1H), 4.55 (s, 1H), 4.28 (d, J=13.9 Hz, 1H), 4.13-4.02 (m, 1H), 3.95-3.87 (m, 1H), 3.78-3.71 (m, 1H), 3.59 (br d, J=10.8 Hz, 2H), 3.46-3.35 (m, 2H), 3.26-3.18 (m, 1H), 3.14-3.04 (m, 1H), 2.27 (br d, J=11.2 Hz, 1H), 2.09 (br d, J=11.1 Hz, 1H), 1.47 (d, J=6.7 Hz, 3H).

Example 17

2-Deuterio-5-[(2S,6R)-11-[(1R,4R)-2,5-diazabicyclo[2.2.1]heptan-2-yl]-6-methyl-4,7,10-triazatricyclo[7.4.0.0²,⁷]trideca-1(9),10,12-trien-4-yl]quinoline-8-carbonitrile

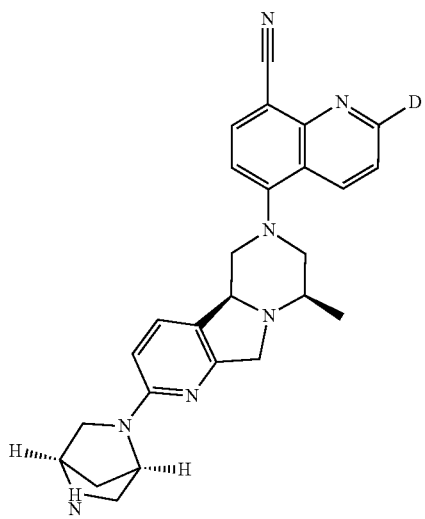 [SMILES: [2H]c1ccc2c(N3C[C@@H](C)N4Cc5nc(N6C[C@H]7C[C@@H]6CN7)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl (1R,4R)-2,5-diazabicyclo[2.2.1]heptane-2-carboxylate (CAS: 134003-84-2, PharmaBlock, Catalog: PBN20120578) in step (a). Example 17 was obtained. MS: calc'd 439 [(M+H)$^+$], measured 439 [(M+H)$^+$]. $^1$H NMR (400 MHz, METHANOL-d$_4$) δ ppm 8.74 (d, J=8.6 Hz, 1H), 8.15 (d, J=7.9 Hz, 1H), 7.69 (d, J=8.7 Hz, 1H), 7.63 (d, J=8.6 Hz, 1H), 7.35 (d, J=8.1 Hz, 1H), 6.55 (d, J=8.7 Hz, 1H), 5.07-4.98 (m, 2H), 4.66 (d, J=13.8 Hz, 1H), 4.55 (s, 1H), 4.27 (d, J=13.9 Hz, 1H), 4.14-4.01 (m, 1H), 3.95-3.87 (m, 1H), 3.79-3.70 (m, 1H), 3.63-3.55 (m, 2H), 3.46-3.34 (m, 2H), 3.26-3.16 (m, 1H), 3.14-3.04 (m, 1H), 2.27 (br d, J=11.2 Hz, 1H), 2.09 (br d, J=11.4 Hz, 1H), 1.47 (d, J=6.7 Hz, 3H).

Example 18

2-Deuterio-5-[(2S,6R)-6-methyl-11-(1-oxa-4,9-diazaspiro[5.5]undecan-9-yl)-4,7,10-triazatricyclo[7.4.0.0²,⁷]trideca-1(9),10,12-trien-4-yl]quinoline-8-carbonitrile

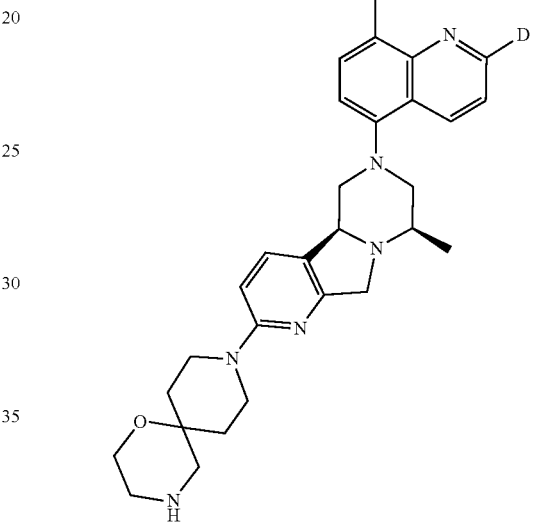

The title compound was prepared in analogy to the preparation of Example 7 by replacing tert-butyl N-[(3R)-3-methylpyrrolidin-3-yl]carbamate with tert-butyl 1-oxa-4,9-diazaspiro[5.5]undecane-4-carboxylate (CAS: 1023595-11-0, PharmaBlock, Catalog: PB05200) in step (a). Example 18 was obtained. MS: calc'd 497 [(M+H)$^+$], measured 497 [(M+H)$^+$]. $^1$H NMR (400 MHz, METHANOL-d$_4$) δ ppm 8.75 (d, J=8.6 Hz, 1H), 8.18 (d, J=7.9 Hz, 1H), 7.71 (d, J=8.7 Hz, 1H), 7.53 (d, J=8.7 Hz, 1H), 7.36 (d, J=8.1 Hz, 1H), 6.75 (d, J=8.7 Hz, 1H), 4.62-4.52 (m, 1H), 4.42 (d, J=13.3 Hz, 1H), 4.07 (br d, J=13.2 Hz, 2H), 4.01-3.95 (m, 3H), 3.92-3.85 (m, 1H), 3.78-3.67 (m, 1H), 3.56-3.45 (m, 1H), 3.30-3.20 (m, 4H), 3.14 (s, 2H), 3.05 (t, J=11.4 Hz, 2H), 2.07 (br d, J=13.2 Hz, 2H), 1.74-1.60 (m, 2H), 1.38 (d, J=6.6 Hz, 3H).

Example 19

5-[(2S,6R)-11-(4-amino-4-methyl-1-piperidyl)-6-methyl-4,7,10-triazatricyclo[7.4.0.02,7]trideca-1(9),10,12-trien-4-yl]-2-deuterio-quinoline-8-carbonitrile

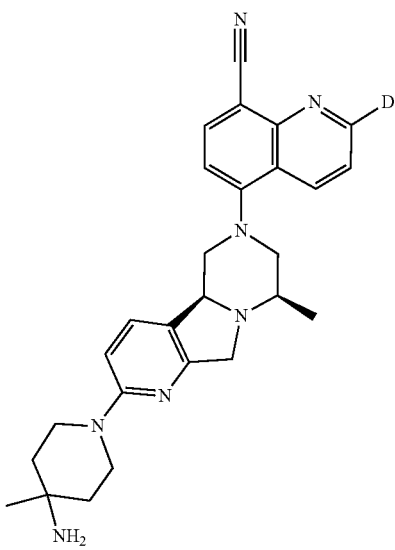 [SMILES: [2H]c1ccc2c(N3C[C@@H](C)N4Cc5nc(N6CCC(C)(N)CC6)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl N-(4-methyl-4-piperidyl) carbamate (CAS: 163271-08-7, PharmaBlock, Catalog: PB02909) in step (a). Example 19 was obtained. MS: calc'd 455 [(M+H)$^+$], measured 455 [(M+H)$^+$]. $^1$H NMR (400 MHz, METHANOL-d$_4$) δ ppm 8.75 (d, J=8.6 Hz, 1H), 8.18 (d, J=7.9 Hz, 1H), 7.70 (d, J=8.6 Hz, 1H), 7.55 (d, J=8.6 Hz, 1H), 7.35 (d, J=8.1 Hz, 1H), 6.78 (d, J=8.7 Hz, 1H), 4.67-4.58 (m, 1H), 4.44 (d, J=13.4 Hz, 1H), 4.16-4.07 (m, 2H), 4.01 (d, J=13.0 Hz, 1H), 3.93-3.84 (m, 1H), 3.81-3.70 (m, 1H), 3.53 (br d, J=12.8 Hz, 1H), 3.40-3.33 (m, 2H), 3.10-3.01 (m, 2H), 1.91-1.83 (m, 4H), 1.50 (s, 3H), 1.39 (d, J=6.6 Hz, 3H).

Example 20

5-[(2S,6R)-11-(1,4-diazepan-1-yl)-6-methyl-4,7,10-triazatricyclo[7.4.0.02,7]trideca-1(9),10,12-trien-4-yl]quinoline-8-carbonitrile

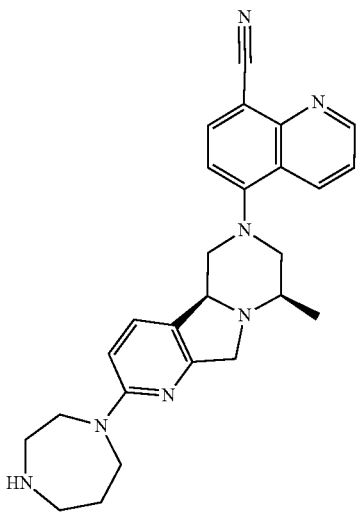 [SMILES: C[C@@H]1CN(c2ccc(C#N)c3ncccc23)C[C@@H]2c3ccc(N4CCCNCC4)nc3CN12]

The title compound was prepared in analogy to the preparation of Example 5 by replacing tert-butyl piperazine-1-carboxylate with tert-butyl 1,4-diazepane-1-carboxylate in step (a). Example 20 was obtained. MS: calc'd 440 [(M+H)$^+$], measured 440 [(M+H)$^+$]. $^1$H NMR (400 MHz, METHANOL-d$_4$) δ ppm 9.01 (dd, J=1.7, 4.2 Hz, 1H), 8.73 (dd, J=1.7, 8.6 Hz, 1H), 8.16 (d, J=8.1 Hz, 1H), 7.68 (dd, J=4.2, 8.6 Hz, 1H), 7.53 (d, J=8.7 Hz, 1H), 7.33 (d, J=8.1 Hz, 1H), 6.64 (d, J=8.7 Hz, 1H), 4.58-4.47 (m, 1H), 4.37 (d, J=13.4 Hz, 1H), 4.16-3.99 (m, 2H), 3.93 (d, J=12.1 Hz, 1H), 3.89-3.83 (m, 1H), 3.76 (t, J=6.1 Hz, 2H), 3.70-3.63 (m, 1H), 3.53-3.47 (m, 1H), 3.43-3.37 (m, 2H), 3.31-3.38 (m, 2H), 3.05-2.97 (m, 2H), 2.23-2.15 (m, 2H), 1.35 (d, J=6.6 Hz, 3H).

Example 21

4-[(2S,6R)-11-[(1S,4S)-2,5-diazabicyclo[2.2.1]heptan-2-yl]-6-methyl-4,7,10-triazatricyclo[7.4.0.0²,⁷]trideca-1(9),10,12-trien-4-yl]pyrazolo[1,5-a]pyridine-7-carbonitrile

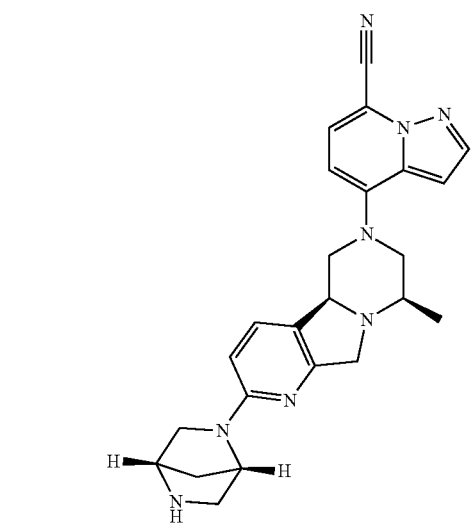 [SMILES: C[C@@H]1CN(c2ccc(C#N)n3nccc23)C[C@@H]2c3ccc(N4C[C@@H]5C[C@H]4CN5)nc3CN12]

The title compound was prepared according to the following scheme:

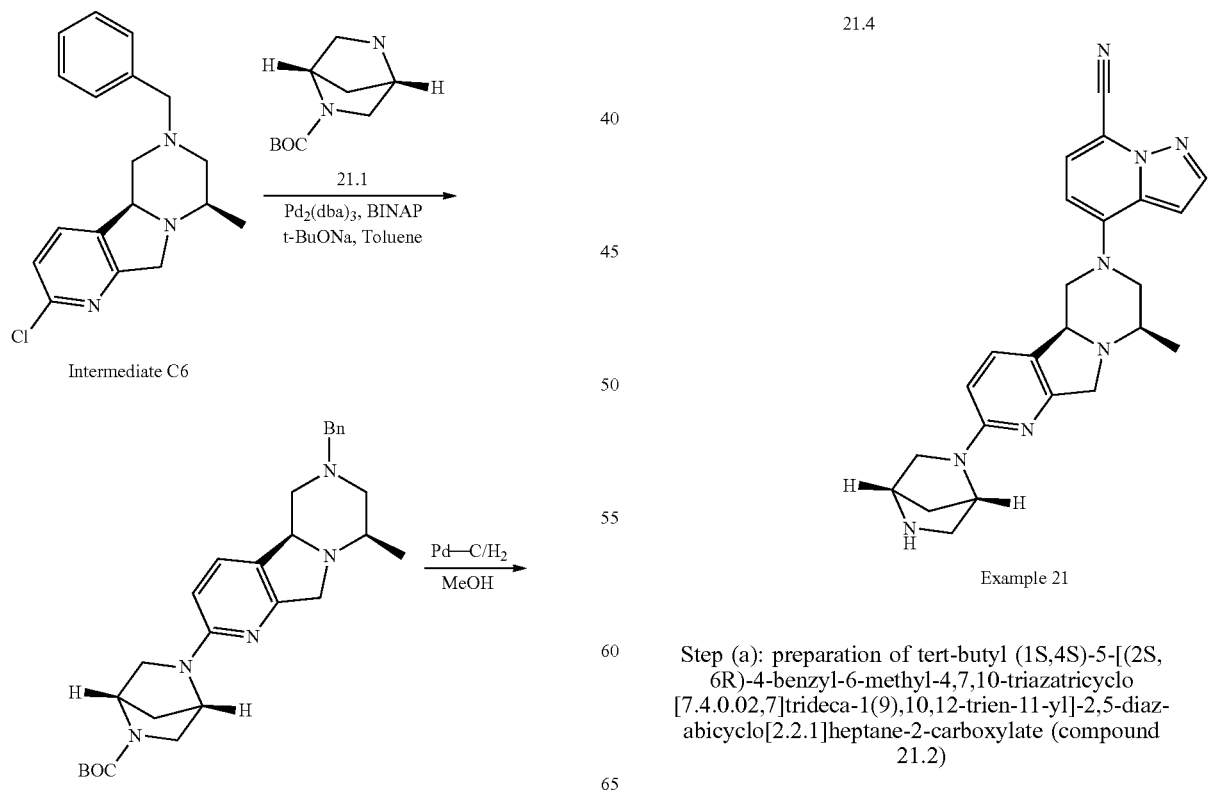

Step (a): preparation of tert-butyl (1S,4S)-5-[(2S,6R)-4-benzyl-6-methyl-4,7,10-triazatricyclo[7.4.0.0²,⁷]trideca-1(9),10,12-trien-11-yl]-2,5-diazabicyclo[2.2.1]heptane-2-carboxylate (compound 21.2)

To a solution of (2S,6R)-4-benzyl-11-chloro-6-methyl-4,7,10-triazatricyclo[7.4.0.0²,⁷]trideca-1(9),10,12-triene (intermediate C6, 660 mg, 2.1 mmol) in toluene (35 mL) was added tert-butyl (1S,4S)-2,5-diazabicyclo[2.2.1]heptane-2-carboxylate (compound 21.1, 417 mg, 2.1 mmol), BINAP (131 mg, 210 μmol), Pd$_2$(dba)$_3$ (96.3 mg, 105 μmol) and tBuONa (404 mg, 4.2 mmol). The reaction mixture was stirred at 100° C. for 20 hrs. After the mixture being cooled to room temperature, the reaction mixture was diluted with water (80 mL) and extracted with EA (50 mL) for three times. The combined organic layer was washed with brine, dried over Na$_2$SO$_4$, filtered and concentrated in vacuo. The residue was purified by flash chromatography (silica gel, 40 g, 0% to 10% DCM in MeOH) to afford compound 21.2 (610 mg, 61% yield). MS: calc'd 476 [(M+H)$^+$], measured 476 [(M+H)$^+$].

Step (b): preparation of tert-butyl (1S,4S)-5-[(2S,6R)-6-methyl-4,7,10-triazatricyclo [7.4.0.02,7]trideca-1(9),10,12-trien-11-yl]-2,5-diazabicyclo[2.2.1]heptane-2-carboxylate (compound 21.3)

A mixture of tert-butyl (1S,4S)-5-[(2S,6R)-4-benzyl-6-methyl-4,7,10-triazatricyclo [7.4.0.02,7]tridecα-1(9),10,12-trien-11-yl]-2,5-diazabicyclo[2.2.1]heptane-2-carboxylate (compound 21.2, 610 mg, 1.28 mmol) and Pd—C (50 mg) in MeOH (200 mL) was hydrogenated by a hydrogen balloon at room temperature for 6 hrs. After the catalyst was filtered off, the filtrate was concentrated in vacuo to afford compound 21.3 (420 mg, 84.9% yield). MS: calc'd 386 [(M+H)$^+$], measured 386 [(M+H)$^+$].

Step (c): preparation of tert-butyl (1S,4S)-5-[(2S,6R)-4-(7-cyanopyrazolo[1,5-a]pyridin-4-yl)-6-methyl-4,7,10-triazatricyclo[7.4.0.02,7]trideca-1(9),10,12-trien-11-yl]-2,5-diazabicyclo[2.2.1]heptane-2-carboxylate (compound 21.4)

To a solution of 4-fluoropyrazolo[1,5-a]pyridine-7-carbonitrile (Intermediate A3, 37.6 mg, 233 μmol) in DMSO (10 mL) was added tert-butyl (1S,4S)-5-[(2S,6R)-6-methyl-4,7,10-triazatricyclo [7.4.0.02,7]trideca-1(9),10,12-trien-11-yl]-2,5-diazabicyclo[2.2.1]heptane-2-carboxylate (compound 21.3, 90 mg, 233 μmol) and DIPEA (151 mg, 204 μL, 1.17 mmol). The reaction mixture was stirred at 120° C. for 20 hrs. After the mixture being cooled to room temperature, diluted with water (50 mL), and extracted with EA (30 mL) twice. The combined organic layer was washed with brine, dried over Na$_2$SO$_4$, filtered and concentrated in vacuo. The residue was purified by flash chromatography (silica gel, 24 g, 0% to 10% MeOH in DCM) to afford compound 21.4 (55 mg, 44.7% yield). MS: calc'd 527 [(M+H)$^+$], measured 527 [(M+H)$^+$].

Step (d): preparation of 4-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]pyrazolo[1,5-a]pyridine-7-carbonitrile (Example 21)

To a solution of tert-butyl (1S,4S)-5-[(2S,6R)-4-(7-cyanopyrazolo[1,5-a]pyridin-4-yl)-6-methyl-4,7,10-triazatricyclo[7.4.0.02,7]trideca-1(9),10,12-trien-11-yl]-2,5-diazabicyclo[2.2.1]heptane-2-carboxylate (compound 21.4, 55 mg, 104 μmol) in DCM (10 mL) was added TFA (3 mL). The reaction was stirred at room temperature for 2 hrs, then concentrated to afford a crude product, which was purified by pre-HPLC to afford Example 21 (28 mg, 63% yield). MS: calc'd 427 [(M+H)$^+$], measured 427 [(M+H)$^+$]. $^1$H NMR (400 MHz, METHANOL-d$_4$) δ ppm 8.06 (d, J=2.4 Hz, 1H), 7.59 (d, J=8.4 Hz, 1H), 7.47 (d, J=7.9 Hz, 1H), 6.95 (d, J=2.4 Hz, 1H), 6.68 (d, J=7.9 Hz, 1H), 6.50 (d, J=8.6 Hz, 1H), 5.01 (s, 1H), 4.55 (s, 1H), 4.37-4.29 (m, 2H), 4.27-4.21 (m, 1H), 3.94-3.83 (m, 2H), 3.79-3.71 (m, 1H), 3.58 (d, J=11.2 Hz, 1H), 3.53-3.45 (m, 1H), 3.43-3.36 (m, 2H), 3.09-2.94 (m, 2H), 2.27 (br d, J=11.1 Hz, 1H), 2.08 (br d, J=11.1 Hz, 1H), 1.36 (d, J=6.5 Hz, 3H).

Example 22

4-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]pyrazolo[1,5-a]pyridine-7-carbonitrile

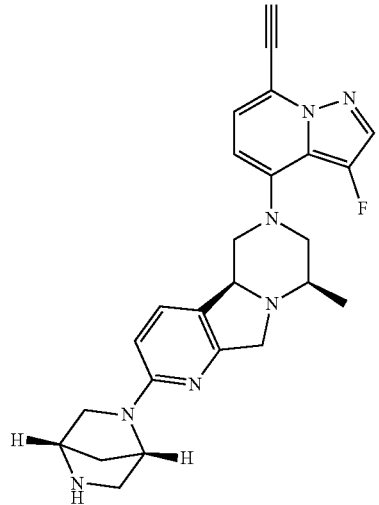 [SMILES: C#Cc1ccc(N2C[C@@H](C)N3Cc4nc(N5C[C@@H]6C[C@H]5CN6)ccc4[C@H]3C2)c2c(F)cnn12]

The title compound was prepared in analogy to the preparation of Example 21 by replacing 4-fluoropyrazolo[1,5-a]pyridine-7-carbonitrile (Intermediate A3) 3,4-difluoropyrazolo[1,5-a] pyridine-7-carbonitrile (Intermediate A4) in step (c). Example 22 was obtained. MS: calc'd 445 [(M+H)$^+$], measured 445 [(M+H)$^+$]. $^1$H NMR (400 MHz, METHANOL-d$_4$) δ ppm 8.02 (d, J=3.7 Hz, 1H), 7.50 (d, J=8.2 Hz, 1H), 7.46 (s, 1H), 6.57 (d, J=8.1 Hz, 1H), 6.45 (d, J=8.4 Hz, 1H), 5.00 (s, 1H), 4.53 (s, 1H), 4.14 (d, J=13.0 Hz, 1H), 4.07-3.93 (m, 2H), 3.78-3.71 (m, 1H), 3.69-3.59 (m, 2H), 3.54 (d, J=11.2 Hz, 1H), 3.42-3.35 (m, 2H), 3.24-3.16 (m, 1H), 2.91 (t, J=10.9 Hz, 1H), 2.86-2.78 (m, 1H), 2.28 (br d, J=10.9 Hz, 1H), 2.05 (br d, J=10.9 Hz, 1H), 1.26 (d, J=6.5 Hz, 3H).

Example 23

2-Deuterio-5-[(2S,6R)-6-methyl-11-(4-piperidyl)-4,7,10-triazatricyclo[7.4.0.02,7]trideca-1(9),10,12-trien-4-yl]quinoline-8-carbonitrile

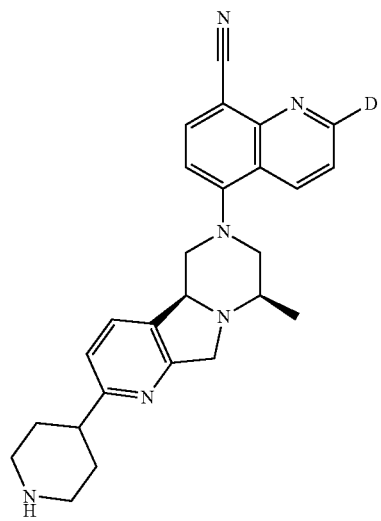 [SMILES: [2H]c1ccc2c(N3C[C@@H](C)N4Cc5nc(C6CCNCC6)ccc5[C@H]4C3)ccc(C#N)c2n1]

The title compound was prepared according to the following scheme:

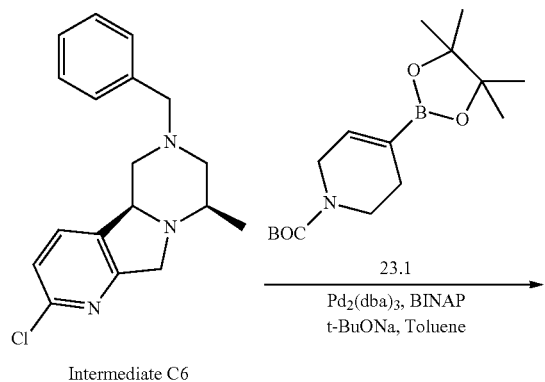

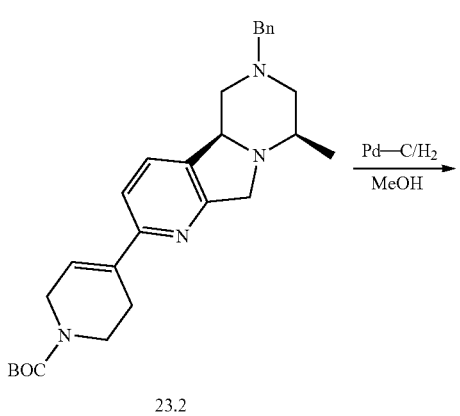

Step (a): preparation of tert-butyl 4-[(2S,6R)-4-benzyl-6-methyl-4,7,10-triazatricyclo [7.4.0.02,7]trideca-1(9),10,12-trien-11-yl]-3,6-dihydro-2H-pyridine-1-carboxylate (compound 23.2)

To a solution of (2S,6R)-4-benzyl-11-chloro-6-methyl-4,7,10-triazatricyclo[7.4.0.02,7]trideca-1(9),10,12-triene (Intermediate C6, 300 mg, 956 μmol) in dioxane (18 mL) and water (2 mL) was added tert-butyl 4-(4,4,5,5-tetramethyl-1, 3,2-dioxaborolan-2-yl)-3,6-dihydro-2H-pyridine-1-carboxylate (compound 23.1, 355 mg, 1.15 mmol), Pd (dppf)Cl₂.DCM adduct (39 mg, 47.8 µmol) and K₂CO₃ (264 mg, 1.91 mmol). The resultant mixture was stirred at 90° C. for hrs. After being cooled to room temperature, the reaction was quenched with water (60 mL) and extracted with EA (60 mL) twice. The combined organic layer was washed with brine, dried over Na₂SO₄, filtered and the filtrate was concentrated in vacuo. The residue was purified by flash chromatography (silica gel, 20 g, 0% to 100% EtOAc in DCM) to afford compound 23.2 (330 mg, 74.9% yield). MS: calc'd 461 [(M+H)⁺], measured 461 [(M+H)⁺].

Step (b): preparation of tert-butyl 4-[(2S,6R)-6-methyl-4,7,10-triazatricyclo[7.4.0.0²,⁷] trideca-1(9),10,12-trien-11-yl]piperidine-1-carboxylate (compound 23.3)

A mixture tert-butyl 4-[(2S,6R)-4-benzyl-6-methyl-4,7,10-triazatricyclo[7.4.0.0²,⁷]trideca-1(9),10,12-trien-11-yl]-3,6-dihydro-2H-pyridine-1-carboxylate (compound 23.2, 330 mg, 716 µmol) and Pd—C (30 mg) in MeOH (100 mL) was hydrogenated by a hydrogen balloon at room temperature for 5 hrs. After the catalyst was filtered off, the filtrate was concentrated in vacuo to afford compound 23.3 (210 mg, 78.7% yield) which was used directly for the next step without further purification. MS: calc'd 373 [(M+H)⁺], measured 373 [(M+H)⁺].

Step (c): preparation of tert-butyl 4-[(2S,6R)-4-(8-cyano-2-deuterio-5-quinolyl)-6-methyl-4,7,10-triazatricyclo[7.4.0.0²,⁷]trideca-1(9),10,12-trien-11-yl]piperidine-1-carboxylate (compound 23.4)

To a solution of tert-butyl 4-[(2S,6R)-6-methyl-4,7,10-triazatricyclo[7.4.0.0²,⁷]trideca-1(9),10,12-trien-11-yl]piperidine-1-carboxylate (compound 23.3,105 mg, 282 µmol) in DMSO (8 mL) was added 2-deuterio-5-fluoro-quinoline-8-carbonitrile (Intermediate A2, 48.8 mg, 282 µmol) and DIEA (182 mg, 246 µL, 1.41 mmol). The resultant mixture was stirred at 120° C. for hrs. After being cooled to room temperature, the reaction was quenched with water (30 mL) and extracted with EA (30 mL) twice. The combined organic layer was washed with brine, dried over Na₂SO₄, filtered and concentrated in vacuo. The residue was purified by flash chromatography (silica gel, 20 g, 0% to 100% EtOAc in PE) to afford compound 23.4 (55 mg, 37.1% yield). MS: calc'd 526 [(M+H)⁺], measured 526 [(M+H)⁺].

Step (d): preparation of 2-deuterio-5-[(2S,6R)-6-methyl-11-(4-piperidyl)-4,7,10-triazatricyclo[7.4.0.0²,⁷]trideca-1(9),10,12-trien-4-yl]quinoline-8-carbonitrile (Example 23)

To a solution of tert-butyl 4-[(2S,6R)-4-(8-cyano-2-deuterio-5-quinolyl)-6-methyl-4,7,10-triazatricyclo[7.4.0.0²,⁷] trideca-1(9),10,12-trien-11-yl]piperidine-1-carboxylate (compound 23.4, 55 mg, 105 µmol) in DCM (5 mL) was added TFA (2 mL). The reaction mixture was stirred at room temperature for 2 hrs, then concentrated to afford a crude product, which was purified by prep-HPLC to afford Example 23 (42 mg, 94.1% yield). MS: calc'd 426 [(M+H)⁺], measured 426 [(M+H)⁺]. ¹H NMR (400 MHz, METHANOL-d₄) δ ppm 8.78-8.68 (m, 1H), 8.15 (d, J=7.9 Hz, 1H), 7.76-7.62 (m, 2H), 7.34 (d, J=7.9 Hz, 1H), 7.23 (d, J=7.9 Hz, 1H), 4.53-4.37 (m, 2H), 3.99-3.90 (m, 2H), 3.58-3.47 (m, 4H), 3.23-3.04 (m, 4H), 2.96-2.89 (m, 1H), 2.20-1.96 (m, 4H), 1.33 (d, J=6.4 Hz, 3H).

Example 24

2-Deuterio-5-[(2S,6R)-6-methyl-11-(4-piperidyloxy)-4,7,10-triazatricyclo[7.4.0.0²,⁷]trideca-1(9),10,12-trien-4-yl]quinoline-8-carbonitrile

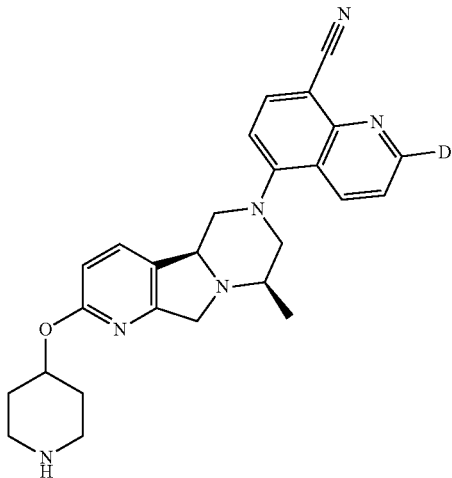 [SMILES: [2H]c1ccc2c(N3C[C@@H](C)N4Cc5nc(OC6CCNCC6)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl 4-hydroxypiperidine-1-carboxylate in step (a). Example 24 was obtained. MS: calc'd 442 [(M+H)⁺], measured 442 [(M+H)⁺]. ¹H NMR (400 MHz, METHANOL-d₄) δ ppm 8.65 (d, J=8.7 Hz, 1H), 8.03 (d, J=7.9 Hz, 1H), 7.70 (d, J=8.6 Hz, 1H), 7.59 (d, J=8.7 Hz, 1H), 7.25 (d, J=8.1 Hz, 1H), 6.74 (d, J=8.6 Hz, 1H), 5.38-5.16 (m, 1H), 5.15-4.99 (m, 1H), 4.72 (d, J=14.2 Hz, 1H), 4.35 (d, J=14.1 Hz, 1H), 4.18-4.05 (m, 1H), 3.94-3.77 (m, 1H), 3.62-3.44 (m, 1H), 3.40-3.26 (m, 2H), 3.20-3.11 (m, 3H), 3.09-2.98 (m, 1H), 2.19-2.09 (m, 2H), 2.09-1.92 (m, 2H), 1.41 (d, J=6.6 Hz, 3H).

Example 25

2-Deuterio-5-[(2S,6R)-6-methyl-11-[(3S)-pyrrolidin-3-yl]oxy-4,7,10-triazatricyclo[7.4.0.02,7]trideca-1(9),10,12-trien-4-yl]quinoline-8-carbonitrile

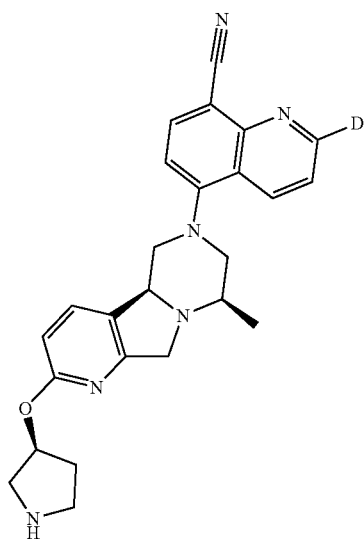 [SMILES: [2H]c1ccc2c(N3C[C@@H](C)N4Cc5nc(O[C@H]6CCNC6)ccc5[C@H]4C3)ccc(C#N)c2n1]

The title compound was prepared in analogy to the preparation of Example 7 by replacing tert-butyl N-[(3R)-3-methylpyrrolidin-3-yl]carbamate with tert-butyl (3S)-3-hydroxypyrrolidine-1-carboxylate in step (a). Example 25 was obtained. MS: calc'd 428 [(M+H)$^+$], measured 428 [(M+H)$^+$]. $^1$H NMR (400 MHz, METHANOL-d$_4$) δ ppm 8.72 (d, J=8.6 Hz, 1H), 8.15 (d, J=8.1 Hz, 1H), 7.82-7.54 (m, 2H), 7.32 (d, J=8.1 Hz, 1H), 6.71 (d, J=8.2 Hz, 1H), 5.79-5.60 (m, 1H), 4.33-4.22 (m, 2H), 3.88 (br d, J=11.4 Hz, 1H), 3.84-3.74 (m, 1H), 3.60-3.56 (m, 2H), 3.52-3.40 (m, 4H), 3.01 (t, J=11.0 Hz, 1H), 2.96-2.82 (m, 1H), 2.43-2.27 (m, 2H), 1.29 (d, J=6.4 Hz, 3H).

Example 26

The following tests were carried out in order to determine the activity of the compounds of formula (I) or (Ia) in HEK293-Blue-hTLR-7/8/9 cells assay.

HEK293-Blue-hTLR-7 Cells Assay:

A stable HEK293-Blue-hTLR-7 cell line was purchased from InvivoGen (Cat. #: hkb-htlr7, San Diego, Calif., USA). These cells were originally designed for studying the stimulation of human TLR7 by monitoring the activation of NF-κB. A SEAP (secreted embryonic alkaline phosphatase) reporter gene was placed under the control of the IFN-β minimal promoter fused to five NF-κB and AP-1-binding sites. The SEAP was induced by activating NF-κB and AP-1 via stimulating HEK-Blue hTLR7 cells with TLR7 ligands. Therefore the reporter expression was declined by TLR7 antagonist under the stimulation of a ligand, such as R848 (Resiquimod), for incubation of 20 hrs. The cell culture supernatant SEAP reporter activity was determined using QUANTI-Blue™ kit (Cat. #: rep-qbl, Invivogen, San Diego, Ca, USA) at a wavelength of 640 nm, a detection medium that turns purple or blue in the presence of alkaline phosphatase.

HEK293-Blue-hTLR7 cells were incubated at a density of 250,000~450,000 cells/mL in a volume of 170 μL in a 96-well plate in Dulbecco's Modified Eagle's medium (DMEM) containing 4.5 g/L glucose, 50 U/mL penicillin, 50 mg/mL streptomycin, 100 mg/mL Normocin, 2 mM L-glutamine, 10% (v/v) heat-inactivated fetal bovine serum with addition of 20 μL test compound in a serial dilution in the presence of final DMSO at 1% and 10 μL of 20 uM R848 in above DMEM, perform incubation under 37° C. in a CO$_2$ incubator for 20 hrs. Then 20 μL of the supernatant from each well was incubated with 180 μL Quanti-blue substrate solution at 37° C. for 2 hrs and the absorbance was read at 620-655 nm using a spectrophotometer. The signaling pathway that TLR7 activation leads to downstream NF-κB activation has been widely accepted, and therefore similar reporter assay was modified for evaluating TLR7 antagonist.

HEK293-Blue-hTLR-8 Cells Assay:

A stable HEK293-Blue-hTLR-8 cell line was purchased from InvivoGen (Cat. #: hkb-htlr8, San Diego, Calif., USA). These cells were originally designed for studying the stimulation of human TLR8 by monitoring the activation of NF-κB. A SEAP (secreted embryonic alkaline phosphatase) reporter gene was placed under the control of the IFN-β minimal promoter fused to five NF-κB and AP-1-binding sites. The SEAP was induced by activating NF-κB and AP-1 via stimulating HEK-Blue hTLR8 cells with TLR8 ligands. Therefore the reporter expression was declined by TLR8 antagonist under the stimulation of a ligand, such as R848, for incubation of 20 hrs. The cell culture supernatant SEAP reporter activity was determined using QUANTI-Blue™ kit (Cat. #: rep-qbl, Invivogen, San Diego, Ca, USA) at a wavelength of 640 nm, a detection medium that turns purple or blue in the presence of alkaline phosphatase.

HEK293-Blue-hTLR8 cells were incubated at a density of 250,000~450,000 cells/mL in a volume of 170 μL in a 96-well plate in Dulbecco's Modified Eagle's medium (DMEM) containing 4.5 g/L glucose, 50 U/mL penicillin, 50 mg/mL streptomycin, 100 mg/mL Normocin, 2 mM L-glutamine, 10% (v/v) heat-inactivated fetal bovine serum with addition of 20 μL test compound in a serial dilution in the presence of final DMSO at 1% and 10 μL of 60 uM R848 in above DMEM, perform incubation under 37° C. in a CO$_2$ incubator for 20 hrs. Then 20 μL of the supernatant from each well was incubated with 180 μL Quanti-blue substrate solution at 37° C. for 2 hrs and the absorbance was read at 620-655 nm using a spectrophotometer. The signaling pathway that TLR8 activation leads to downstream NF-κB activation has been widely accepted, and therefore similar reporter assay was modified for evaluating TLR8 antagonist.

HEK293-Blue-hTLR-9 Cells Assay:

A stable HEK293-Blue-hTLR-9 cell line was purchased from InvivoGen (Cat. #: hkb-htlr9, San Diego, Calif., USA). These cells were originally designed for studying the stimulation of human TLR9 by monitoring the activation of NF-κB. A SEAP (secreted embryonic alkaline phosphatase) reporter gene was placed under the control of the IFN-β minimal promoter fused to five NF-κB and AP-1-binding sites. The SEAP was induced by activating NF-κB and AP-1 via stimulating HEK-Blue hTLR9 cells with TLR9 ligands. Therefore the reporter expression was declined by TLR9 antagonist under the stimulation of a ligand, such as ODN2006 (Cat. #: tlrl-2006-1, Invivogen, San Diego, Calif., USA), for incubation of 20 hrs. The cell culture supernatant SEAP reporter activity was determined using QUANTI-Blue$^T$M kit (Cat. #: rep-qbl, Invivogen, San Diego, Calif., USA) at a wavelength of 640 nm, a detection medium that turns purple or blue in the presence of alkaline phosphatase.

HEK293-Blue-hTLR9 cells were incubated at a density of 250,000~450,000 cells/mL in a volume of 170 μL in a 96-well plate in Dulbecco's Modified Eagle's medium (DMEM) containing 4.5 g/L glucose, 50 U/mL penicillin, 50 mg/mL streptomycin, 100 mg/nL Normocin, 2 mM L-glutamine, 10% (v/v) heat-inactivated fetal bovine serum with addition of 20 μL test compound in a serial dilution in the presence of final DMSO at 1% and 10 μL of 20 uM ODN2006 in above DMEM, perform incubation under 37° C. in a $CO_2$ incubator for 20 hrs. Then 20 μL of the supernatant from each well was incubated with 180 μL Quanti-blue substrate solution at 37° C. for 2 h and the absorbance was read at 620-655 nm using a spectrophotometer. The signaling pathway that TLR9 activation leads to downstream NF-κB activation has been widely accepted, and therefore similar reporter assay was modified for evaluating TLR9 antagonist.

The compounds of formula (I) or (Ia) have TLR7 and/or TLR8 inhibitory activities ($IC_{50}$ value)<0.02 μM. Moreover, most compounds also have TLR9 inhibitory activity <0.5 μM. Activity data of the compounds of the present invention were shown in Table 1.

TABLE 1

The activity of the compounds of present invention in HEK293-Blue-hTLR-7/8/9 cells assays

| Example No | HEK/hTLR7 $IC_{50}$(nM) | HEK/hTLR8 $IC_{50}$(nM) | HEK/hTLR9 $IC_{50}$(nM) |
|---|---|---|---|
| 2 | 3.1 | 0.4 | 449.1 |
| 3A | 14.8 | 0.5 | 142.3 |
| 4A | 8.7 | 1.9 | 56.6 |
| 5 | 0.9 | <0.3 | 252.1 |
| 6 | 4.9 | 2.3 | 195.3 |
| 7 | 2.8 | <0.3 | 236.5 |
| 8 | 1.3 | <0.3 | 138.9 |
| 9 | 6.5 | 0.7 | 105.7 |
| 10 | 1.9 | <0.3 | 186.1 |
| 11 | 3.7 | <0.3 | 201.7 |
| 12 | 1.6 | <0.3 | 305.4 |
| 13 | 1.7 | <0.3 | 289.0 |
| 14 | 3.4 | <0.3 | 315.8 |
| 15 | 2.6 | <0.3 | 211.8 |
| 16 | 1.7 | 0.4 | 120.9 |
| 17 | 2.7 | <0.3 | 53.4 |
| 18 | 1.3 | <0.3 | 262.4 |
| 19 | 1.1 | <0.3 | 141.7 |
| 20 | 2.0 | <0.3 | 206.2 |
| 21 | 7.0 | 3.6 | 177.2 |
| 22 | 1.8 | 0.9 | 194.6 |
| 23 | 1.7 | 0.3 | 232.4 |
| 24 | 1 | <0.3 | 118 |
| 25 | 1 | <0.3 | 274.2 |

Example 27

Human Microsomal Stability Assay

Human liver microsomes (Cat.NO.: 452117, Corning, USA) were preincubated with test compound for 10 minutes at 37° C. in 100 mM potassium phosphate buffer, pH 7.4. The reactions were initiated by adding NADPH regenerating system. The final incubation mixtures contained 1 μM test compound, 0.5 mg/mL liver microsomal protein, 1 mM $MgCl_2$, 1 mM NADP, 1 unit/mL isocitric dehydrogenase and 6 mM isocitric acid in 100 mM potassium phosphate buffer, pH 7.4. After incubation times of 0, 3, 6, 9, 15 and 30 minutes at 37° C., 300 μL of cold ACN (including internal standard) was added to 100 μL incubation mixture to terminate the reaction. Following precipitation and centrifugation, 100 uL supernatant will be taken out and added 300 uL water. The amount of compound remaining in the samples was determined by LC-MS/MS. Controls of no NADPH regenerating system at zero and 30 minutes were also prepared and analyzed. The results were categorized as: low (7.0 mL/min/kg), medium (7.0-16.2 mL/min/kg) and high (16.2-23.2 mL/min/kg). Test results were summarized in Table 2.

TABLE 2

Human microsomal stability results

| Example No | CL (h) (mL/min/kg) |
|---|---|
| 1 | 6.2 |
| 2 | 6.2 |
| 3A | 8.4 |
| 4A | 8.9 |
| 4B | 8.1 |
| 5 | 8.1 |
| 6 | 6.2 |
| 7 | 6.2 |
| 8 | 6.2 |
| 9 | 6.2 |
| 11 | 7.1 |
| 13 | 9.4 |
| 16 | 6.2 |
| 21 | 6.6 |
| 22 | 9.1 |
| 23 | 6.2 |
| 24 | 6.2 |

Example 28 hERG Channel Inhibition Assay

The hERG channel inhibition assay is a highly sensitive measurement that identifies compounds exhibiting hERG inhibition related to cardiotoxicity in vivo. The hERG $K^+$ channels were cloned in humans and stably expressed in a CHO (Chinese hamster ovary) cell line. $CHO_{hERG}$ cells were used for patch-clamp (voltage-clamp, whole-cell) experiments. Cells were stimulated by a voltage pattern to activate hERG channels and conduct $I_{KhERG}$ Currents (rapid delayed outward rectifier potassium current of the hERG channel). After the cells were stabilized for a few minutes, the amplitude and kinetics of $I_{KhERG}$ were recorded at a stimulation frequency of 0.1 Hz (6 bpm). Thereafter, the test compound was added to the preparation at increasing concentrations. For each concentration, an attempt was made to reach a steady-state effect, usually, this was achieved within 3-10 min at which time the next highest concentration was applied. The amplitude and kinetics of $I_{KhERG}$ are recorded in each concentration of the drug which were compared to the control values (taken as 100%). (references: Redfern W S, Carlsson L, Davis A S, Lynch W G, MacKenzie I, Palethorpe S, Siegl P K, Strang I, Sullivan A T, Wallis R, Camm A J, Hammond T G. 2003; Relationships between preclinical cardiac electrophysiology, clinical Q T interval prolongation and torsade de pointes for a broad range of drugs: evidence for a provisional safety margin in drug development. Cardiovasc. Res. 58:32-45, Sanguinetti M C, Tristani-Firouzi M. 2006; hERG potassium channels and cardiac arrhythmia. Nature 440:463-469, Webster R, Leishman D, Walker D. 2002; Towards a drug concentration effect relationship for QT prolongation and torsades de pointes. Curr. Opin. Drug Discov. Devel. 5:116-26). Results of hERG are given in Table 3.

TABLE 3

| Example No | hERG IC$_{20}$ (μM) | hERG IC$_{50}$ (μM) |
|---|---|---|
| 6 | >10 | >20 |
| 7 | >10 | >20 |
| 8 | 5.5 | >20 |
| 9 | >10 | >20 |
| 17 | >10 | >20 |
| 20 | >10 | >20 |

The invention claimed is:

1. A compound of formula (I):

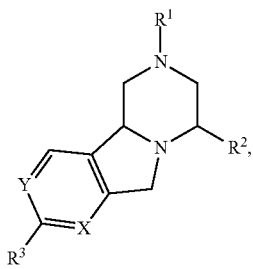

(I)

wherein:

R$^1$ is

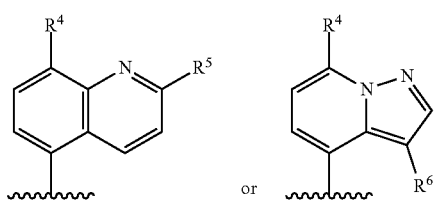

wherein R$^4$ is cyano; R$^5$ is H or deuterium; and R$^6$ is H or halogen;

R$^2$ is H or C$_{1-6}$alkyl;

R$^3$ is 1,4-diazepanyl; 1-oxa-4,9-diazaspiro[5.5]undecanyl; 2,5-diazabicyclo[2.2.1]heptanyl; 2,6-diazaspiro[3.4]octanyl; 3,3a,4,5,6,6a-hexahydro-2H-pyrrolo[2,3-c]pyrrolyl; 9-oxa-3,7-diazabicyclo[3.3.1]nonanyl; amino(C$_{1-6}$alkoxy)piperidinyl; amino(C$_{1-6}$alkyl)piperidinyl; amino(C$_{1-6}$alkyl)pyrrolidinyl; piperazinyl; piperidinyl; pyrrolidinyloxy; or piperidinyloxy;

X is CH and Y is N; or X is N and Y is CH;

or a pharmaceutically acceptable salt thereof.

2. The compound of claim 1, wherein the compound of formula (I) is a compound of formula (Ia),

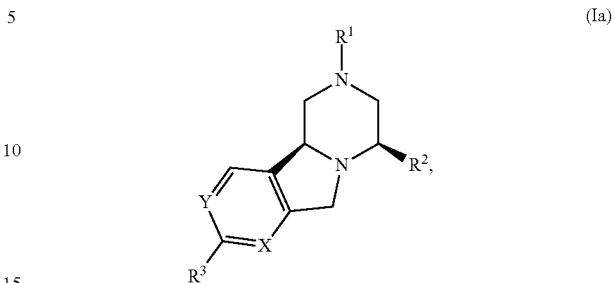

(Ia)

wherein:

R$^1$ is

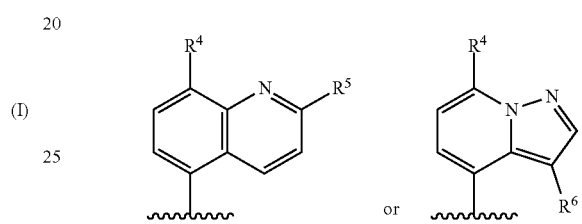

wherein R$^4$ is cyano; R$^5$ is H or deuterium; and R$^6$ is H or halogen;

R$^2$ is H or C$_{1-6}$alkyl;

R$^3$ is 1,4-diazepanyl; 1-oxa-4,9-diazaspiro[5.5]undecanyl; 2,5-diazabicyclo[2.2.1]heptanyl; 2,6-diazaspiro[3.4]octanyl; 3,3a,4,5,6,6a-hexahydro-2H-pyrrolo[2,3-c]pyrrolyl; 9-oxa-3,7-diazabicyclo[3.3.1]nonanyl; amino(C$_{1-6}$alkoxy)piperidinyl; amino(C$_{1-6}$alkyl)piperidinyl; amino(C$_{1-6}$alkyl)pyrrolidinyl; piperazinyl; piperidinyl; pyrrolidinyloxy; or piperidinyloxy; and X is CH and Y is N; or X is N and Y is CH;

or a pharmaceutically acceptable salt thereof.

3. The compound of claim 1, or a pharmaceutically acceptable salt thereof, wherein R$^1$ is

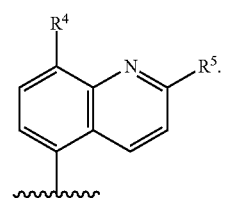

4. The compound of claim 3, or a pharmaceutically acceptable salt thereof, wherein R$^2$ is C$_{1-6}$alkyl.

5. The compound of claim 4, or a pharmaceutically acceptable salt thereof, wherein R$^2$ is methyl.

6. The compound of claim 4, or a pharmaceutically acceptable salt thereof, wherein R$^3$ is 2,5-diazabicyclo[2.2.1]heptanyl; amino(C$_{1-6}$alkyl)pyrrolidinyl; pyrrolidinyloxy; piperidinyloxy; or 9-oxa-3,7-diazabicyclo[3.3.1]nonanyl.

7. The compound of claim 6, or a pharmaceutically acceptable salt thereof, wherein R$^3$ is 2,5-diazabicyclo[2.2.1]heptan-2-yl; 3-amino-3-methyl-pyrrolidin-1-yl; pyrrolidin-3-yloxy; 4-piperidinyloxy; or 9-oxa-3,7-diazabicyclo[3.3.1]nonan-3-yl.

8. The compound of claim 6, or a pharmaceutically acceptable salt thereof, wherein X is N and Y is CH.

9. The compound of claim 7, wherein:
$R^2$ is methyl;
X is N; and
Y is CH;
or a pharmaceutically acceptable salt thereof.

10. A compound selected from:

5-(11-Piperazin-1-yl-4,7,12-triazatricyclo[7.4.0.02,7]trideca-1(9),10,12-trien-4-yl)quinoline-8-carbonitrile;

5-[(2S,6R)-6-methyl-11-piperazin-1-yl-4,7,12-triazatricyclo[7.4.0.02,7]trideca-1(9),10,12-trien-4-yl] quinoline-8-carbonitrile;

5-[(2R)-11-piperazin-1-yl-4,7,10-triazatricyclo[7.4.0.02,7]trideca-1(9),10,12-trien-4-yl]quinoline-8-carbonitrile;

5-[(2S)-11-piperazin-1-yl-4,7,10-triazatricyclo[7.4.0.02,7]trideca-1(9),10,12-trien-4-yl]quinoline-8-carbonitrile;

5-[(2R)-11-(4-amino-4-methyl-1-piperidyl)-4,7,10-triazatricyclo[7.4.0.02,7]trideca-1(9),10,12-trien-4-yl]quinoline-8-carbonitrile;

5-[(2S)-11-(4-amino-4-methyl-1-piperidyl)-4,7,10-triazatricyclo[7.4.0.02,7]trideca-1(9),10,12-trien-4-yl]quinoline-8-carbonitrile;

5-[(2S,6R)-6-methyl-11-piperazin-1-yl-4,7,10-triazatricyclo[7.4.0.02,7]trideca-1(9),10,12-trien-4-yl]quinoline-8-carbonitrile;

5-[(2S,6R)-6-methyl-11-(9-oxa-3,7-diazabicyclo[3.3.1]nonan-3-yl)-4,7,10-triazatricyclo[7.4.0.02,7]trideca-1(9),10,12-trien-4-yl]quinoline-8-carbonitrile;

5-[(2S,6R)-11-[(3R)-3-amino-3-methyl-pyrrolidin-1-yl]-6-methyl-4,7,10-triazatricyclo[7.4.0.02,7]trideca-1(9),10,12-trien-4-yl]-2-deuterio-quinoline-8-carbonitrile;

5-[(2S,6R)-11-[(3S)-3-amino-3-methyl-pyrrolidin-1-yl]-6-methyl-4,7,10-triazatricyclo[7.4.0.02,7]trideca-1(9),10,12-trien-4-yl]-2-deuterio-quinoline-8-carbonitrile;

2-Deuterio-5-[(2S,6R)-11-(2,6-diazaspiro[3.4]octan-6-yl)-6-methyl-4,7,10-triazatricyclo[7.4.0.02,7]trideca-1(9),10,12-trien-4-yl]quinoline-8-carbonitrile;

5-[(2S,6R)-11-[(3aS,6aS)-3,3a,4,5,6,6a-hexahydro-2H-pyrrolo[2,3-c]pyrrol-1-yl]-6-methyl-4,7,10-triazatricyclo[7.4.0.02,7]trideca-1(9),10,12-trien-4-yl]-2-deuterio-quinoline-8-carbonitrile;

5-[(2S,6R)-11-[(3R,4R)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile;

5-[(2S,6R)-11-[(3S,4S)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile;

5-[(2S,6R)-11-[(3R,4S)-4-amino-3-methoxy-1-piperidyl]-6-methyl-4,7,10-triazatricyclo[7.4.0.02,7]trideca-1(9),10,12-trien-4-yl]-2-deuterio-quinoline-8-carbonitrile;

5-[(2S,6R)-11-[(3S,4S)-3-amino-4-methoxy-1-piperidyl]-6-methyl-4,7,10-triazatricyclo[7.4.0.02,7]trideca-1(9),10,12-trien-4-yl]-2-deuterio-quinoline-8-carbonitrile;

5-[(2S,6R)-11-[(3R,4R)-3-amino-4-methoxy-1-piperidyl]-6-methyl-4,7,10-triazatricyclo[7.4.0.02,7]trideca-1(9),10,12-trien-4-yl]-2-deuterio-quinoline-8-carbonitrile;

2-Deuterio-5-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]quinoline-8-carbonitrile;

2-Deuterio-5-[(2S,6R)-11-[(1R,4R)-2,5-diazabicyclo[2.2.1]heptan-2-yl]-6-methyl-4,7,10-triazatricyclo[7.4.0.02,7]trideca-1(9),10,12-trien-4-yl]quinoline-8-carbonitrile;

2-Deuterio-5-[(2S,6R)-6-methyl-11-(1-oxa-4,9-diazaspiro[5.5]undecan-9-yl)-4,7,10-triazatricyclo[7.4.0.02,7]trideca-1(9),10,12-trien-4-yl]quinoline-8-carbonitrile;

5-[(2S,6R)-11-(4-amino-4-methyl-1-piperidyl)-6-methyl-4,7,10-triazatricyclo[7.4.0.02,7]trideca-1(9),10,12-trien-4-yl]-2-deuterio-quinoline-8-carbonitrile;

5-[(2S,6R)-11-(1,4-diazepan-1-yl)-6-methyl-4,7,10-triazatricyclo[7.4.0.02,7]trideca-1(9),10,12-trien-4-yl]quinoline-8-carbonitrile;

4-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]pyrazolo[1,5-a]pyridine-7-carbonitrile;

4-[(2S,6R)-11-[(1S,4S)-2,5-diazabicyclo[2.2.1]heptan-2-yl]-6-methyl-4,7,10-triazatricyclo[7.4.0.02,7]trideca-1(9),10,12-trien-4-yl]pyrazolo[1,5-a]pyridine-7-carbonitrile;

2-Deuterio-5-[(2S,6R)-6-methyl-11-(4-piperidyl)-4,7,10-triazatricyclo[7.4.0.02,7]trideca-1(9),10,12-trien-4-yl]quinoline-8-carbonitrile;

2-Deuterio-5-[(2S,6R)-6-methyl-11-(4-piperidyloxy)-4,7,10-triazatricyclo[7.4.0.02,7]trideca-1(9),10,12-trien-4-yl]quinoline-8-carbonitrile; and 2-Deuterio-5-[(2S,6R)-6-methyl-11-[(3S)-pyrrolidin-3-yl]oxy-4,7,10-triazatricyclo[7.4.0.02,7]trideca-1(9),10,12-trien-4-yl]quinoline-8-carbonitrile;

or a pharmaceutically acceptable salt thereof.

11. A process for the preparation of a compound of claim 1, or a pharmaceutically acceptable salt thereof, comprising any one of the following steps:

a) Buchwald-Hartwig amination reaction or nucleophilic substitution between a compound of formula (IV) and a compound of formula (V):

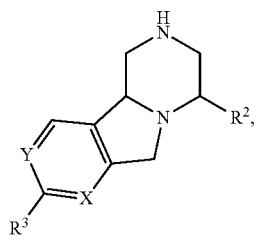

(IV)

and R¹—W (V);
(b) Buchwald-Hartwig amination reaction between a compound of formula (IX),

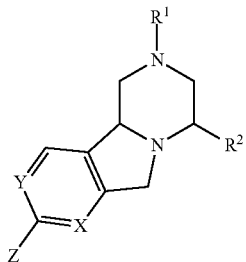
(IX)

and amine HR³; or
(c) Suzuki coupling reaction between a compound of formula (IX) and R³-boronic acid or R³-boronic ester; wherein R¹ to R³ are defined as in claim 2; X is CH and Y is N, or X is N and Y is CH; and
W and Z are halogen or leaving group
to produce the compound of claim 1 or a pharmaceutically acceptable salt thereof.

12. A pharmaceutical composition comprising a compound of claim 1, or a pharmaceutically acceptable salt thereof, and a therapeutically inert carrier.

13. A method for the treatment of systemic lupus erythematosus or lupus nephritis in a mammal in need thereof, comprising administering a therapeutically effective amount of a compound of claim 1, or a pharmaceutically acceptable salt thereof, to the mammal.

14. A pharmaceutical composition comprising a compound of claim 1, or a pharmaceutically acceptable salt thereof, and a therapeutically inert carrier.

15. A method for the treatment of systemic lupus erythematosus or lupus nephritis in a mammal in need thereof, comprising administering a therapeutically effective amount of a compound of claim 10, or a pharmaceutically acceptable salt thereof, to the mammal.

* * * * *